US012641575B2

(12) United States Patent
Hosseini et al.

(10) Patent No.: US 12,641,575 B2
(45) Date of Patent: May 26, 2026

(54) TECHNIQUES FOR WIRELESS COMMUNICATIONS USING MULTIPLE RADIO ACCESS TECHNOLOGIES

(71) Applicant: QUALCOMM Incorporated, San Diego, CA (US)

(72) Inventors: Seyedkianoush Hosseini, San Diego, CA (US); Jing Jiang, San Diego, CA (US); Wanshi Chen, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 17/876,339

(22) Filed: Jul. 28, 2022

(65) Prior Publication Data

US 2024/0049190 A1 Feb. 8, 2024

(51) Int. Cl.
*H04W 72/044* (2023.01)
*H04W 72/56* (2023.01)

(52) U.S. Cl.
CPC ......... *H04W 72/044* (2013.01); *H04W 72/56* (2023.01)

(58) Field of Classification Search
CPC .. H04W 72/044; H04W 72/56; H04L 5/0032; H04L 5/0094; H04L 5/001
See application file for complete search history.

(56) References Cited

U.S. PATENT DOCUMENTS

2012/0263118 A1* 10/2012 Love ................. H04W 72/1215
370/329
2016/0262170 A1* 9/2016 Lee ..................... H04W 72/566

2018/0279227 A1* 9/2018 Kim ....................... H04W 52/24
2018/0367230 A1* 12/2018 Su ...................... H04W 72/1215
2019/0053103 A1* 2/2019 Manolakos ........... H04L 5/0051
2019/0132876 A1* 5/2019 Shikari ............. H04W 72/0453
2019/0173626 A1* 6/2019 Wang .................... H04L 1/1867
2020/0154436 A1 5/2020 Marinier et al.

(Continued)

FOREIGN PATENT DOCUMENTS

WO WO-2020217515 A1 10/2020

OTHER PUBLICATIONS

International Search Report and Written Opinion—PCT/US2023/069338—ISA/EPO—Oct. 10, 2023.

*Primary Examiner* — Sun Jong Kim

(74) *Attorney, Agent, or Firm* — Holland & Hart LLP/Qualcomm Incorporated

(57) ABSTRACT

Methods, systems, and devices are described that support techniques for wireless communications using multiple radio access technologies (RATs). Described techniques provide for dual-connectivity (DC), carrier aggregation, or both, in which different carriers are provided via different RATs. A multi-RAT DC configuration may include separate network entities that provide communications for different cell groups for different RATs, where dynamic power control may be implemented across RATs. Additionally, or alternatively, a multi-RAT carrier aggregation techniques may provide separate component carriers configured for carrier aggregation, where different component carriers that use different RATs. Combinations of DC and carrier aggregation may be provided, in which a cell group of a DC configuration may include multiple component carriers in a carrier aggregation scheme.

30 Claims, 33 Drawing Sheets

(56) References Cited

U.S. PATENT DOCUMENTS

| | | | |
|---|---|---|---|
| 2020/0205134 A1* | 6/2020 | Pan | H04W 72/12 |
| 2022/0086752 A1* | 3/2022 | Cui | H04W 8/24 |
| 2023/0069349 A1* | 3/2023 | Liu | H04W 48/20 |
| 2023/0069828 A1* | 3/2023 | Kim | H04L 5/0032 |
| 2024/0049037 A1* | 2/2024 | Lyu | H04W 8/24 |

* cited by examiner 105-a

320

345

335

315

310

325

340 330

305

115-b

CA Configuration 325

DL Tx (CC1/RAT1) 330

DL Tx (CC2/RAT2) 335

UL Tx (CC1/RAT1) 340

UL Tx (CC2/RAT2) 345

300

DC Configuration 425

DL Tx (Cell Group 1/RAT1) 430

UL Tx (Cell Group 1/RAT1) 435

DL Tx (Cell Group 2/RAT2) 440

UL Tx (Cell Group 2/RAT2) 445

400

1310

1320

1315

1305

1300

130    105                115

Network
Entity

Transceiver                Antenna 1610                1615

Communications
Manager                Memory

Code

1630

1620                1625

1640                Processor

1635

1605

Figure 17:
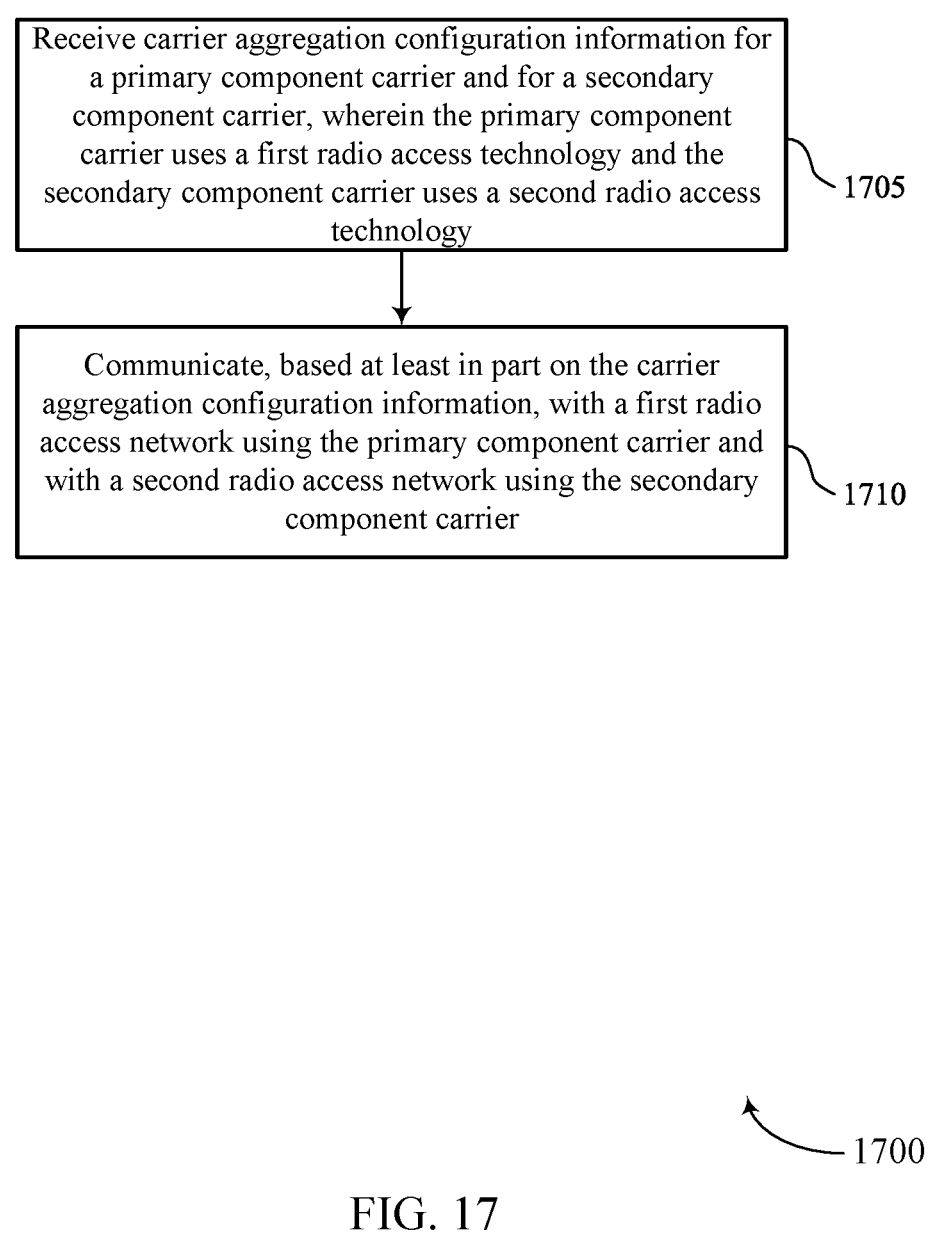

Receive carrier aggregation configuration information for a primary component carrier and for a secondary component carrier, wherein the primary component carrier uses a first radio access technology and the secondary component carrier uses a second radio access technology ⟩ 1705

Communicate, based at least in part on the carrier aggregation configuration information, with a first radio access network using the primary component carrier and with a second radio access network using the secondary component carrier ⟩ 1710

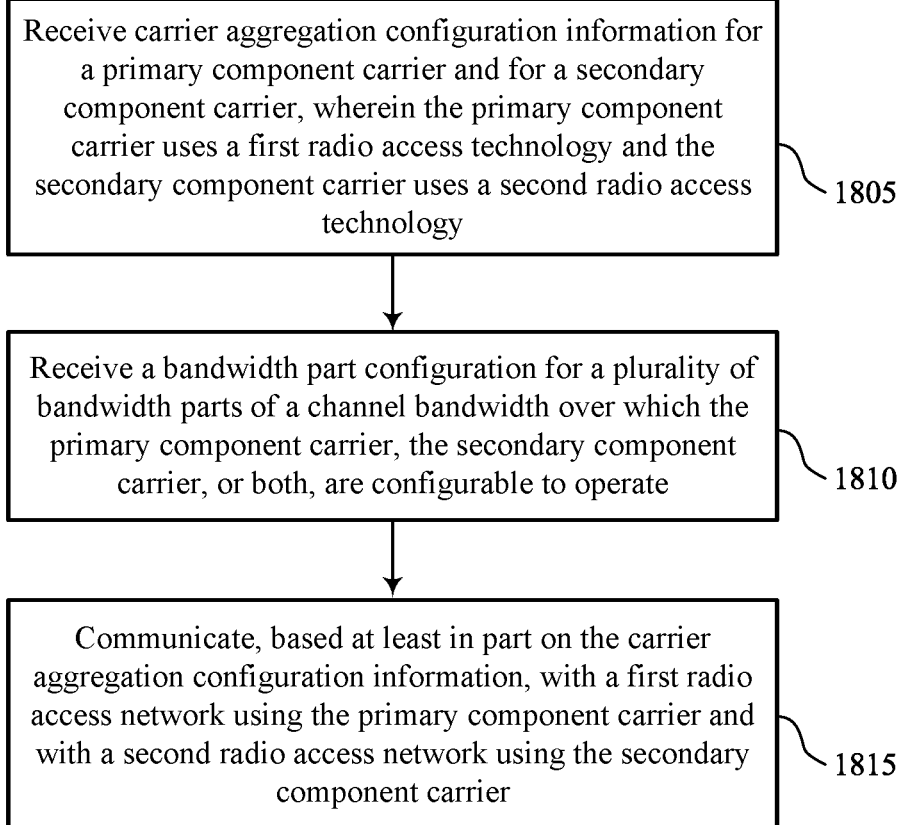

Receive carrier aggregation configuration information for a primary component carrier and for a secondary component carrier, wherein the primary component carrier uses a first radio access technology and the secondary component carrier uses a second radio access technology

1805

Receive a bandwidth part configuration for a plurality of bandwidth parts of a channel bandwidth over which the primary component carrier, the secondary component carrier, or both, are configurable to operate

1810

Communicate, based at least in part on the carrier aggregation configuration information, with a first radio access network using the primary component carrier and with a second radio access network using the secondary component carrier

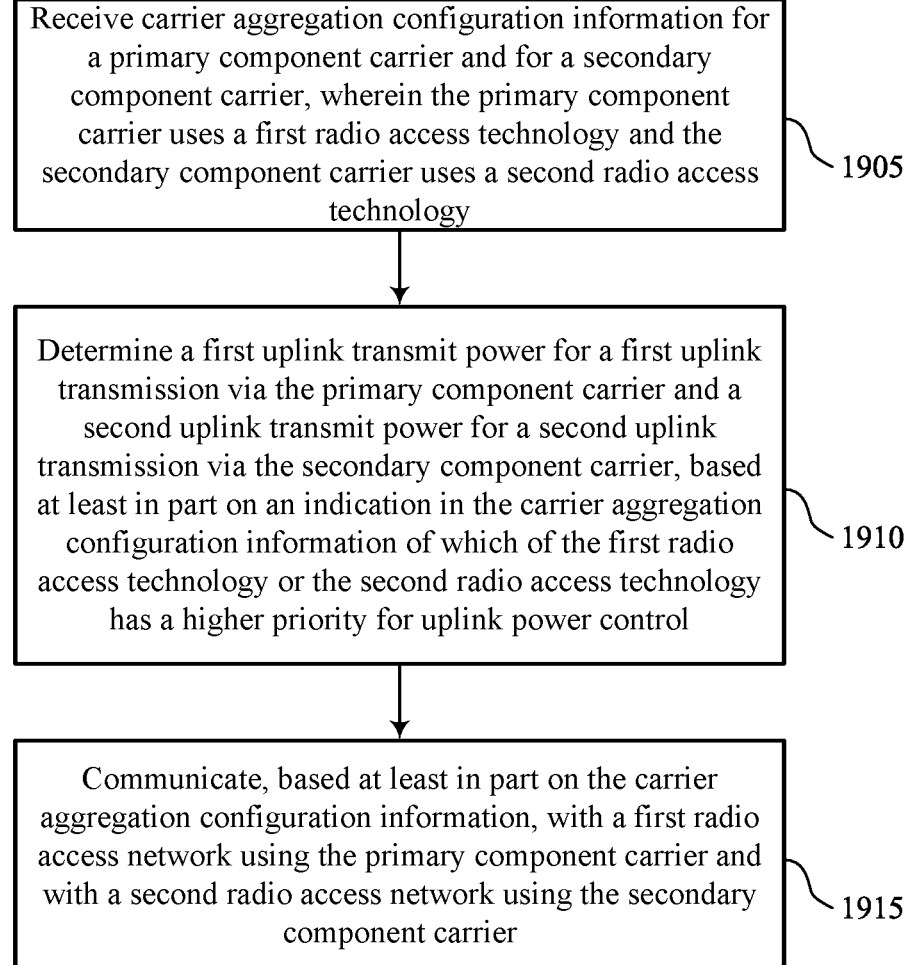

Receive carrier aggregation configuration information for a primary component carrier and for a secondary component carrier, wherein the primary component carrier uses a first radio access technology and the secondary component carrier uses a second radio access technology

1905

Determine a first uplink transmit power for a first uplink transmission via the primary component carrier and a second uplink transmit power for a second uplink transmission via the secondary component carrier, based at least in part on an indication in the carrier aggregation configuration information of which of the first radio access technology or the second radio access technology has a higher priority for uplink power control

1910

Communicate, based at least in part on the carrier aggregation configuration information, with a first radio access network using the primary component carrier and with a second radio access network using the secondary component carrier

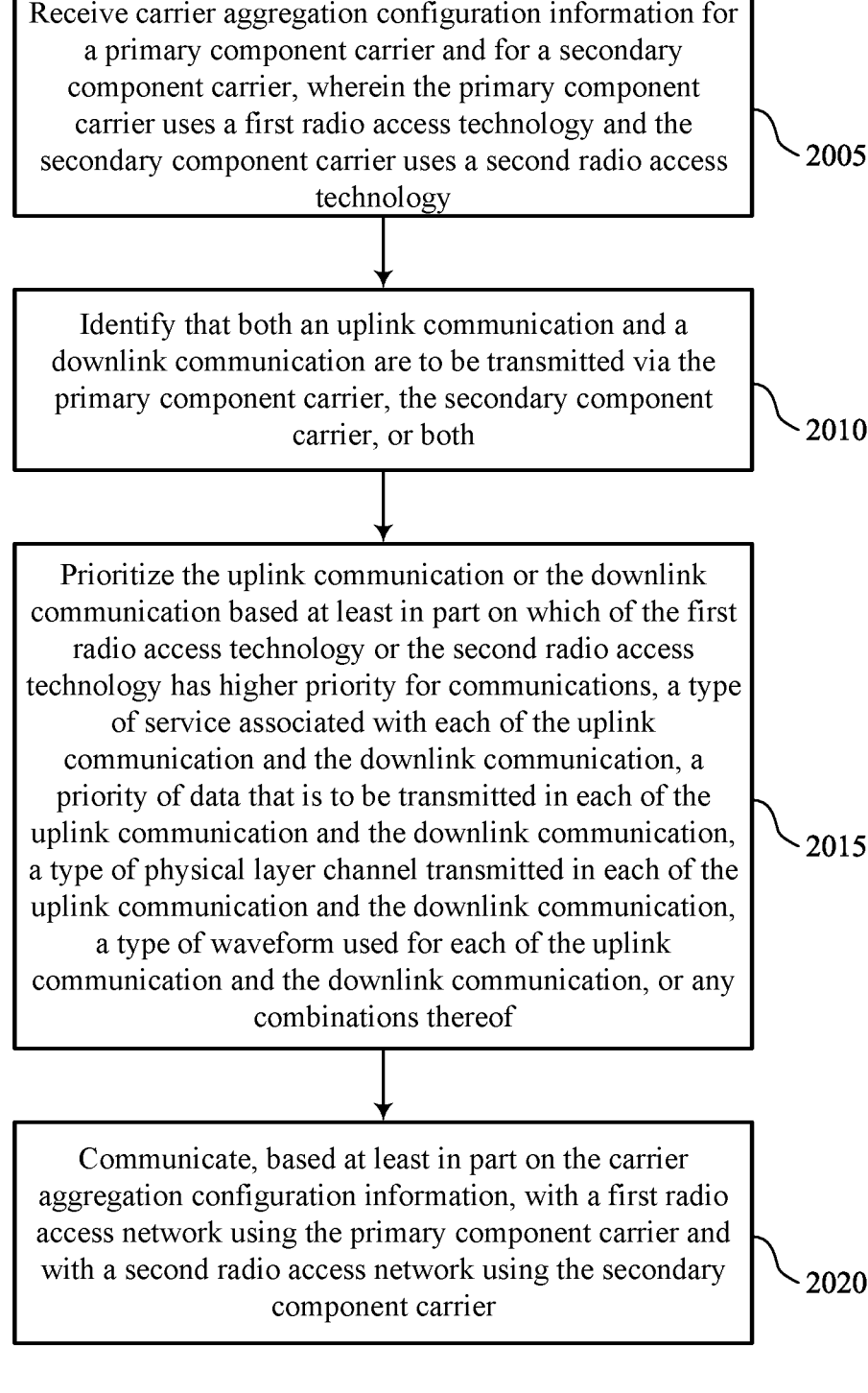

Receive carrier aggregation configuration information for a primary component carrier and for a secondary component carrier, wherein the primary component carrier uses a first radio access technology and the secondary component carrier uses a second radio access technology

2005

Identify that both an uplink communication and a downlink communication are to be transmitted via the primary component carrier, the secondary component carrier, or both

2010

Prioritize the uplink communication or the downlink communication based at least in part on which of the first radio access technology or the second radio access technology has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof

2015

Communicate, based at least in part on the carrier aggregation configuration information, with a first radio access network using the primary component carrier and with a second radio access network using the secondary component carrier

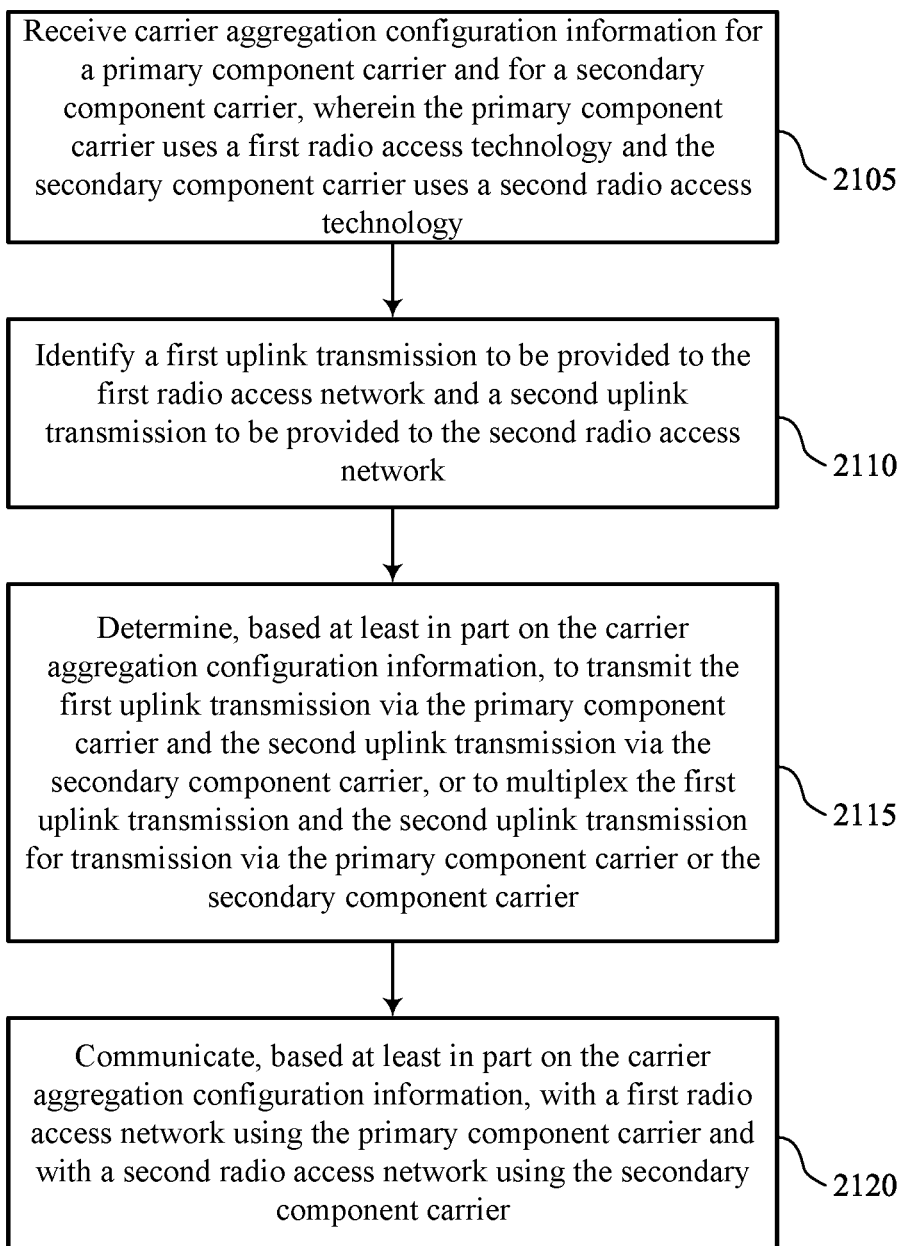

Receive carrier aggregation configuration information for a primary component carrier and for a secondary component carrier, wherein the primary component carrier uses a first radio access technology and the secondary component carrier uses a second radio access technology
2105

Identify a first uplink transmission to be provided to the first radio access network and a second uplink transmission to be provided to the second radio access network
2110

Determine, based at least in part on the carrier aggregation configuration information, to transmit the first uplink transmission via the primary component carrier and the second uplink transmission via the secondary component carrier, or to multiplex the first uplink transmission and the second uplink transmission for transmission via the primary component carrier or the secondary component carrier
2115

Communicate, based at least in part on the carrier aggregation configuration information, with a first radio access network using the primary component carrier and with a second radio access network using the secondary component carrier
2120

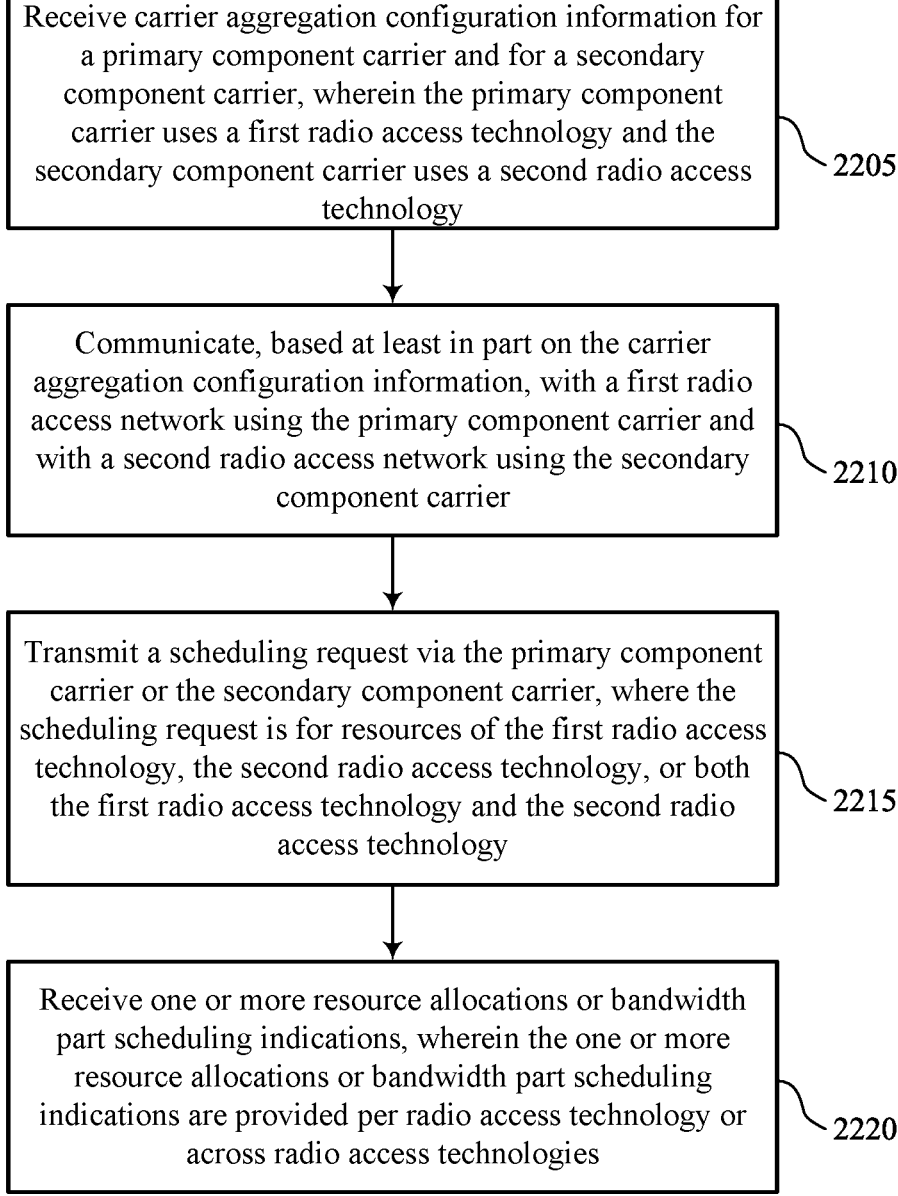

Receive carrier aggregation configuration information for a primary component carrier and for a secondary component carrier, wherein the primary component carrier uses a first radio access technology and the secondary component carrier uses a second radio access technology ⟍2205

Communicate, based at least in part on the carrier aggregation configuration information, with a first radio access network using the primary component carrier and with a second radio access network using the secondary component carrier ⟍2210

Transmit a scheduling request via the primary component carrier or the secondary component carrier, where the scheduling request is for resources of the first radio access technology, the second radio access technology, or both the first radio access technology and the second radio access technology ⟍2215

Receive one or more resource allocations or bandwidth part scheduling indications, wherein the one or more resource allocations or bandwidth part scheduling indications are provided per radio access technology or across radio access technologies ⟍2220

Figure 23:
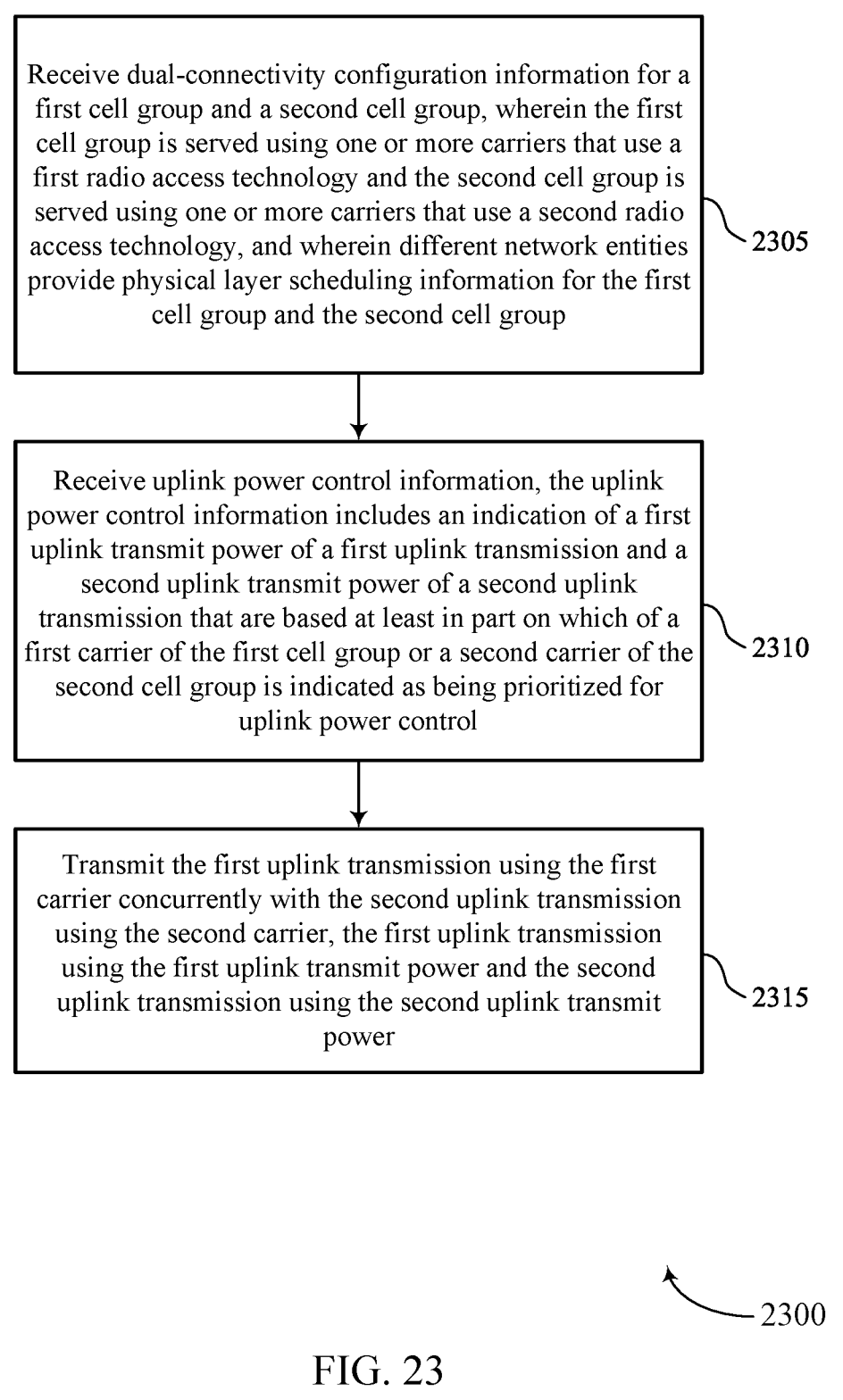

Receive dual-connectivity configuration information for a first cell group and a second cell group, wherein the first cell group is served using one or more carriers that use a first radio access technology and the second cell group is served using one or more carriers that use a second radio access technology, and wherein different network entities provide physical layer scheduling information for the first cell group and the second cell group

2305

Receive uplink power control information, the uplink power control information includes an indication of a first uplink transmit power of a first uplink transmission and a second uplink transmit power of a second uplink transmission that are based at least in part on which of a first carrier of the first cell group or a second carrier of the second cell group is indicated as being prioritized for uplink power control

2310

Transmit the first uplink transmission using the first carrier concurrently with the second uplink transmission using the second carrier, the first uplink transmission using the first uplink transmit power and the second uplink transmission using the second uplink transmit power

Figure 24:
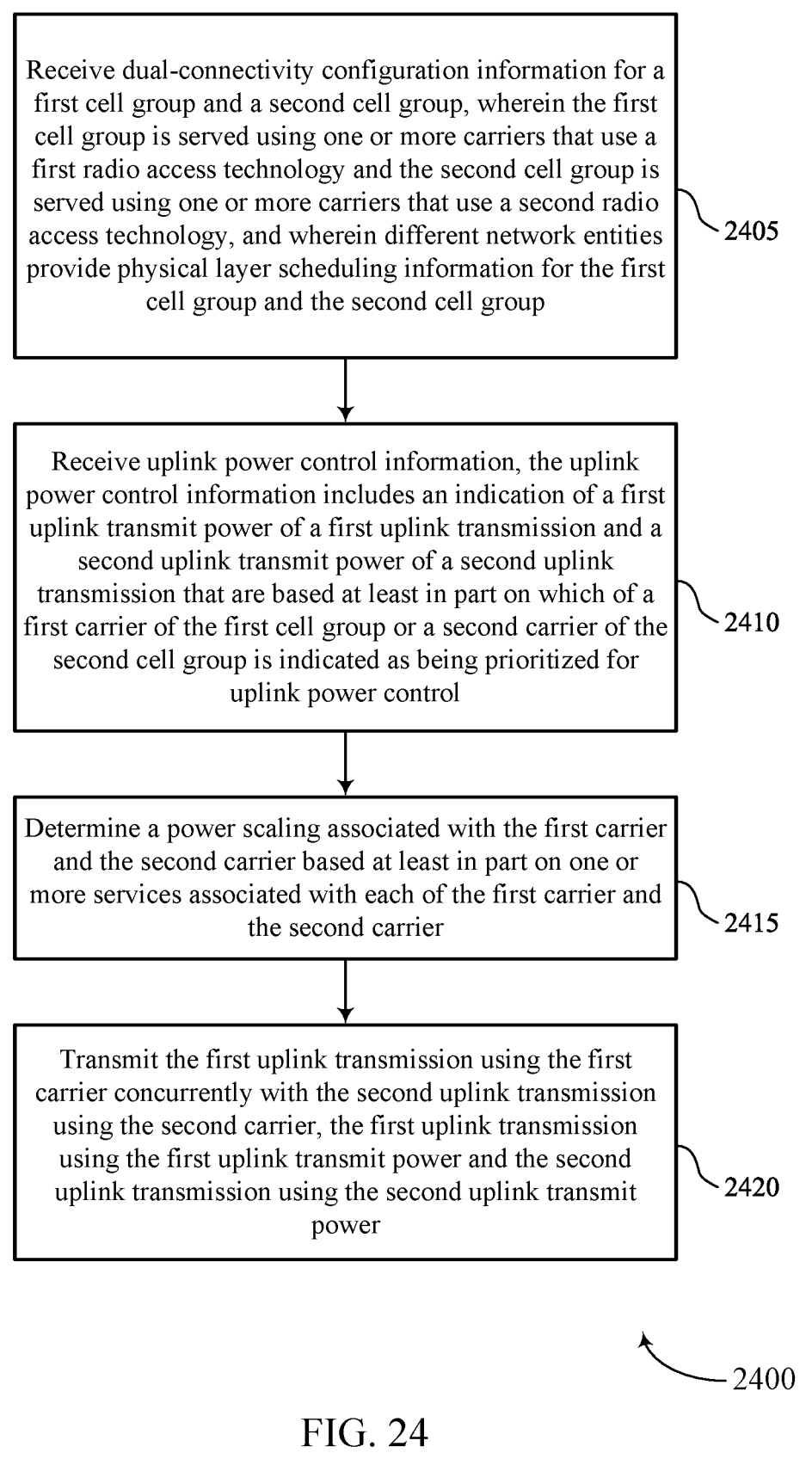

Receive dual-connectivity configuration information for a first cell group and a second cell group, wherein the first cell group is served using one or more carriers that use a first radio access technology and the second cell group is served using one or more carriers that use a second radio access technology, and wherein different network entities provide physical layer scheduling information for the first cell group and the second cell group ⎰2405

Receive uplink power control information, the uplink power control information includes an indication of a first uplink transmit power of a first uplink transmission and a second uplink transmit power of a second uplink transmission that are based at least in part on which of a first carrier of the first cell group or a second carrier of the second cell group is indicated as being prioritized for uplink power control ⎰2410

Determine a power scaling associated with the first carrier and the second carrier based at least in part on one or more services associated with each of the first carrier and the second carrier ⎰2415

Transmit the first uplink transmission using the first carrier concurrently with the second uplink transmission using the second carrier, the first uplink transmission using the first uplink transmit power and the second uplink transmission using the second uplink transmit power ⎰2420

Figure 25:
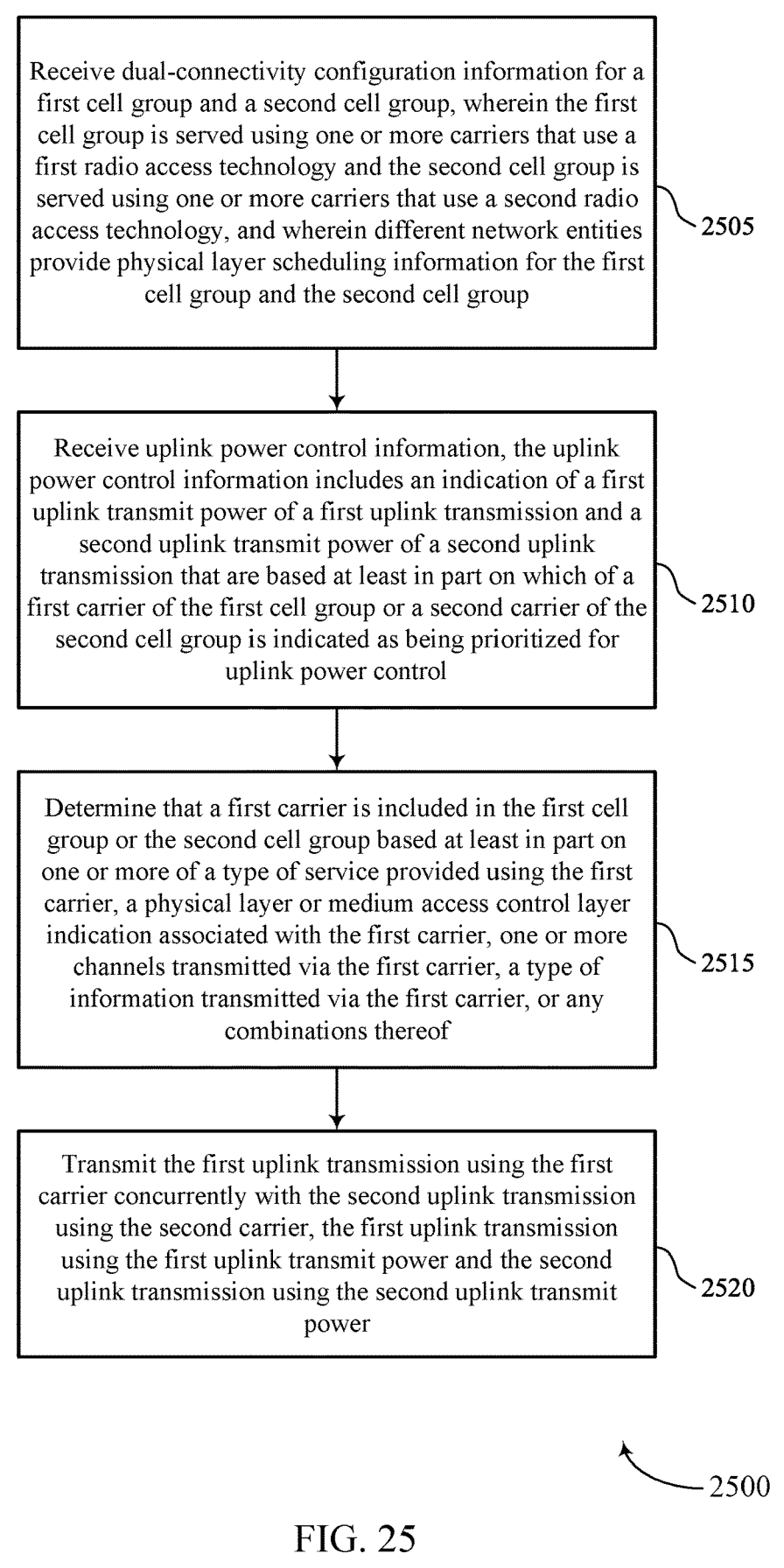

Receive dual-connectivity configuration information for a first cell group and a second cell group, wherein the first cell group is served using one or more carriers that use a first radio access technology and the second cell group is served using one or more carriers that use a second radio access technology, and wherein different network entities provide physical layer scheduling information for the first cell group and the second cell group

2505

Receive uplink power control information, the uplink power control information includes an indication of a first uplink transmit power of a first uplink transmission and a second uplink transmit power of a second uplink transmission that are based at least in part on which of a first carrier of the first cell group or a second carrier of the second cell group is indicated as being prioritized for uplink power control

2510

Determine that a first carrier is included in the first cell group or the second cell group based at least in part on one or more of a type of service provided using the first carrier, a physical layer or medium access control layer indication associated with the first carrier, one or more channels transmitted via the first carrier, a type of information transmitted via the first carrier, or any combinations thereof

2515

Transmit the first uplink transmission using the first carrier concurrently with the second uplink transmission using the second carrier, the first uplink transmission using the first uplink transmit power and the second uplink transmission using the second uplink transmit power

Figure 26:
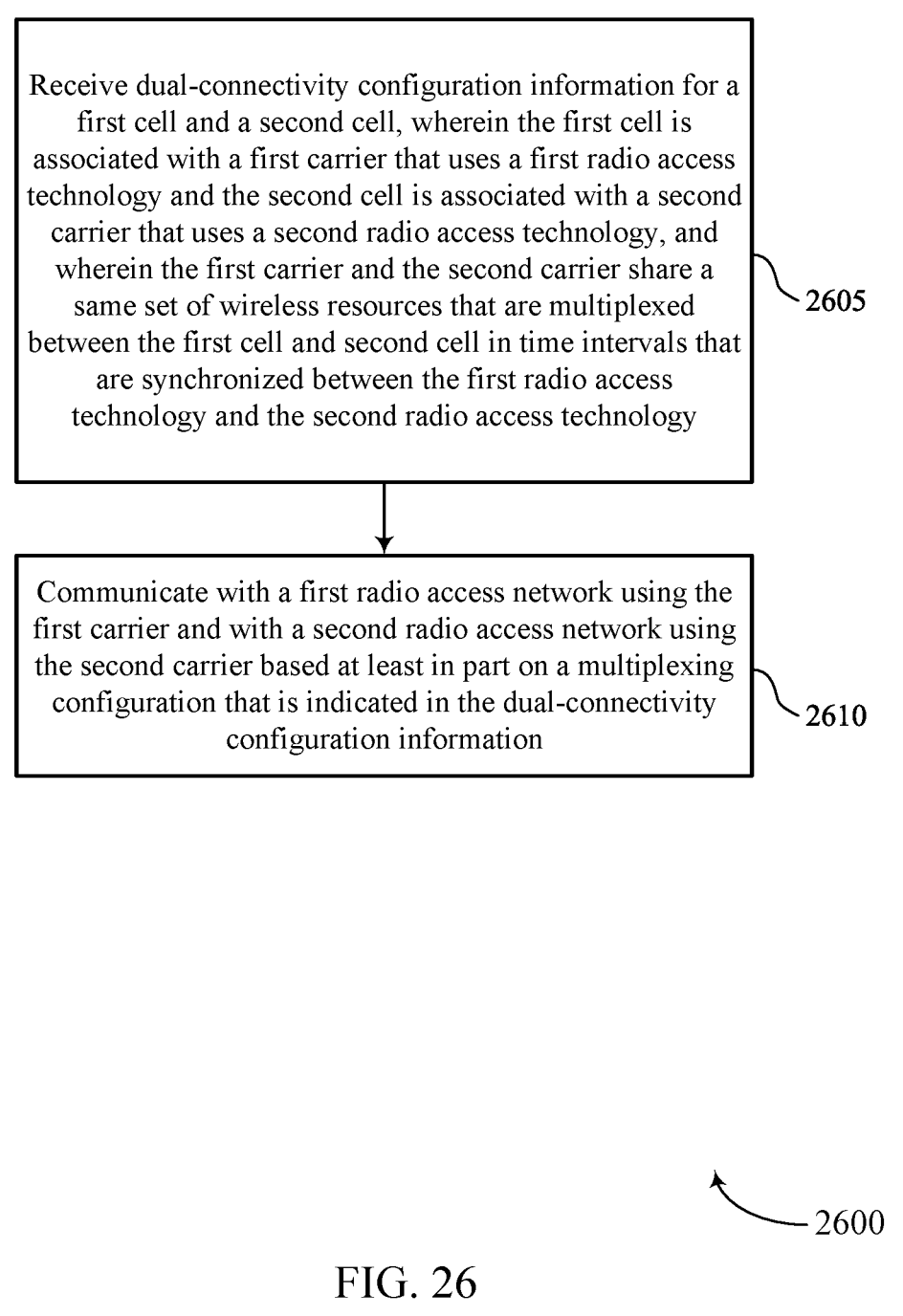

Receive dual-connectivity configuration information for a first cell and a second cell, wherein the first cell is associated with a first carrier that uses a first radio access technology and the second cell is associated with a second carrier that uses a second radio access technology, and wherein the first carrier and the second carrier share a same set of wireless resources that are multiplexed between the first cell and second cell in time intervals that are synchronized between the first radio access technology and the second radio access technology

2605

Communicate with a first radio access network using the first carrier and with a second radio access network using the second carrier based at least in part on a multiplexing configuration that is indicated in the dual-connectivity configuration information

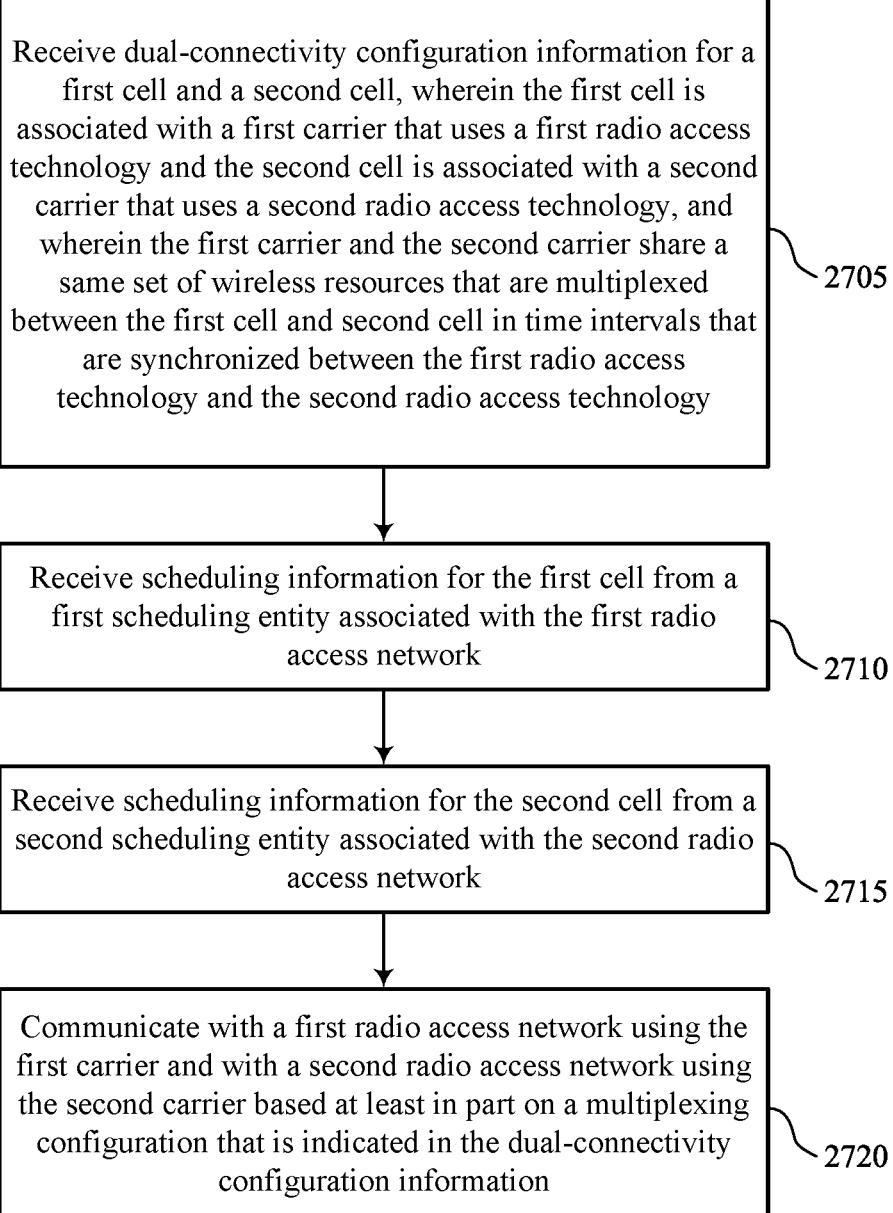

Receive dual-connectivity configuration information for a first cell and a second cell, wherein the first cell is associated with a first carrier that uses a first radio access technology and the second cell is associated with a second carrier that uses a second radio access technology, and wherein the first carrier and the second carrier share a same set of wireless resources that are multiplexed between the first cell and second cell in time intervals that are synchronized between the first radio access technology and the second radio access technology

2705

Receive scheduling information for the first cell from a first scheduling entity associated with the first radio access network

2710

Receive scheduling information for the second cell from a second scheduling entity associated with the second radio access network

2715

Communicate with a first radio access network using the first carrier and with a second radio access network using the second carrier based at least in part on a multiplexing configuration that is indicated in the dual-connectivity configuration information

Figure 28:
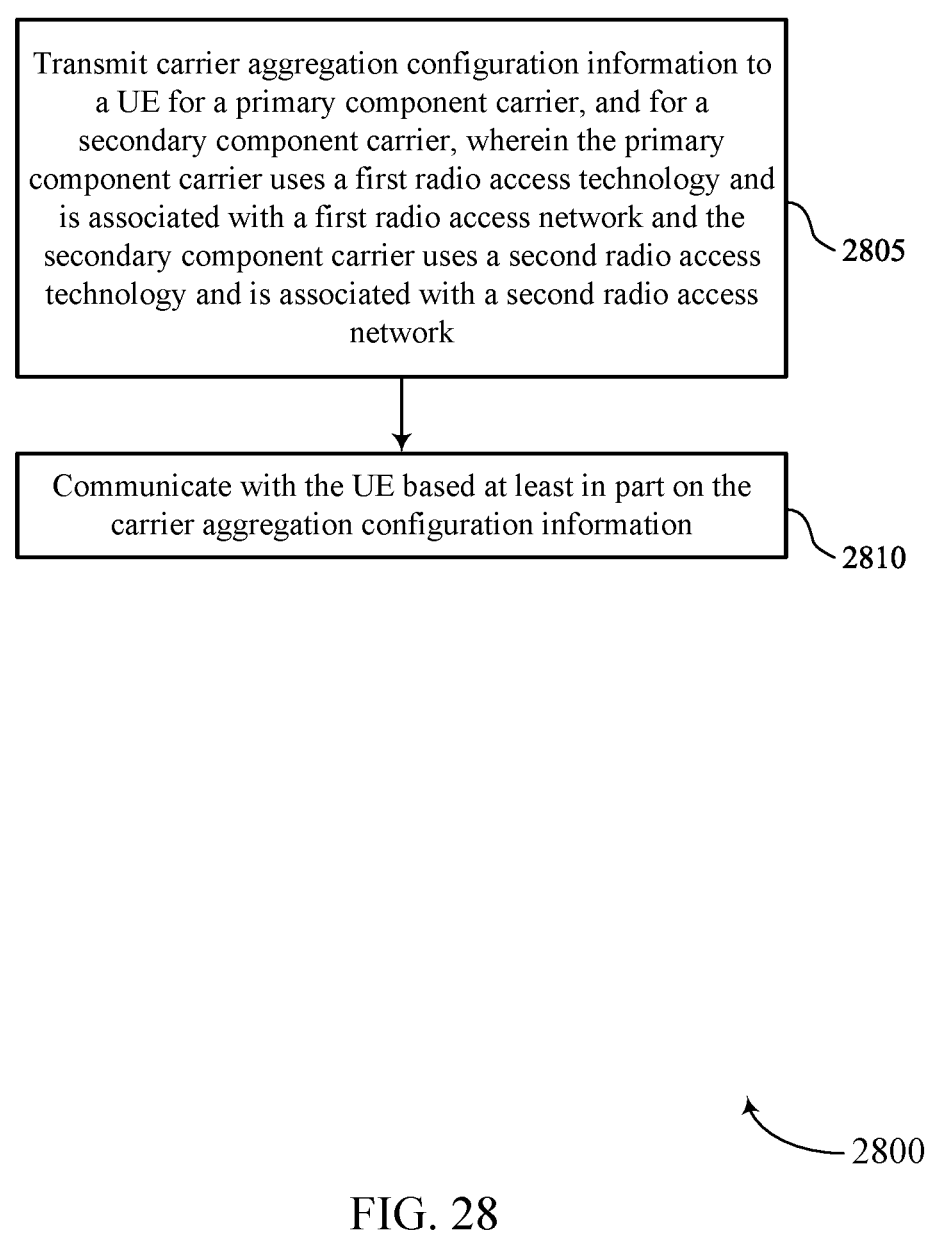

Transmit carrier aggregation configuration information to a UE for a primary component carrier, and for a secondary component carrier, wherein the primary component carrier uses a first radio access technology and is associated with a first radio access network and the secondary component carrier uses a second radio access technology and is associated with a second radio access network

2805

Communicate with the UE based at least in part on the carrier aggregation configuration information

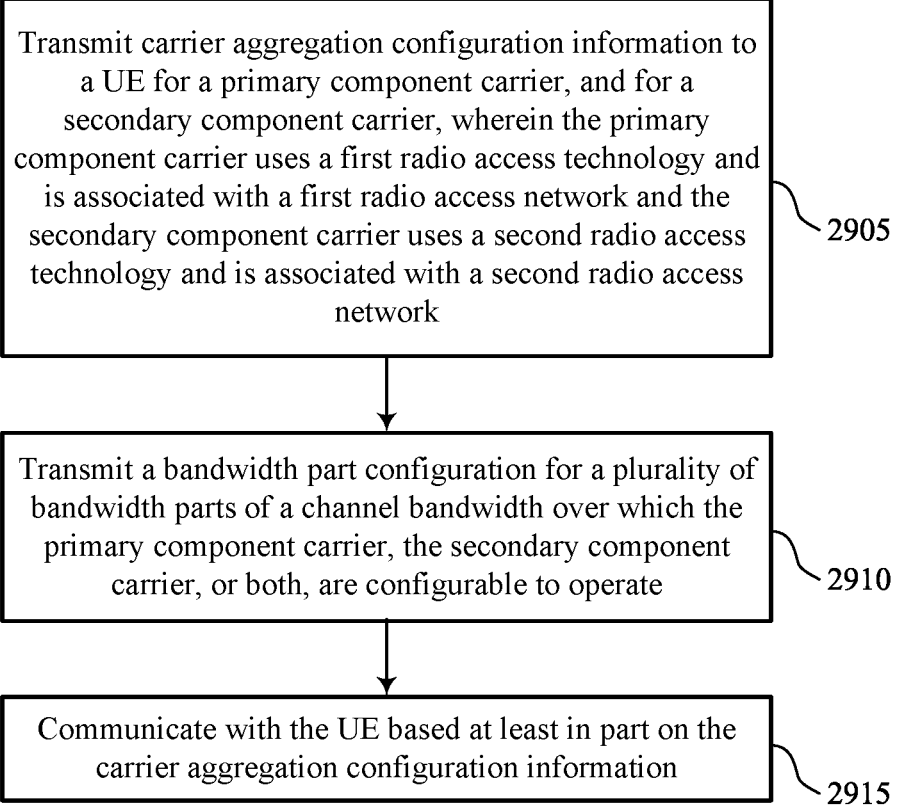

Transmit carrier aggregation configuration information to a UE for a primary component carrier, and for a secondary component carrier, wherein the primary component carrier uses a first radio access technology and is associated with a first radio access network and the secondary component carrier uses a second radio access technology and is associated with a second radio access network ⌐ 2905

Transmit a bandwidth part configuration for a plurality of bandwidth parts of a channel bandwidth over which the primary component carrier, the secondary component carrier, or both, are configurable to operate ⌐ 2910

Communicate with the UE based at least in part on the carrier aggregation configuration information ⌐ 2915

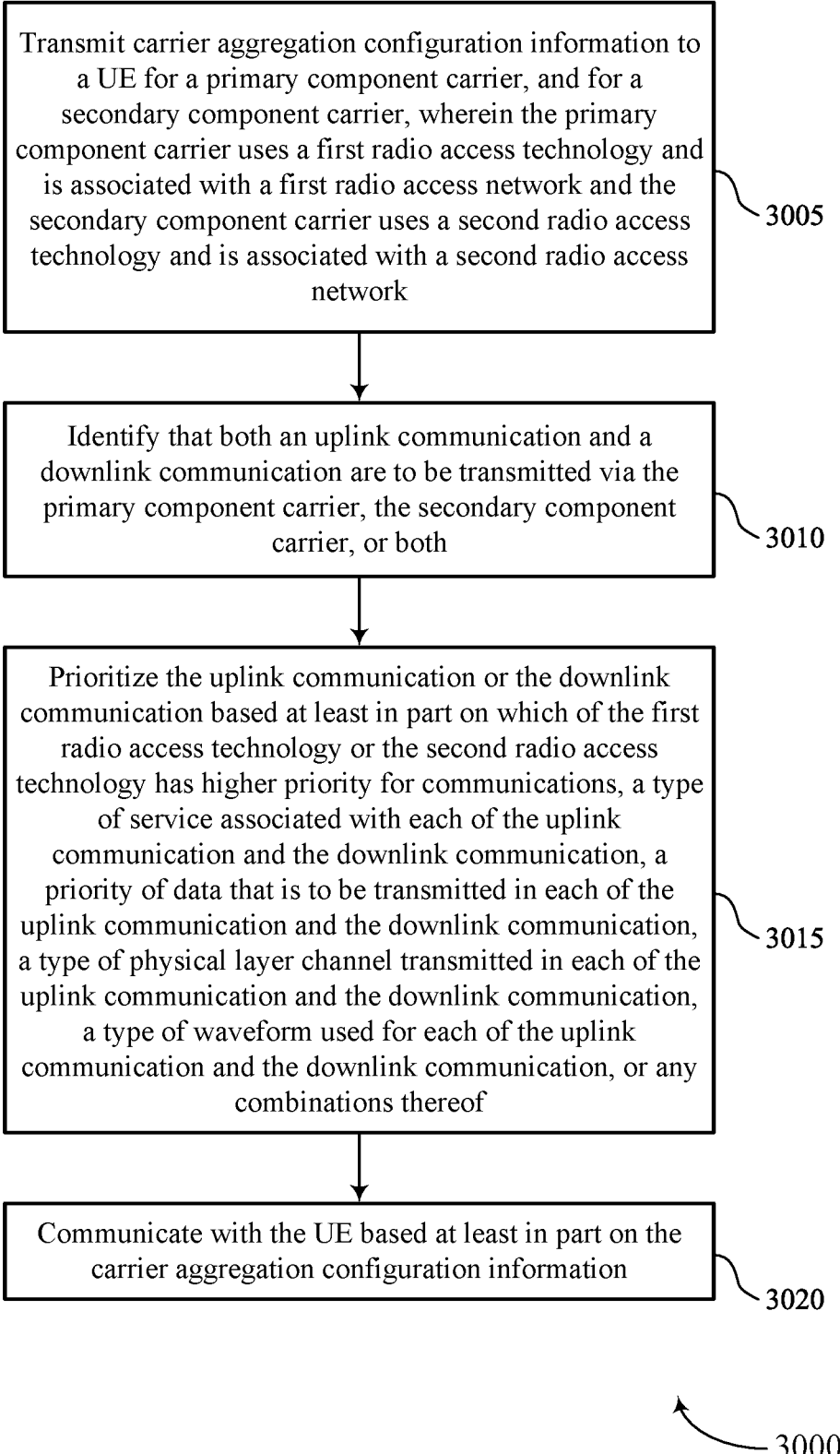

Transmit carrier aggregation configuration information to a UE for a primary component carrier, and for a secondary component carrier, wherein the primary component carrier uses a first radio access technology and is associated with a first radio access network and the secondary component carrier uses a second radio access technology and is associated with a second radio access network

3005

Identify that both an uplink communication and a downlink communication are to be transmitted via the primary component carrier, the secondary component carrier, or both

3010

Prioritize the uplink communication or the downlink communication based at least in part on which of the first radio access technology or the second radio access technology has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof

3015

Communicate with the UE based at least in part on the carrier aggregation configuration information

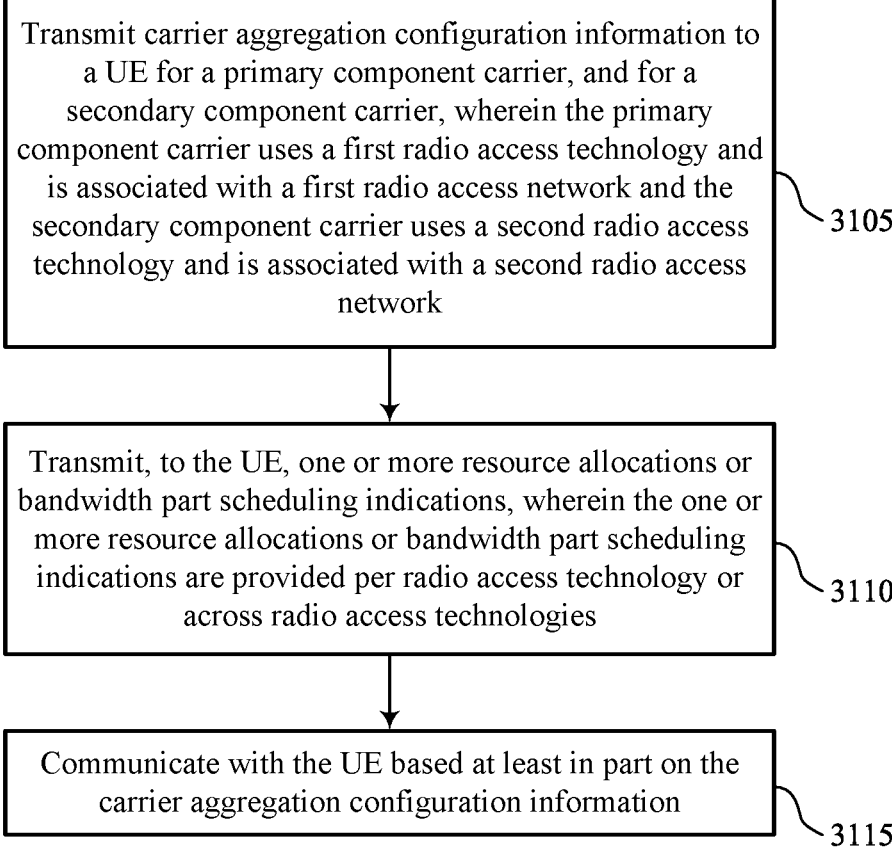

Transmit carrier aggregation configuration information to a UE for a primary component carrier, and for a secondary component carrier, wherein the primary component carrier uses a first radio access technology and is associated with a first radio access network and the secondary component carrier uses a second radio access technology and is associated with a second radio access network

3105

Transmit, to the UE, one or more resource allocations or bandwidth part scheduling indications, wherein the one or more resource allocations or bandwidth part scheduling indications are provided per radio access technology or across radio access technologies

3110

Communicate with the UE based at least in part on the carrier aggregation configuration information

Figure 32:
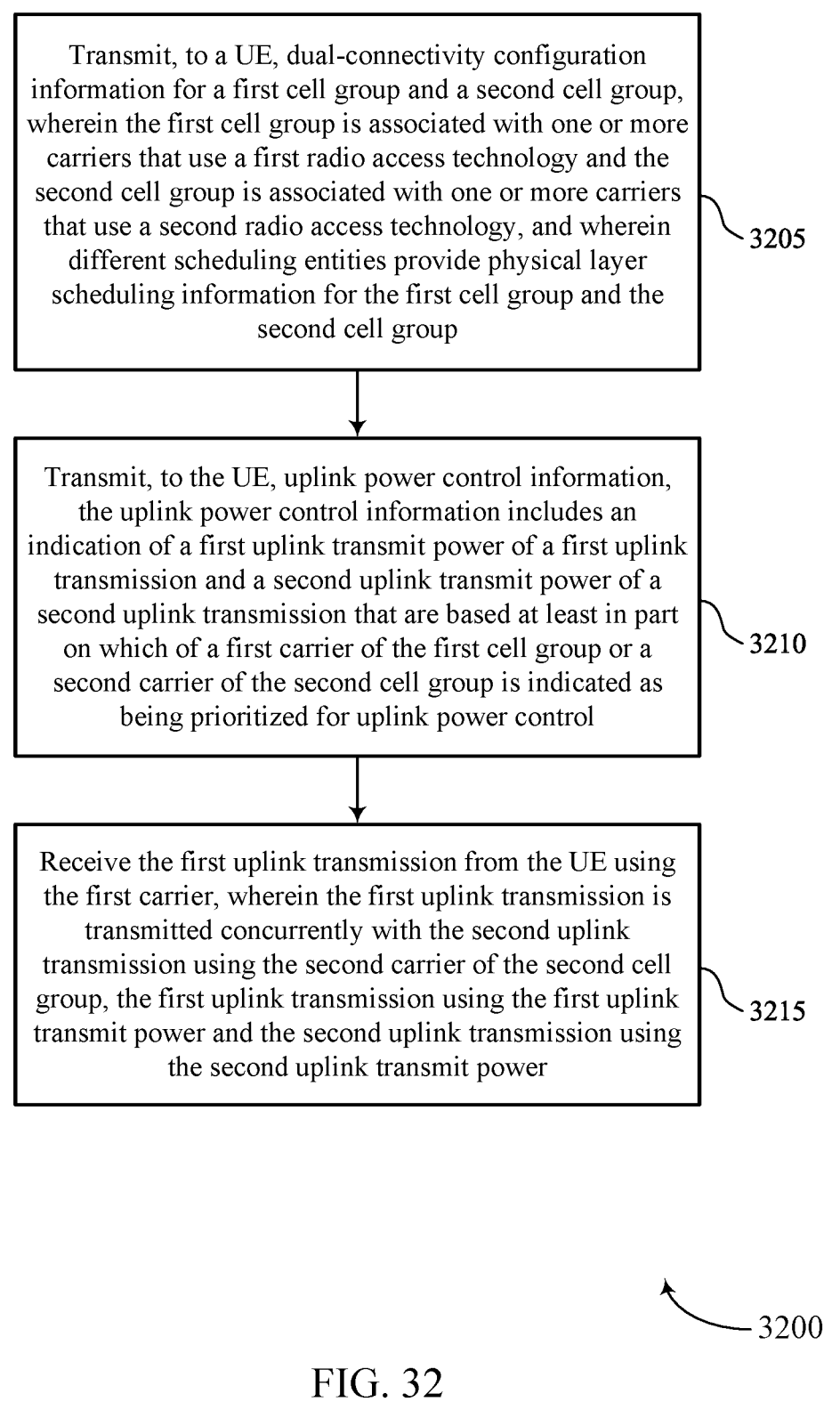

Transmit, to a UE, dual-connectivity configuration information for a first cell group and a second cell group, wherein the first cell group is associated with one or more carriers that use a first radio access technology and the second cell group is associated with one or more carriers that use a second radio access technology, and wherein different scheduling entities provide physical layer scheduling information for the first cell group and the second cell group

3205

Transmit, to the UE, uplink power control information, the uplink power control information includes an indication of a first uplink transmit power of a first uplink transmission and a second uplink transmit power of a second uplink transmission that are based at least in part on which of a first carrier of the first cell group or a second carrier of the second cell group is indicated as being prioritized for uplink power control

3210

Receive the first uplink transmission from the UE using the first carrier, wherein the first uplink transmission is transmitted concurrently with the second uplink transmission using the second carrier of the second cell group, the first uplink transmission using the first uplink transmit power and the second uplink transmission using the second uplink transmit power

Figure 33:
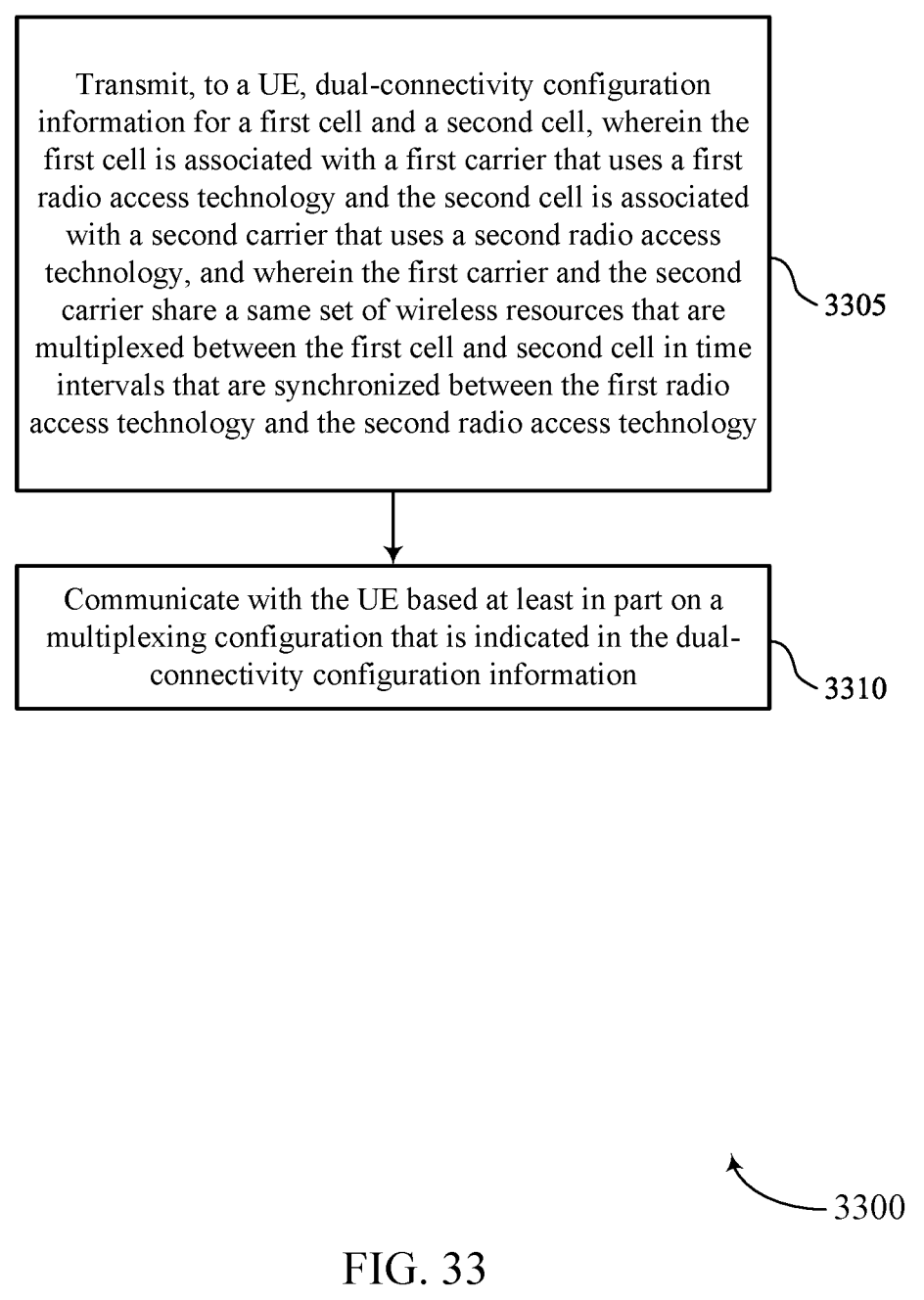

Transmit, to a UE, dual-connectivity configuration information for a first cell and a second cell, wherein the first cell is associated with a first carrier that uses a first radio access technology and the second cell is associated with a second carrier that uses a second radio access technology, and wherein the first carrier and the second carrier share a same set of wireless resources that are multiplexed between the first cell and second cell in time intervals that are synchronized between the first radio access technology and the second radio access technology ⟩ 3305

Communicate with the UE based at least in part on a multiplexing configuration that is indicated in the dual-connectivity configuration information ⟩ 3310

TECHNIQUES FOR WIRELESS COMMUNICATIONS USING MULTIPLE RADIO ACCESS TECHNOLOGIES

FIELD OF TECHNOLOGY

The following relates to wireless communications, including techniques for wireless communications using multiple radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, fifth generation (5G) systems which may be referred to as New Radio (NR) systems, and sixth generation (6G) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network devices (e.g., base stations), supporting wireless communication for communication devices, which may be known as user equipment (UE).

Different generations of wireless multiple-access communications systems provide wireless connectivity using associated different radio access technologies (RATs), and in some cases may be concurrently deployed with overlapping coverage areas. In some cases, UEs may be capable of communications using multiple RATs, and different RATs may be suitable for different types of communications. Techniques to provide for efficient communications using multiple RATs may therefore be desirable in order to provide efficient and reliable communications between UEs and associated radio access networks (RANs) that use different RATs.

SUMMARY

The described techniques relate to improved methods, systems, devices, and apparatuses that support techniques for wireless communications using multiple radio access technologies (RATs). In accordance with various aspects, described techniques provide for dual-connectivity (DC), carrier aggregation, or both, in which different carriers are provided via different RATs. In accordance with some aspects, a multi-RAT DC configuration may include separate network entities that provide communications for different cell groups for different RATs, where dynamic power control may be implemented across RATs. In some cases, power control signaling may be provided that indicates which RAT is prioritized for power control (e.g., a network entity indicates a first RAT is prioritized for power control and transmit power for a second RAT is scaled based on the power used by the first RAT). Additionally, or alternatively, uplink power control may be based on a prioritization of two or more services that are associated with different carriers of the different network entities (e.g., carriers with high priority transmissions are prioritized and receive full transmit power, and carriers that provide lower priority transmissions have scaled power). In further cases, additionally or alternatively, carriers may be prioritized based on a waveform used for transmissions (e.g., a cyclic prefix orthogonal frequency division multiplexing (CP-OFDM) waveform used for data may have a lower priority than a frequency-modulated continuous wave (FMCW) waveform used for sensing), or based on a channel type or contents (e.g., physical uplink control channel (PUCCH) transmissions may be prioritized over physical uplink shared channel (PUSCH) transmissions).

In accordance with some aspects, additionally or alternatively, a multi-RAT carrier aggregation configuration may include a single network entity that provides scheduling for different component carriers (CCs) that use different RATs. In some cases, a first CC (e.g., for a primary cell (PCell)) may be associated with a first RAT and a second CC (e.g., for a secondary cell (SCell)) may be associated with a second RAT. In some cases, multiple bandwidth parts (BWPs) may be configured at a UE, and different BWPs may be associated with different RATs, such that the first CC may be configured for the first RAT or the second RAT based on a BWP of the carrier. Alternatively, one CC may be configured with multiple BWPs, and each BWP is associated with one RAT or multiple RATs. In such cases, switching the first CC to a different BWP may thus switch the first CC between different RATs. In some cases, power control for each of the CCs may be provided based on one or more of a service provided via the associated CC, a waveform type of the associated CC, a channel type of the associated CC, or any combinations thereof. Similarly, various carrier aggregation functions (e.g., uplink control information transmission, acknowledgment/negative-acknowledgment feedback, resource scheduling, logical channel prioritization, UE capability reporting, discontinuous reception (DRX) configuration, or any combinations thereof) for the CCs may be provided per RAT or may be multiplexed across RATs.

In some additional aspects, additionally or alternatively, a semi-static carrier group configuration may provide carrier groups in which CCs of each of two or more groups may use the first RAT, the second RAT, or a mix of RATs, where CCs remain in a group until subsequent signaling reconfigures carrier groups to have different CCs, different RATs for CCs, or any combinations thereof (e.g., the carrier groups are semi-static). In some cases, power control for each of the CCs for each group of CCs may be provided based on one or more of a service provided via the associated CC, a waveform type of the associated CC, a channel type of the associated CC, or any combinations thereof. Similarly, various carrier aggregation functions (e.g., uplink control information transmission, acknowledgment/negative-acknowledgment feedback, resource scheduling, logical channel prioritization, UE capability reporting, discontinuous reception (DRX) configuration, or any combinations thereof) for the CCs may be provided per RAT or may be multiplexed across RATs.

In further aspects, additionally or alternatively, a multi-RAT mixed-mode carrier aggregation and DC configuration may be implemented. In such aspects, a cell group having a DC configuration may include multiple different CCs in a carrier aggregation configuration, where the different CCs may use different RATs. In some cases, similarly as discussed above, different CCs may be associated with different RATs based on a BWP of the CC. In some cases, timing boundaries between a first RAT and a second RAT may be synchronized, and first RAT communications may be multiplexed with second RAT communications on a same carrier.

A method for wireless communication at a user equipment (UE) is described. The method may include receiving carrier aggregation configuration information for a primary component carrier and for a secondary component carrier, where the primary component carrier uses a first radio access technology and the secondary component carrier uses a second radio access technology and communicating, based on the carrier aggregation configuration information, with a first radio access network using the primary component carrier and with a second radio access network using the secondary component carrier.

An apparatus for wireless communication at a UE is described. The apparatus may include a processor, memory coupled with the processor, and instructions stored in the memory. The instructions may be executable by the processor to cause the apparatus to receive carrier aggregation configuration information for a primary component carrier and for a secondary component carrier, where the primary component carrier uses a first radio access technology and the secondary component carrier uses a second radio access technology and communicate, based on the carrier aggregation configuration information, with a first radio access network using the primary component carrier and with a second radio access network using the secondary component carrier.

Another apparatus for wireless communication at a UE is described. The apparatus may include means for receiving carrier aggregation configuration information for a primary component carrier and for a secondary component carrier, where the primary component carrier uses a first radio access technology and the secondary component carrier uses a second radio access technology and means for communicating, based on the carrier aggregation configuration information, with a first radio access network using the primary component carrier and with a second radio access network using the secondary component carrier.

A non-transitory computer-readable medium storing code for wireless communication at a UE is described. The code may include instructions executable by a processor to receive carrier aggregation configuration information for a primary component carrier and for a secondary component carrier, where the primary component carrier uses a first radio access technology and the secondary component carrier uses a second radio access technology and communicate, based on the carrier aggregation configuration information, with a first radio access network using the primary component carrier and with a second radio access network using the secondary component carrier.

In some examples of the method, apparatuses, and non-transitory computer-readable medium described herein, the first radio access technology may be a fifth generation (5G) radio access technology and the second radio access technology may be a sixth generation (6G) radio access technology. In some examples of the method, apparatuses, and non-transitory computer-readable medium described herein, a same network entity provides physical layer scheduling information for both the primary component carrier and the secondary component carrier.

In some examples of the method, apparatuses, and non-transitory computer-readable medium described herein, the receiving the carrier aggregation configuration information may include operations, features, means, or instructions for receiving a bandwidth part configuration for a set of multiple bandwidth parts of a channel bandwidth over which the primary component carrier, the secondary component carrier, or both, are configurable to operate, where a first bandwidth part of the set of multiple bandwidth parts is associated with the first radio access technology and a second bandwidth part of the set of multiple bandwidth parts is associated with the second radio access technology, and where the primary component carrier is associated with the first radio access technology based on being configured with the first bandwidth part, and the secondary component carrier is associated with the second radio access technology based on being configured with the second bandwidth part.

In some examples of the method, apparatuses, and non-transitory computer-readable medium described herein, the primary component carrier is configured for operation on multiple bandwidth parts, and where communications via one or both the first radio access technology or the second radio access technology is based on which of the multiple bandwidth parts is used for communications.

In some examples of the method, apparatuses, and non-transitory computer-readable medium described herein, the receiving the carrier aggregation configuration information may include operations, features, means, or instructions for receiving an indication of which of the first radio access technology or the second radio access technology is associated with the primary component carrier and the secondary component carrier via one or more of a control channel communication, a control resource set (CORESET) indication associated with each component carrier where different CORESETs are associated with different radio access technologies, a downlink control information communication, or any combinations thereof.

Some examples of the method, apparatuses, and non-transitory computer-readable medium described herein may further include operations, features, means, or instructions for determining a first uplink transmit power for a first uplink transmission via the primary component carrier and a second uplink transmit power for a second uplink transmission via the secondary component carrier, based on an indication in the carrier aggregation configuration information of which of the first radio access technology or the second radio access technology has a higher priority for uplink power control.

Some examples of the method, apparatuses, and non-transitory computer-readable medium described herein may further include operations, features, means, or instructions for identifying that both an uplink communication and a downlink communication are to be transmitted via the primary component carrier, the secondary component carrier, or both, or via a first bandwidth part, a second bandwidth part, or both, where each bandwidth part is associated with one or more radio access technologies and prioritizing the uplink communication or the downlink communication based on which of the first radio access technology or the second radio access technology has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof.

Some examples of the method, apparatuses, and non-transitory computer-readable medium described herein may further include operations, features, means, or instructions for identifying a first uplink transmission to be provided to the first radio access network and a second uplink transmission to be provided to the second radio access network and determining, based on the carrier aggregation configuration information, one or more of a component carrier or a bandwidth part for each of the first uplink transmission and the second uplink transmission, or to multiplex the first uplink transmission and the second uplink transmission for transmission via one component carrier or bandwidth part.

In some examples of the method, apparatuses, and non-transitory computer-readable medium described herein, the determining may be based on one or more of a codebook type associated with the first uplink transmission and the second uplink transmission, a waveform of the first uplink transmission and the second uplink transmission, a transmission format of a physical layer channel carrying the first uplink transmission and the second uplink transmission, a priority order of the first radio access technology and the second radio access technology, a service type associated with the first uplink transmission and the second uplink transmission, or any combinations thereof.

In some examples of the method, apparatuses, and non-transitory computer-readable medium described herein, the first uplink transmission and the second uplink transmission include one or more of feedback information that indicates whether one or more downlink communications are successfully decoded, uplink control information, uplink shared channel data, or any combinations thereof. Some examples of the method, apparatuses, and non-transitory computer-readable medium described herein may further include operations, features, means, or instructions for receiving one or more triggers to perform one or more operations associated with the primary component carrier or the secondary component carrier, where the one or more triggers are received separately for each radio access technology or a single trigger indicates to perform the one or more operations using both the first radio access technology and the second radio access technology.

In some examples of the method, apparatuses, and non-transitory computer-readable medium described herein, the one or more operations include one or more of a sounding reference signal transmission, an activation or deactivation of a secondary cell served using the secondary component carrier, a semi-persistent scheduling or configured grant activation or deactivation, a power control procedure, or any combinations thereof. In some examples of the method, apparatuses, and non-transitory computer-readable medium described herein, the one or more triggers are provided in a downlink control information triggering container or a medium access control (MAC) control element triggering container and each trigger are applied to one or both of the first radio access technology or the second radio access technology based on a type of triggering container that provides the one or more triggers.

Some examples of the method, apparatuses, and non-transitory computer-readable medium described herein may further include operations, features, means, or instructions for transmitting a scheduling request via the primary component carrier or the secondary component carrier, or via a first bandwidth part or a second bandwidth part, where the scheduling request is for resources of the first radio access technology, the second radio access technology, or both the first radio access technology and the second radio access technology. Some examples of the method, apparatuses, and non-transitory computer-readable medium described herein may further include operations, features, means, or instructions for receiving one or more resource allocations or bandwidth part scheduling indications, where the one or more resource allocations or bandwidth part scheduling indications are provided per radio access technology or across radio access technologies.

In some examples of the method, apparatuses, and non-transitory computer-readable medium described herein, a logical channel prioritization for two or more logical channels to be provided via the primary component carrier or the secondary component carrier is based on which of the first radio access technology or the second radio access technology is associated with one or more of the primary component carrier, the secondary component carrier, or a bandwidth part, that carries data for the associated logical channel. Some examples of the method, apparatuses, and non-transitory computer-readable medium described herein may further include operations, features, means, or instructions for transmitting a UE capability report that indicates one or more UE capabilities per radio access technology or across radio access technologies.

In some examples of the method, apparatuses, and non-transitory computer-readable medium described herein, a discontinuous reception configuration for the UE is provided per radio access technology or across radio access technologies. In some examples of the method, apparatuses, and non-transitory computer-readable medium described herein, the primary component carrier and the secondary component carrier are included in a first set of component carriers of a first cell group of a dual-connectivity configuration of the UE and a second set of component carriers are configured in a second cell group of the dual-connectivity configuration of the UE.

In some examples of the method, apparatuses, and non-transitory computer-readable medium described herein, a first MAC entity provides scheduling information for the first set of component carriers, and a second media access control (MAC) entity provides scheduling information for the second set of component carriers. In some examples of the method, apparatuses, and non-transitory computer-readable medium described herein, the primary component carrier and the secondary component carrier are each assigned to the first cell group or the second cell group based on one or more of a type of service associated with each respective component carrier, a physical layer indication or a MAC layer indication associated with each respective component carrier, one or more physical layer channels carried using each respective component carrier, a type of information carried using each respective component carrier, or any combinations thereof.

In some examples of the method, apparatuses, and non-transitory computer-readable medium described herein, a set of multiple bandwidth parts (BWPs) are configured for communications at the UE, each BWP of the set of multiple BWPs associated with one of the first radio access technology or the second radio access technology, different BWPs of the set of multiple BWPs are configured for different services, and a BWP switch for a carrier indicates that a radio access technology associated with the carrier is to be switched.

A method for wireless communication at a UE is described. The method may include receiving dual-connectivity configuration information for a first cell group and a second cell group, where the first cell group is served using one or more carriers that use a first radio access technology and the second cell group is served using one or more carriers that use a second radio access technology, and where different network entities provide physical layer scheduling information for the first cell group and the second cell group, receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and transmitting the first uplink transmission using the first carrier concurrently with the second uplink transmission using the second carrier, the first uplink transmission using the first uplink transmit power and the second uplink transmission using the second uplink transmit power.

An apparatus for wireless communication at a UE is described. The apparatus may include a processor, memory coupled with the processor, and instructions stored in the memory. The instructions may be executable by the processor to cause the apparatus to receive dual-connectivity configuration information for a first cell group and a second cell group, where the first cell group is served using one or more carriers that use a first radio access technology and the second cell group is served using one or more carriers that use a second radio access technology, and where different network entities provide physical layer scheduling information for the first cell group and the second cell group, receive uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and transmit the first uplink transmission using the first carrier concurrently with the second uplink transmission using the second carrier, the first uplink transmission using the first uplink transmit power and the second uplink transmission using the second uplink transmit power.

Another apparatus for wireless communication at a UE is described. The apparatus may include means for receiving dual-connectivity configuration information for a first cell group and a second cell group, where the first cell group is served using one or more carriers that use a first radio access technology and the second cell group is served using one or more carriers that use a second radio access technology, and where different network entities provide physical layer scheduling information for the first cell group and the second cell group, means for receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and means for transmitting the first uplink transmission using the first carrier concurrently with the second uplink transmission using the second carrier, the first uplink transmission using the first uplink transmit power and the second uplink transmission using the second uplink transmit power.

A non-transitory computer-readable medium storing code for wireless communication at a UE is described. The code may include instructions executable by a processor to receive dual-connectivity configuration information for a first cell group and a second cell group, where the first cell group is served using one or more carriers that use a first radio access technology and the second cell group is served using one or more carriers that use a second radio access technology, and where different network entities provide physical layer scheduling information for the first cell group and the second cell group, receive uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and transmit the first uplink transmission using the first carrier concurrently with the second uplink transmission using the second carrier, the first uplink transmission using the first uplink transmit power and the second uplink transmission using the second uplink transmit power.

In some examples of the method, apparatuses, and non-transitory computer-readable medium described herein, the dual-connectivity configuration information indicates carrier prioritization that is based on one or more services, one or more priorities, or any combinations thereof, that are associated with the first carrier and the second carrier.

Some examples of the method, apparatuses, and non-transitory computer-readable medium described herein may further include operations, features, means, or instructions for determining a power scaling associated with the first carrier and the second carrier based on one or more services, one or more priorities, or any combinations thereof, associated with each of the first carrier and the second carrier. In some examples of the method, apparatuses, and non-transitory computer-readable medium described herein, the first carrier and the second carrier are prioritized for uplink power control based on a prioritization provided in the dual-connectivity configuration information for one or more physical layer services or medium access control layer logical channels and associated services or logical channels provided using the first carrier and the second carrier.

In some examples of the method, apparatuses, and non-transitory computer-readable medium described herein, the first carrier and the second carrier is prioritized for uplink power control based on a waveform type prioritization provided in the dual-connectivity configuration information and an associated waveform type of the first carrier and the second carrier. In some examples of the method, apparatuses, and non-transitory computer-readable medium described herein, the first carrier and the second carrier are prioritized for uplink power control based on one or more types of channels or type of data provided using the first carrier and the second carrier. In some examples of the method, apparatuses, and non-transitory computer-readable medium described herein, the dual-connectivity configuration information configures at least the first cell group with two or more component carriers in a carrier aggregation configuration and the first cell group includes component carriers associated with different radio access technologies.

In some examples of the method, apparatuses, and non-transitory computer-readable medium described herein, a first MAC entity provides the physical layer scheduling information for each component carrier of the first cell group, and a second MAC entity provides the physical layer scheduling information for each component carrier of the second cell group. Some examples of the method, apparatuses, and non-transitory computer-readable medium described herein may further include operations, features, means, or instructions for determining that a first carrier is included in the first cell group or the second cell group based on one or more of a type of service provided using the first carrier, a physical layer or medium access control layer indication associated with the first carrier, one or more channels transmitted via the first carrier, a type of information transmitted via the first carrier, a priority associated with information transmitted via the first carrier, or any combinations thereof.

In some examples of the method, apparatuses, and non-transitory computer-readable medium described herein, a set of multiple bandwidth parts (BWPs) are configured for communications at the UE, each BWP of the set of multiple BWPs associated with one of the first radio access technology or the second radio access technology, different BWPs of the set of multiple BWPs are configured for different services, and a BWP switch for a carrier indicates that a radio access technology associated with the carrier is to be switched.

A method for wireless communication at a UE is described. The method may include receiving dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and communicating with a first radio access network using the first carrier and with a second radio access network using the second carrier based on a multiplexing configuration that is indicated in the dual-connectivity configuration information, where the first carrier and the second carrier are different component carriers that use a frequency domain multiplexing configuration or are a same component carrier that uses a time-domain multiplexing configuration.

An apparatus for wireless communication at a UE is described. The apparatus may include a processor, memory coupled with the processor, and instructions stored in the memory. The instructions may be executable by the processor to cause the apparatus to receive dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and communicate with a first radio access network using the first carrier and with a second radio access network using the second carrier based on a multiplexing configuration that is indicated in the dual-connectivity configuration information, where the first carrier and the second carrier are different component carriers that use a frequency domain multiplexing configuration or are a same component carrier that uses a time-domain multiplexing configuration.

Another apparatus for wireless communication at a UE is described. The apparatus may include means for receiving dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and means for communicating with a first radio access network using the first carrier and with a second radio access network using the second carrier based on a multiplexing configuration that is indicated in the dual-connectivity configuration information, where the first carrier and the second carrier are different component carriers that use a frequency domain multiplexing configuration or are a same component carrier that uses a time-domain multiplexing configuration.

A non-transitory computer-readable medium storing code for wireless communication at a UE is described. The code may include instructions executable by a processor to receive dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and communicate with a first radio access network using the first carrier and with a second radio access network using the second carrier based on a multiplexing configuration that is indicated in the dual-connectivity configuration information, where the first carrier and the second carrier are different component carriers that use a frequency domain multiplexing configuration or are a same component carrier that uses a time-domain multiplexing configuration.

In some examples of the method, apparatuses, and non-transitory computer-readable medium described herein, the time intervals may be slots or symbols that are synchronized at respective slot or symbol boundaries used in the first radio access network and the second radio access network and the multiplexing configuration indicates time division multiplexing in the slots or symbols. Some examples of the method, apparatuses, and non-transitory computer-readable medium described herein may further include operations, features, means, or instructions for receiving scheduling information for the first cell from a first scheduling entity associated with the first radio access network and receiving scheduling information for the second cell from a second scheduling entity associated with the second radio access network. In some examples of the method, apparatuses, and non-transitory computer-readable medium described herein, the dual-connectivity configuration information provides a set of slots in which a first subset of slots is for the first radio access network and a second subset of slots is for the second radio access network. In some examples of the method, apparatuses, and non-transitory computer-readable medium described herein, a ratio of a first quantity of slots in the first subset of slots and a second quantity of slots in the second subset of slots is determined based on a buffer status associated with each cell, a time division duplexing (TDD) slot pattern of each cell, or any combinations thereof.

In some examples of the method, apparatuses, and non-transitory computer-readable medium described herein, a scheduling pattern of the first subset of slots and the second subset of slots is provided in downlink control information, in a MAC control element, in a downlink signal that indicates a sequence of slots and a corresponding cell, or any combinations thereof. In some examples of the method, apparatuses, and non-transitory computer-readable medium described herein, the scheduling pattern is applied to uplink and downlink communications for intra-band and inter-band transmissions of each carrier. In some examples of the method, apparatuses, and non-transitory computer-readable medium described herein, the multiplexing configuration indicated in the dual-connectivity configuration information provides frequency domain multiplexing or spatial domain multiplexing. In some examples of the method, apparatuses, and non-transitory computer-readable medium described herein, the multiplexing configuration indicated in the dual-connectivity configuration information provides radio frequency spectrum sharing for two or more operators that operate different radio access networks using the first radio access technology, the second radio access technology, or both.

A method for wireless communication at a network entity is described. The method may include transmitting carrier aggregation configuration information to a UE for a primary component carrier, and for a secondary component carrier, where the primary component carrier uses a first radio access technology and is associated with a first radio access network and the secondary component carrier uses a second radio access technology and is associated with a second radio access network and communicating with the UE based on the carrier aggregation configuration information.

An apparatus for wireless communication at a network entity is described. The apparatus may include a processor, memory coupled with the processor, and instructions stored in the memory. The instructions may be executable by the processor to cause the apparatus to transmit carrier aggregation configuration information to a UE for a primary component carrier, and for a secondary component carrier, where the primary component carrier uses a first radio access technology and is associated with a first radio access network and the secondary component carrier uses a second radio access technology and is associated with a second radio access network and communicate with the UE based on the carrier aggregation configuration information.

Another apparatus for wireless communication at a network entity is described. The apparatus may include means for transmitting carrier aggregation configuration information to a UE for a primary component carrier, and for a secondary component carrier, where the primary component carrier uses a first radio access technology and is associated with a first radio access network and the secondary component carrier uses a second radio access technology and is associated with a second radio access network and means for communicating with the UE based on the carrier aggregation configuration information.

A non-transitory computer-readable medium storing code for wireless communication at a network entity is described. The code may include instructions executable by a processor to transmit carrier aggregation configuration information to a UE for a primary component carrier, and for a secondary component carrier, where the primary component carrier uses a first radio access technology and is associated with a first radio access network and the secondary component carrier uses a second radio access technology and is associated with a second radio access network and communicate with the UE based on the carrier aggregation configuration information.

In some examples of the method, apparatuses, and non-transitory computer-readable medium described herein, the first radio access technology may be a fifth generation (5G) radio access technology and the second radio access technology may be a sixth generation (6G) radio access technology and a same scheduling entity provides physical layer scheduling information for both the primary component carrier and the secondary component carrier.

In some examples of the method, apparatuses, and non-transitory computer-readable medium described herein, the transmitting the carrier aggregation configuration information may include operations, features, means, or instructions for transmitting a bandwidth part configuration for a set of multiple bandwidth parts of a channel bandwidth over which the primary component carrier, the secondary component carrier, or both, are configurable to operate, where a first bandwidth part of the set of multiple bandwidth parts is associated with the first radio access technology and a second bandwidth part of the set of multiple bandwidth parts is associated with the second radio access technology, and where the primary component carrier is associated with the first radio access technology based on being configured with the first bandwidth part, and the secondary component carrier is associated with the second radio access technology based on being configured with the second bandwidth part.

In some examples of the method, apparatuses, and non-transitory computer-readable medium described herein, the transmitting the carrier aggregation configuration information may include operations, features, means, or instructions for transmitting an indication of which of the first radio access technology or the second radio access technology is associated with the primary component carrier and the secondary component carrier via one or more of a control channel communication, a control resource set (CORESET) indication associated with each component carrier, where different CORESETs are associated with different radio access technologies, a downlink control information communication, or any combinations thereof.

In some examples of the method, apparatuses, and non-transitory computer-readable medium described herein, a first uplink transmit power for a first uplink transmission via the primary component carrier or a first bandwidth part and a second uplink transmit power for a second uplink transmission via the secondary component carrier or a second bandwidth part is determined based on an indication in the carrier aggregation configuration information of which of the first radio access technology or the second radio access technology has a higher priority for uplink power control.

Some examples of the method, apparatuses, and non-transitory computer-readable medium described herein may further include operations, features, means, or instructions for identifying that both an uplink communication and a downlink communication are to be transmitted via the primary component carrier, the secondary component carrier, or both and prioritizing the uplink communication or the downlink communication based on which of the first radio access technology or the second radio access technology has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof.

In some examples of the method, apparatuses, and non-transitory computer-readable medium described herein, a first uplink transmission is to be provided to the first radio access network and a second uplink transmission is to be provided to the second radio access network and where the carrier aggregation configuration information indicates that the first uplink transmission is to be transmitted via the primary component carrier and the second uplink transmission is to be transmitted via the secondary component carrier, or that the first uplink transmission and the second uplink transmission are to be multiplexed via the primary component carrier or the secondary component carrier.

In some examples of the method, apparatuses, and non-transitory computer-readable medium described herein, a per component carrier transmission of the first uplink transmission and the second uplink transmission, or a multiplexed transmission of the first uplink transmission and the second uplink transmission, may be based on one or more of a codebook type associated with the first uplink transmission and the second uplink transmission, a waveform of the first uplink transmission and the second uplink transmission, a transmission format of a physical layer channel carrying the first uplink transmission and the second uplink transmission, a priority order of the first radio access technology and the second radio access technology, a service type associated with the first uplink transmission and the second uplink transmission, or any combinations thereof.

In some examples of the method, apparatuses, and non-transitory computer-readable medium described herein, the first uplink transmission and the second uplink transmission include one or more of feedback information that indicates whether one or more downlink communications are successfully decoded, uplink control information, uplink shared channel data, or any combinations thereof. Some examples of the method, apparatuses, and non-transitory computer-readable medium described herein may further include operations, features, means, or instructions for transmitting one or more triggers to perform one or more operations associated with the primary component carrier or the secondary component carrier, where the one or more triggers are transmitted separately for each radio access technology or a single trigger indicates to perform the one or more operations using both the first radio access technology and the second radio access technology. In some examples of the method, apparatuses, and non-transitory computer-readable medium described herein, the one or more operations include one or more of a sounding reference signal transmission, an activation or deactivation of a secondary cell associated with the secondary component carrier, a semi-persistent scheduling or configured grant activation or deactivation, a power control procedure, or any combinations thereof. In some examples of the method, apparatuses, and non-transitory computer-readable medium described herein, the one or more triggers are provided in a downlink control information triggering container or a MAC control element triggering container and each trigger is applied to one or both of the first radio access technology or the second radio access technology based on a type of triggering container that provides the one or more triggers.

In some examples of the method, apparatuses, and non-transitory computer-readable medium described herein, a scheduling request is provided from the UE via the primary component carrier or the secondary component carrier, where the scheduling request is for resources of the first radio access technology, the second radio access technology, or both the first radio access technology and the second radio access technology. Some examples of the method, apparatuses, and non-transitory computer-readable medium described herein may further include operations, features, means, or instructions for transmitting, to the UE, one or more resource allocations or bandwidth part scheduling indications, where the one or more resource allocations or bandwidth part scheduling indications are provided per radio access technology or across radio access technologies. In some examples of the method, apparatuses, and non-transitory computer-readable medium described herein, a logical channel prioritization for two or more logical channels to be provided via the primary component carrier or the secondary component carrier is based on which of the first radio access technology or the second radio access technology is associated with the primary component carrier or the secondary component carrier that carries the associated logical channel.

In some examples of the method, apparatuses, and non-transitory computer-readable medium described herein, the UE provides a UE capability report that indicates one or more UE capabilities per radio access technology or across radio access technologies. In some examples of the method, apparatuses, and non-transitory computer-readable medium described herein, a discontinuous reception configuration for the UE is provided per radio access technology or across radio access technologies. In some examples of the method, apparatuses, and non-transitory computer-readable medium described herein, the primary component carrier and the secondary component carrier are included in a first set of component carriers of a first cell group of a dual-connectivity configuration of the UE and a second set of component carriers are configured in a second cell group of the dual-connectivity configuration of the UE.

In some examples of the method, apparatuses, and non-transitory computer-readable medium described herein, a first MAC entity provides scheduling information for the first set of component carriers, and a second MAC entity provides scheduling information for the second set of component carriers. In some examples of the method, apparatuses, and non-transitory computer-readable medium described herein, the primary component carrier and the secondary component carrier are each assigned to the first cell group or the second cell group based on one or more of a type of service associated with each respective component carrier, a physical layer indication or a MAC layer indication associated with each respective component carrier, one or more physical layer channels carried using each respective component carrier, a type of information carried using each respective component carrier, or any combinations thereof.

In some examples of the method, apparatuses, and non-transitory computer-readable medium described herein, a set of multiple bandwidth parts (BWPs) are configured for communications at the UE, each BWP of the set of multiple BWPs associated with one of the first radio access technology or the second radio access technology, different BWPs of the set of multiple BWPs are configured for different services, and a BWP switch for a carrier indicates that a radio access technology associated with the carrier is to be switched.

A method for wireless communication at a network entity is described. The method may include transmitting, to a UE, dual-connectivity configuration information for a first cell group and a second cell group, where the first cell group is associated with one or more carriers that use a first radio access technology and the second cell group is associated with one or more carriers that use a second radio access technology, and where different scheduling entities provide physical layer scheduling information for the first cell group and the second cell group, transmitting, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and receiving the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

An apparatus for wireless communication at a network entity is described. The apparatus may include a processor, memory coupled with the processor, and instructions stored in the memory. The instructions may be executable by the processor to cause the apparatus to transmit, to a UE, dual-connectivity configuration information for a first cell group and a second cell group, where the first cell group is associated with one or more carriers that use a first radio access technology and the second cell group is associated with one or more carriers that use a second radio access technology, and where different scheduling entities provide physical layer scheduling information for the first cell group and the second cell group, transmit, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and receive the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

Another apparatus for wireless communication at a network entity is described. The apparatus may include means for transmitting, to a UE, dual-connectivity configuration information for a first cell group and a second cell group, where the first cell group is associated with one or more carriers that use a first radio access technology and the second cell group is associated with one or more carriers that use a second radio access technology, and where different scheduling entities provide physical layer scheduling information for the first cell group and the second cell group, means for transmitting, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and means for receiving the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

A non-transitory computer-readable medium storing code for wireless communication at a network entity is described. The code may include instructions executable by a processor to transmit, to a UE, dual-connectivity configuration information for a first cell group and a second cell group, where the first cell group is associated with one or more carriers that use a first radio access technology and the second cell group is associated with one or more carriers that use a second radio access technology, and where different scheduling entities provide physical layer scheduling information for the first cell group and the second cell group, transmit, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control, and receive the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

In some examples of the method, apparatuses, and non-transitory computer-readable medium described herein, the dual-connectivity configuration information indicates carrier prioritization that is based on one or more services that are associated with the first carrier and the second carrier. In some examples of the method, apparatuses, and non-transitory computer-readable medium described herein, a power scaling associated with the first carrier and the second carrier is based on one or more services associated with each of the first carrier and the second carrier.

In some examples of the method, apparatuses, and non-transitory computer-readable medium described herein, the first carrier and the second carrier are prioritized for uplink power control based on a prioritization provided in the dual-connectivity configuration information for one or more physical layer services or medium access control layer logical channels and associated services or logical channels provided using the first carrier and the second carrier. In some examples of the method, apparatuses, and non-transitory computer-readable medium described herein, the first carrier and the second carrier are prioritized for uplink power control based on a waveform type prioritization provided in the dual-connectivity configuration information and an associated waveform type of the first carrier and the second carrier.

In some examples of the method, apparatuses, and non-transitory computer-readable medium described herein, the first carrier and the second carrier are prioritized for uplink power control based on one or more types of channels or type of data provided via the first carrier and the second carrier. In some examples of the method, apparatuses, and non-transitory computer-readable medium described herein, the dual-connectivity configuration information configures at least the first cell group with two or more component carriers in a carrier aggregation configuration and the first cell group includes component carriers associated with different radio access technologies.

In some examples of the method, apparatuses, and non-transitory computer-readable medium described herein, a first MAC entity provides the physical layer scheduling information for each component carrier of the first cell group, and a second MAC entity provides the physical layer scheduling information for each component carrier of the second cell group. Some examples of the method, apparatuses, and non-transitory computer-readable medium described herein may further include operations, features, means, or instructions for determining that a first carrier is included in the first cell group or the second cell group based on one or more of a type of service provided using the first carrier, a physical layer or medium access control layer indication associated with the first carrier, one or more channels transmitted via the first carrier, a type of information transmitted via the first carrier, or any combinations thereof.

In some examples of the method, apparatuses, and non-transitory computer-readable medium described herein, a set of multiple bandwidth parts (BWPs) are configured for communications at the UE, each BWP of the set of multiple BWPs associated with one of the first radio access technology or the second radio access technology, different BWPs of the set of multiple BWPs are configured for different services, and a BWP switch for a carrier indicates that a radio access technology associated with the carrier is to be switched.

A method for wireless communication at a network entity is described. The method may include transmitting, to a UE, dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and communicating with the UE based on a multiplexing configuration that is indicated in the dual-connectivity configuration information.

An apparatus for wireless communication at a network entity is described. The apparatus may include a processor, memory coupled with the processor, and instructions stored in the memory. The instructions may be executable by the processor to cause the apparatus to transmit, to a UE, dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and communicate with the UE based on a multiplexing configuration that is indicated in the dual-connectivity configuration information.

Another apparatus for wireless communication at a network entity is described. The apparatus may include means for transmitting, to a UE, dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and means for communicating with the UE based on a multiplexing configuration that is indicated in the dual-connectivity configuration information.

A non-transitory computer-readable medium storing code for wireless communication at a network entity is described. The code may include instructions executable by a processor to transmit, to a UE, dual-connectivity configuration information for a first cell and a second cell, where the first cell is associated with a first carrier that uses a first radio access technology and the second cell is associated with a second carrier that uses a second radio access technology, and where the first carrier and the second carrier share a same set of wireless resources that are multiplexed between the first cell and second cell in time intervals that are synchronized between the first radio access technology and the second radio access technology and communicate with the UE based on a multiplexing configuration that is indicated in the dual-connectivity configuration information.

In some examples of the method, apparatuses, and non-transitory computer-readable medium described herein, the time intervals may be slots that are synchronized at slot boundaries used in the first radio access technology and the second radio access technology and the multiplexing configuration indicates time division multiplexing in the slots. In some examples of the method, apparatuses, and non-transitory computer-readable medium described herein, the dual-connectivity configuration information provides a set of slots in which a first subset of slots is for the first radio access technology and a second subset of slots is for the second radio access technology. In some examples of the method, apparatuses, and non-transitory computer-readable medium described herein, a ratio of a first quantity of slots in the first subset of slots and a second quantity of slots in the second subset of slots are determined based on a buffer status associated with each cell, a TDD slot pattern of each cell, or any combinations thereof.

In some examples of the method, apparatuses, and non-transitory computer-readable medium described herein, a scheduling pattern of the first subset of slots and the second subset of slots is provided in downlink control information, in a MAC control element, in a downlink signal that indicates a sequence of slots and a corresponding cell, or any combinations thereof. In some examples of the method, apparatuses, and non-transitory computer-readable medium described herein, the scheduling pattern is applied to uplink and downlink communications for intra-band and inter-band transmissions of each carrier. In some examples of the method, apparatuses, and non-transitory computer-readable medium described herein, the multiplexing configuration indicated in the dual-connectivity configuration information provides frequency domain multiplexing or spatial domain multiplexing. In some examples of the method, apparatuses, and non-transitory computer-readable medium described herein, the multiplexing configuration indicated in the dual-connectivity configuration information provides radio frequency spectrum sharing for two or more operators that operate different radio access networks using the first radio access technology, the second radio access technology, or both.

BRIEF DESCRIPTION OF THE DRAWINGS

FIGS. 17 through 33 show flowcharts illustrating methods that support techniques for wireless communications using multiple RATs in accordance with one or more aspects of the present disclosure.

DETAILED DESCRIPTION

Figure 1:
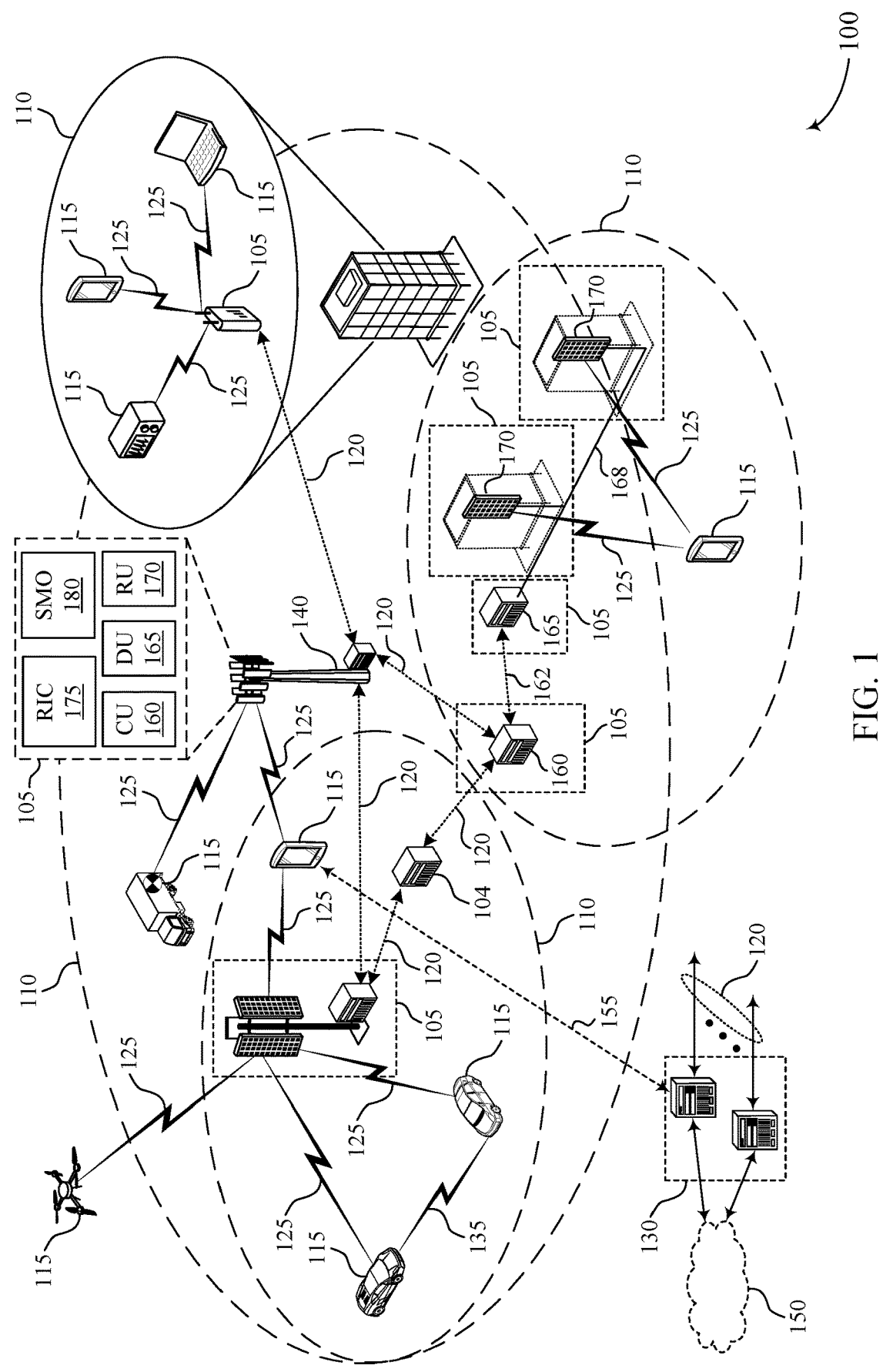
FIG. 1 illustrates an example of a wireless communications system that supports techniques for wireless communications using multiple radio access technologies (RATs) in accordance with one or more aspects of the present disclosure.

Techniques are discussed herein for wireless communications in which a user equipment (UE) may concurrently communicate with two or more radio access networks (RANs) that use different radio access technologies (RATs). Such techniques may allow for concurrent deployment of different RATs and efficient communications in cases where two or more RANs may be able to serve a UE. For example, as sixth generation (6G) system architecture and procedures are being developed and deployed, it may be beneficial to allow for concurrent use of the 6G RAT and the 5G RAT, in order to provide enhanced flexibility to serve both 5G and 6G devices, and devices that are capable of both 5G and 6G communications. Further, it may be beneficial to schedule different services using different RATs, such as delay sensitive services that may be efficiently served using a 6G RAT with lower latency, versus relatively delay tolerant services that may be efficiently served using a 5G RAT with higher latency but enhanced coverage or lower power consumption (or both).

However, in cases where a UE is to concurrently communicate using multiple RATs, power allocation of available UE transmit power between the RATs is used in order for the UE to transmit at appropriate power levels. In cases where a first RAT has longer timelines (e.g., a timing between a resource allocation and an associated transmission) than a second RAT, such as a 4G RAT that has longer timelines than a 5G RAT, transmit power for the first RAT may be set and transmit power for the second RAT may be scaled based on the transmit power for the first RAT. In cases where communications processing timelines between RATs are equivalent or where the first RAT may not consistently have longer timelines (e.g., a 5G RAT may have timelines that are equivalent, longer, or shorter, than corresponding timelines of a 6G RAT, depending upon services being provided), transmit powers for the first RAT may not be known in advance of determination of a transmit power for another RAT. In accordance with various aspects discussed herein, techniques are provided for mixed-RAT power control. In some cases, techniques are provided for determination of which RAT has a higher priority for transmit power allocation, and another RAT having a lower priority may have its power scaled when both RATs have concurrent transmissions.

In accordance with some aspects, a multi-RAT dual-connectivity (DC) configuration may include separate network entities that schedule communications for different cell groups for different RATs, where dynamic power control may be implemented across RATs. In some cases, power control signaling may be provided that indicates which RAT is prioritized for power control (e.g., a network entity indicates a first RAT is prioritized for power control, and transmit power for a second RAT is scaled based on the power used at the first RAT). Additionally, or alternatively, uplink power control may be based on a prioritization of two or more services that are associated with different carriers of the different network entities (e.g., carriers with high priority transmissions are prioritized and receive full transmit power, and carriers that provide lower priority transmissions have scaled power). In further cases, additionally or alternatively, carriers may be prioritized based on a waveform used for transmissions (e.g., a cyclic prefix orthogonal frequency division multiplexing (CP-OFDM) waveform used for data may have a lower priority than a frequency-modulated continuous wave (FMCW) waveform used for sensing), or based on a channel type or contents (e.g., physical uplink control channel (PUCCH) transmissions may be prioritized over physical uplink shared channel (PUSCH) transmissions).

Further, it may be beneficial for a mixed-RAT deployment to implement carrier aggregation in which a same scheduling entity (e.g., a same medium access control (MAC) entity) schedules component carriers of different RATs. In accordance with some aspects discussed herein, multi-RAT carrier aggregation techniques are discussed, in which different component carriers (CCs) use different RATs. In some cases, a first CC (e.g., for a primary cell (PCell)) may be associated with a first RAT and a second CC (e.g., for a secondary cell (SCell)) may be associated with a second RAT. In some cases, multiple bandwidth parts (BWPs) may be configured, and different BWPs may be associated with different RATs, such that the first CC may be configured for the first RAT or the second RAT based on a BWP of the carrier. In such cases, switching the first CC to a different BWP may thus switch the first CC between different RATs. In some cases, power control for each of the CCs may be provided based on one or more of a service provided via the associated CC (e.g., based on an indicator associated with a service or a priority), a waveform type of the associated CC, a channel type of the associated CC, or any combinations thereof. Similarly, various carrier aggregation functions (e.g., uplink control information transmission, acknowledgment/negative-acknowledgment feedback, resource scheduling, logical channel prioritization, UE capability reporting, discontinuous reception (DRX) configuration, or any combinations thereof) for the CCs may be provided per RAT or may be multiplexed across RATs. Thus, various techniques as discussed herein may allow for flexible scheduling of different devices, different services, or combinations thereof, across different RATs using different carriers.

In further aspects, additionally or alternatively, a multi-RAT mixed-mode carrier aggregation and DC configuration may be implemented. In such aspects, a cell group having a DC configuration may include multiple different CCs in a carrier aggregation configuration, where the different CCs may use different RATs. In some cases, similarly as discussed above, different CCs may be associated with different RATs based on a BWP of the CC. In some cases, timing boundaries between a first RAT and a second RAT may be synchronized, and first RAT communications may be multiplexed with second RAT communications on a same carrier.

Thus, techniques as discussed herein may allow for concurrent communications at a UE with multiple RANs that use different RATs. Such concurrent communications may use carrier aggregation in which different CCs are provided using different RATs, in which one scheduling entity (e.g., a cloud-based scheduling entity that provides scheduling functions for both a 5G RAN and a 6G RAN) controls the scheduling decisions on a group of carriers (e.g., all aggregated CCs belong to a same medium access control (MAC) entity. Additionally, or alternatively, such concurrent communications may use DC, which may be enabled where scheduling decisions on two groups of carriers are independently coordinated (e.g., each cell group belongs to a different MAC entity). By providing flexibility for concurrent communications via multiple RATs, techniques as discussed herein may provide enhanced network efficiency and reliability, enhanced scheduling flexibility by network operators, and enhanced user experience through provision of services at different RANs that provide enhanced throughput and reduced latency.

Aspects of the disclosure are initially described in the context of wireless communications systems. Aspects of the disclosure are further illustrated by and described with reference to process flows, apparatus diagrams, system diagrams, and flowcharts that relate to techniques for wireless communications using multiple RATs.

FIG. 1 illustrates an example of a wireless communications system 100 that supports techniques for wireless communications using multiple RATs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for wireless communications using multiple RATs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, wireless communications system 100 may provide communications using two or more RATs. For example, one or more network entities 105 may provide communications for a first RAN using a first RAT, and one or more network entities 105 may provide communications for a second RAN using a second RAT. In some cases one network entity 105 may provide communications for both the first RAN and second RAN using the first RAT and second RAT, respectively. In some cases, one or more UEs 115 may be capable of communications using both the first RAT and second RAT, and in some cases may have concurrent connections via both RATs. In accordance with various aspects, techniques are provided for DC, carrier aggregation, or both, in which different carriers are provided via different RATs. In some cases, a multi-RAT DC configuration may include separate network entities 105 that provide communications for different cell groups for different RATs, where dynamic power control may be implemented across RATs. In some cases, power control signaling may be provided that indicates which RAT is prioritized for power control Additionally, or alternatively, uplink power control may be based on a prioritization of two or more services that are associated with different carriers of the different network entities 105 (e.g., carriers with high priority transmissions are prioritized and receive full transmit power, and carriers that provide lower priority transmissions have scaled power). In further cases, additionally or alternatively, carriers may be prioritized based on a waveform used for transmissions, or based on a channel type or contents.

Additionally or alternatively, multi-RAT carrier aggregation may be used for communications with one or more UEs 115, and a multi-RAT carrier aggregation configuration may include a single network entity 105 that provides scheduling for different CCs that use different RATs. In some cases, a first CC (e.g., for a PCell) may be associated with the first RAT and a second CC (e.g., for a SCell) may be associated with the second RAT. In some cases, multiple BWPs may be configured at a UE 115, and different BWPs may be associated with different RATs, such that the first CC may be configured for the first RAT or the second RAT based on a BWP of the carrier. In such cases, switching the first CC to a different BWP may thus switch the first CC between different RATs. In some cases, power control for each of the CCs may be provided based on one or more of a service provided via the associated CC (e.g., based on an indicator associated with a service or a priority), a waveform type of the associated CC, a channel type of the associated CC, or any combinations thereof. Similarly, various carrier aggregation functions (e.g., uplink control information transmission, acknowledgment/negative-acknowledgment feedback, resource scheduling, logical channel prioritization, UE capability reporting, DRX configuration, or any combinations thereof) for the CCs may be provided per RAT or may be multiplexed across RATs.

In further aspects, additionally or alternatively, a multi-RAT mixed-mode carrier aggregation and DC configuration may be implemented. In such aspects, a cell group having a DC configuration may include multiple different CCs in a carrier aggregation configuration, where the different CCs may use different RATs. In some cases, similarly as discussed above, different CCs may be associated with different RATs based on a BWP of the CC. In some cases, timing boundaries between a first RAT and a second RAT may be synchronized, and first RAT communications may be multiplexed with second RAT communications on a same carrier.

Figure 2:
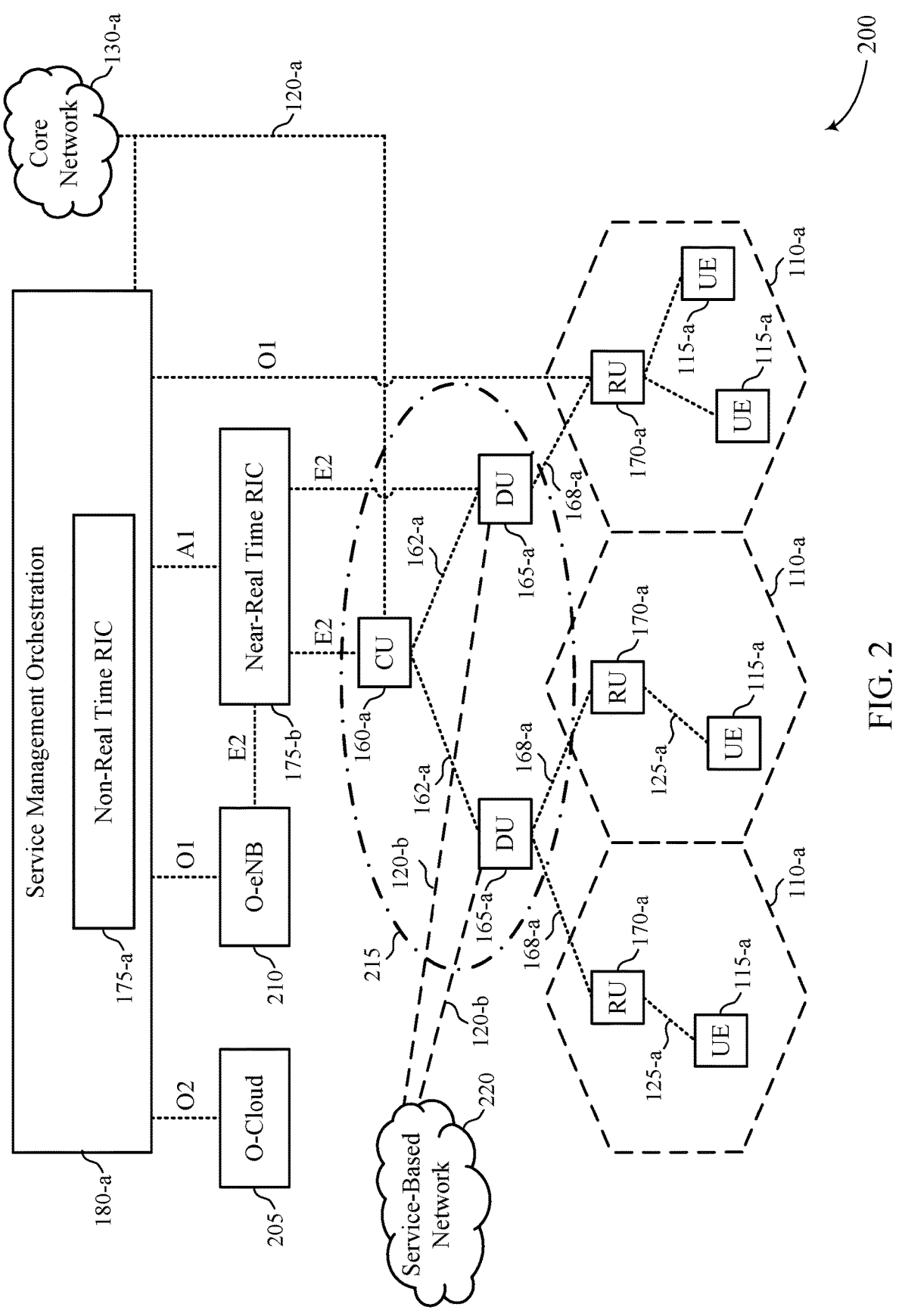
FIG. 2 illustrates an example of a network architecture that supports techniques for wireless communications using multiple RATs in accordance with one or more aspects of the present disclosure.

FIG. 2 illustrates an example of a network architecture 200 (e.g., a disaggregated base station architecture, a disaggregated RAN architecture) that supports techniques for wireless communications using multiple RATs in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable at least portions of a DU 165-*a* and a CU 160-*a* to be implemented in a cloud-based RAN architecture, such as a vRAN architecture implemented in a service-based network 220.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, virtualized network entities 105 may provide in which one or more services, core network, and RAN functions that are merged such that a same entity may provide such functions. In some cases, upper layer scheduling functionalities, such as functions of DUs 165-*a* and CUs 160-*a* may be effectively implemented via software at service-based network 220 that may provide a cloud virtualized entity 215 for CU 160-*a* and optionally one or more functions of DUs 165-*a*, which may communicate with service-based network 220 via backhaul communication links 120-*b*. Further, in some implementations, the SMO 180-*a*, service-based network 220, or both, may communicate with components of multiple different RANs that use different RATs (e.g., a 5G RAN and a 6G RAN). In accordance with techniques as discussed herein, scheduling decisions across different network functionalities may be coordinated to provide for multi-RAT carrier aggregation, multi-RAT dual connectivity, or both. For example, a UE 115-*a* could be connected to 5G capable and 6G capable RUs 170-*a* which are controlled by effectively a single DU 165-*a* or coordinated DUs 165-*a*. Further, in some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
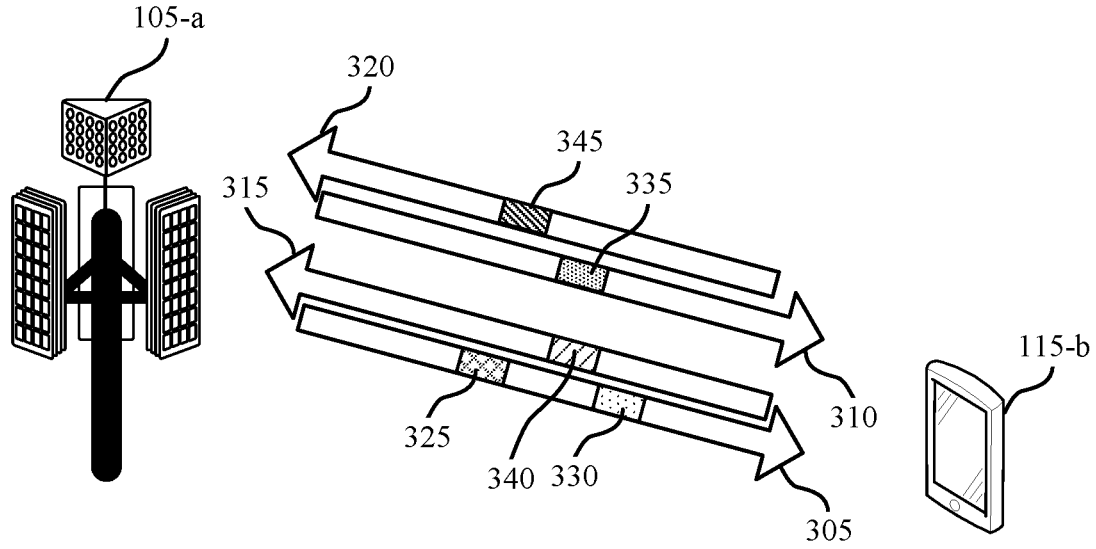
FIGS. 3 through 5 illustrate examples of wireless communications systems that support techniques for wireless communications using multiple RATs in accordance with one or more aspects of the present disclosure.

FIG. 3 illustrates an example of a wireless communications system 300 that supports techniques for wireless communications using multiple RATs in accordance with one or more aspects of the present disclosure. In some examples, wireless communications system 300 may implement aspects of wireless communications system 100. In this example, wireless communications system 300 includes a network entity 105-*a* and a UE 115-*b*, which may be examples of corresponding devices as discussed with respect to FIGS. 1 and 2.

In this example, network entity 105-*a* may provide scheduling functions for a carrier aggregation configuration in which UE 115-*b* may be configured with a first downlink CC 305 and a second downlink CC 310, and a first uplink CC 315 and a second uplink CC 320. While two uplink CCs and two downlink CCs are illustrated in FIG. 3, it is to be understood that techniques discussed herein are applicable to any number of uplink CCs or downlink CCs, and in which a quantity of uplink CCs may be different than a quantity of downlink CCs. In some implementations, the first downlink CC 305 may be a PCell, and the first downlink CC 305 and the first uplink CC 315 may operate using a first RAT (e.g., a 5G RAT) and the second downlink CC 310 and the second uplink CC 320 may be SCells that operate using a second RAT (e.g. a 6G RAT). While each RAT has one uplink and one downlink CC in this example, in other cases each RAT may have multiple uplink and/or downlink CCs, and different RATs may have different numbers of uplink and/or downlink CCs.

In the example of FIG. 3, network entity 105-*a* may provide scheduling functions for each CC. In some implementations, the network entity 105-*a* may include a cloud virtualized entity 215 and two or more RUs 170 in which at least one RU provides communications for the first RAT and at least one RU provides communications for the second RAT. The network entity 105-*a* may provide a carrier aggregation configuration 325 to the UE 115-*b* via the first downlink CC 305, that may configure the CCs 305-320 in the carrier aggregation configuration at the UE 115-*b*. In accordance with aspects discussed herein, the network entity 105-*a* may include or be in communications with (e.g., via a fronthaul communication link 168) a cloud virtualized entity that may provide a same MAC entity that schedules each of the CCs 305-320. For example, the MAC entity may communicate with both a 5G RAN and a 6G RAN and may receive information, for each RAN, related to an amount of data to be communicated between the UE 115-*b* and the network entity 105-*a*, one or more services associated with the data, or any combinations thereof. The MAC entity may schedule communications via the different CCs 305-320 based on this information. In the example illustrated in FIG. 3, a first downlink transmission 330 may be scheduled using the first downlink CC 305, a second downlink transmission 335 may be scheduled using the second downlink CC 310, a first uplink transmission 340 may be scheduled using the first uplink CC 315, and a second uplink transmission 345 may be scheduled using the second uplink CC 320.

In some cases, the CCs 305-320 may be configured as a first cell group. In some cases, different carriers may be configured for carrier aggregation or DC based on whether the upper layer functionalities may be coordinated and the timelines for such coordination as compared to dynamic lower layer scheduling timelines. Examples of DC configurations for different carriers or cell groups are discussed in more detail with reference to the examples of FIGS. 4 and 5. Carriers configured in different cell groups in a DC configuration have relatively little coordination, which in some cases may be or semi-statically configured (e.g., for power control), and the carriers may have independent scheduling in which carriers of different DC cell groups do not have scheduling dependency. Thus, in such DC configurations, physical layer operations may independent across cell groups except for power control in some situations. For power control across cell groups, depending on the mode of operation, there might be dependence across groups, as discussed in more detail with reference to the examples of FIGS. 4 and 5. In contrast, for a carrier aggregation configuration such as illustrated in FIG. 3, carriers that use different RATs may have coordinated scheduling and power control through the scheduling entity (e.g., MAC entity) that provides physical layer operations for both RATs (e.g., scheduling and power control operations).

In further examples discussed herein, a mixed-mode carrier aggregation/DC operation may be implemented, in which operation is according to a carrier aggregation configuration if coordination timelines between RATs are faster or similar to scheduling timelines for the data to be communicated, and in which operation is according to a DC configuration. In such mixed-mode operations, DC or carrier aggregation operations across carriers may be dependent on a specific services or operations of the different carriers, corresponding timelines of the different carriers, and how closely the scheduling entity can coordinate scheduling of the different RATs. In some cases, the relation between coordination timeline and scheduling timelines may be service dependent or operation dependent (e.g., eMBB services that are not latency sensitive may be tolerant of a longer latency until the scheduling coordination messages are available and thus carrier aggregation operation may be implemented, whereas URLLC services may be delay intolerant resulting in closer scheduling coordination to achieve timelines and thus DC operation may be implemented when one or more carriers have an associated service priority that corresponds to URLLC).

With reference to the carrier aggregation configuration of FIG. 3, the network entity 105-*a* may have an associated scheduling entity that is able to coordinate scheduling across both RATs within a scheduling timeline associated with services provided by each RAT. In some cases, the carrier aggregation configuration 325 may provide information for each CC 305-320 that indicates which RAT is to be used. In other cases, the carrier aggregation configuration 325 may provide a BWP level configuration, in which different BWPs are associated with different RATs, and whether a CC 305-320 uses the first RAT or the second RAT is dependent upon which BWP the CC 305-320 is configured with. Thus, in this example, the first downlink CC 305 and the first uplink CC 315 may each be associated with a BWP that is configured for the first RAT, and the second downlink CC 310 and the second uplink CC 320 may each be associated with a BWP that is configured for the second RAT. Such BWP-based configurations may provide a flexible way to switch a carrier back and forth across RATs as needed, and may provide additional flexibility to a scheduler based on a particular blend of data that is to be transmitted at different points in time. In other cases, the configuration of the CCs 305-320 with a corresponding RAT may be provided via control information (e.g., via a physical downlink control channel (PDCCH)), via a control resource set (CORESET), via downlink control information (DCI), or any combinations thereof. In some cases, configuration via PDCCH/CORESET/DCI may be provided on a shared carrier where some physical layer channels (e.g., PDDCH) may follow a structure for one RAT (e.g., a 5G physical channel structure) and other physical layer channels may follow a structure for a different RAT.

In some implementations, uplink power control for the first uplink CC 315 and the second uplink CC 320 may be provided in which a total amount of available power (e.g., $P_{CMAX}$) may be allocated among carriers based at least on part on one or more of a configured allocation, a priority associated with a corresponding RAT, a service type of communications (e.g., based on an indicator associated with a service that is provided with scheduling information for the communications), a priority of services of each carrier (e.g., based on an indicator of priority that is provided with scheduling information for the communications), a channel type and content of data to be transmitted on each carrier, a waveform used by each carrier, or any combinations thereof could be done similar to 5G CA power control; the additional aspects provided for the last power control option of DC in the preceding slide could also be considered. For example, a first uplink power for the first uplink CC 315 may be determined based on the first uplink CC 315 having higher priority communications (e.g., communications having a high priority indication such as associated with URLLC communications) than the second uplink CC 320, and a second uplink power for the second uplink CC 320 may be scaled based on the first uplink power and a total amount of available uplink power available for the aggregated carriers. Further, in some cases the scheduling entity may identify that both uplink data and downlink data are present for a time period, and an uplink/downlink prioritization for conflict resolution for whether to schedule uplink or downlink may be based at least in part on parameters associated with each carrier such as the RAT, a service type, a priority of the communications, a channel type (e.g., PUCCH or PUSCH) and content (e.g., ACK/NACK indications, measurement report, etc.), a waveform, or any combinations thereof. In some cases, the scheduling entity may perform such conflict resolution based on the one or more parameters and allocate resources for the CCs 305-320 accordingly.

In some cases, the UE 115-*b* may transmit feedback information, such as HARQ ACK/NACK feedback, where such feedback information may be determined for both RATs based on associated communications of each respective RAT. In some cases, the feedback information may be provided per RAT (e.g., separate feedback information is provided for each RAT), or may be multiplexed across RATs (e.g., a single feedback information transmission may include HARQ ACK/NACK information for both RATs). In some cases, whether feedback information is provided separately for each RAT or multiplexed across RATs may be based at least in part on a codebook type for the feedback information (e.g., a HARQ codebook used for providing feedback information), waveforms and formats for the channels carrying the feedback information, priorities of the associated communications, services provided by each RAT, or any combinations thereof. For example, both RATs may provide lower priority communications (e.g., eMBB communications) and feedback information may be provided in a multiplexed manner, or one RAT may provide higher priority communications (e.g., URLLC communications) and feedback information may be provided separately per RAT. Additionally, or alternatively, data, uplink control information, or both may be multiplexed or provided separately per RAT based on the same considerations as discussed with respect to feedback information.

In some implementations, triggering events for various different operations may be per-RAT triggering events, or across-RAT triggering events. For example, a sounding reference signal (SRS) may be triggered through per-RAT triggering (e.g., SRS for each RAT is triggered separately) or across-RAT triggering (e.g., a trigger received on one RAT indicates SRS is to be transmitted on both RATs, or a trigger received from one RAT may indicate SRS is to be transmitted on the other RAT). Similarly, other triggering events may be per-RAT or across-RAT, such as SCell activation or deactivation, semi-persistent scheduling (SPS) activation or deactivation, configured grant (CG) uplink transmission activation or deactivation, power saving indications (e.g., PDCCH skipping, dormancy operation, wake up signals (WUSs)), or any combinations thereof. For example, DCI activate or deactivate operations for both and 6G carriers or BWPs may be provided from a 6G carrier or BWP, in cases where cross-RAT triggering events are configured. In some cases, cross-RAT triggering may be joint (e.g., a trigger on a 5G carrier may indicate a behavior/operation applied to both 5G and 6G carriers/BWPs) or separate (e.g., a trigger on a 5G carrier indicating a behavior/operation for a 6G carrier). In other examples, triggering may be provided per-RAT and not per-carrier (e.g., all carriers or BWPs associated with a RAT may have events triggered by a single triggering event for the RAT). In still other examples, a WUS may wake-up the UE 115-*b* or a go-to-sleep (GTS) indication may trigger a low power mode on all carriers irrespective of the associated RAT, or a subset of carriers of the same, different or both RATs. In some cases, per-RAT or across-RAT triggering events may be applied irrespective of a triggering container that provides the associated trigger (e.g., DCI or MAC-CE), or may be dependent on the type of the container (e.g., triggering events provided via DCI are per-RAT and triggering events provided via MAC-CE are across-RAT).

In some cases, the UE 115-*b* may transmit requests for uplink resources in a scheduling request (SR) communications. In some implementations SRs may provide requests for uplink resources per-RAT or across RATs. For example, a SR for 5G (e.g., provided via the first uplink CC 315) may indicate a request for 5G uplink resources, and a SR for 6G (e.g., provided via the second uplink CC 320) may indicate a request for 6G uplink resources. In other cases, a shared SR may indicate a request for either 5G or 6G uplink resources, and the scheduling entity may provide a resource allocation based on which RAT would provide the most efficient communications (e.g., based on load balancing between uplink carriers, transmit power associated with the uplink carriers, priority of the associated communications or service, and the like). In some cases, cross-carrier or cross-BWP scheduling may be provided per RAT or across RATs.

In some implementations, at the MAC layer, logical channel (LCH) prioritization may take the associated RAT into account explicitly or implicitly (e.g., via waveform type), and logical channels might be associated with only one RAT or multiple RATs (e.g., 5G only, 6G only, or both). In some cases, logical channels may be associated with different services (e.g., 5G sensing vs. 6G ML measurement/data transfer), and prioritization may be based on the associated services. In some cases, the mapping of data from a LCH to physical layer channels may be separate for each RAT, or may apply across RATs.

In some implementations, UE 115-b may report one or more capabilities to the network entity 105-a, and capability reporting may be per-RAT or across RATs. Further, in some cases, a first subset of features may be reported per-RAT while a second subset of featured may be reported across RATs. For example, the UE 115-b may provide a capability report that indicates support of feature X for 5G, and support of feature X for 6G, and support of feature X for 5G+6G. The scheduling entity may then schedule communications in accordance with the reported UE 115-b capability.

In some implementations, discontinuous reception (DRX) procedures may be configured per-RAT or across RATs. In cases where DRX is configured across RATs and in cases where multiple DRX configurations are allowed, each DRX group may have carriers from one RAT or both RATs.

Figure 4:
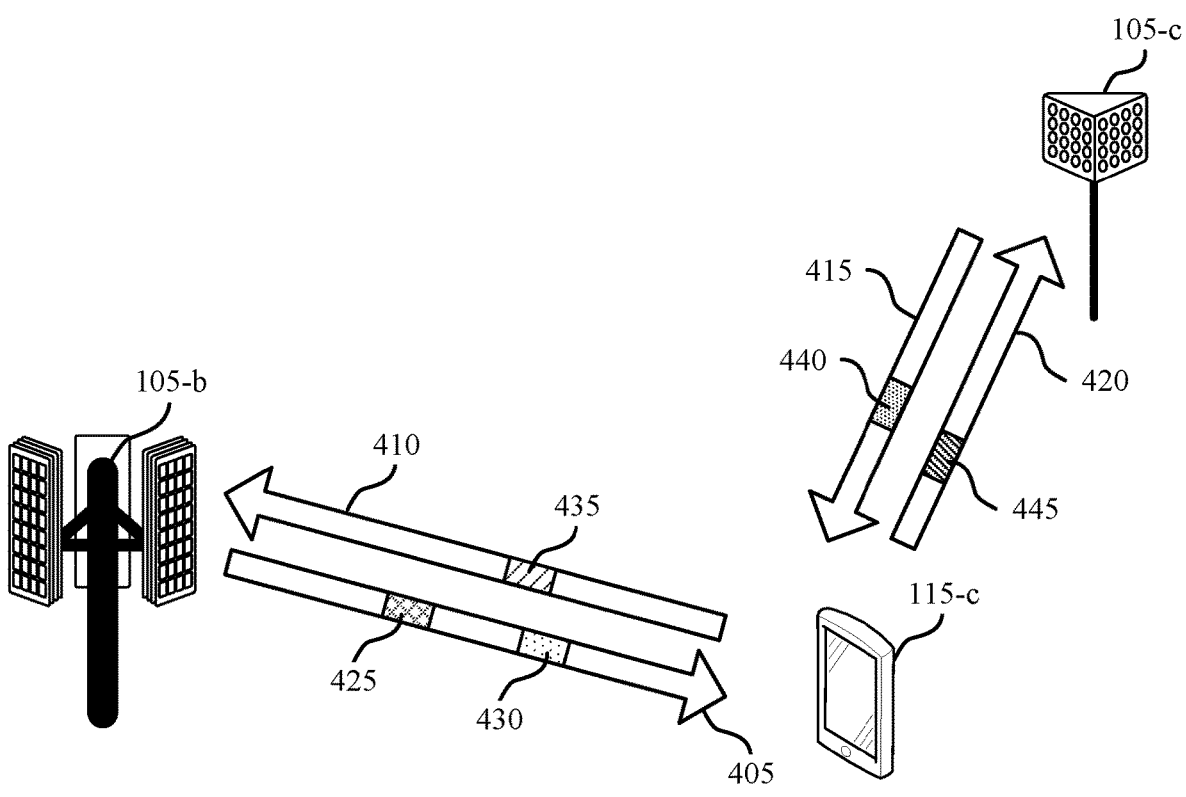

FIG. 4 illustrates another example of a wireless communications system 400 that supports techniques for wireless communications using multiple RATs in accordance with one or more aspects of the present disclosure. In some examples, wireless communications system 400 may implement aspects of wireless communications system 100 or 300. In this example, wireless communications system 400 includes a first network entity 105-b, a second network entity 105-c, and a UE 115-c, which may be examples of corresponding devices as discussed with respect to FIGS. 1 through 3.

In this example, the first network entity 105-b may serve a first cell group that includes a first downlink carrier 405 and a first uplink carrier 410. The second network entity 105-c, according to a DC configuration 425, may serve a second cell group that includes a second downlink carrier 415 and a second uplink carrier 420. In some cases, separate scheduling entities (e.g., separate MAC entities associated with the first network entity 105-b and the second network entity 105-c) may provide scheduling functions for the first cell group and the second cell group. While one uplink carrier and one downlink carrier for each cell group are illustrated in FIG. 4, it is to be understood that techniques discussed herein are applicable to any number of uplink or downlink carriers per cell group. In some implementations, the first downlink carrier 405 and the first uplink carrier 410 may operate using a first RAT (e.g., a 5G RAT) and the second downlink carrier 415 and the second uplink carrier 420 may operate using a second RAT (e.g. a 6G RAT).

As indicated, in this example, separate scheduling entities may provide scheduling functions for each cell group. In some implementations, similarly as discussed with reference to FIG. 3, the scheduling entity may include a cloud virtualized entity 215 and two or more RUs 170 in which at least one RU provides communications for the first RAT and at least one RU provides communications for the second RAT. However, in this example, the scheduling entity may be unable to provide coordination for scheduling that meets timelines of the different RATs to support carrier aggregation for the carriers of each cell group, and the DC configuration 425 may indicate the separate cell groups. Thus, in such cases, a same MAC entity may provide scheduling for each cell group, and may provide scheduling information separately for each of the first network entity 105-b and the second network entity 105-c. The MAC entity, or MAC entities, may schedule communications via the different carriers 405-320, which may include a first downlink transmission 430 using the first downlink carrier 405, a first uplink transmission 435 using the first uplink carrier 410, a second downlink transmission 440 using the second downlink carrier 415, and a second uplink transmission 445 using the second uplink carrier 420.

In accordance with various aspects discussed herein, power control techniques for DC configurations may be provided for different cell groups that are associated with different RATs. Such power control techniques may include dynamic power control or semi-static power control. In some implementations, semi-static power control may be implemented across cell groups in which a maximum transmit power of each cell group is provided such that a total transmit power does not exceed a maximum transmit power supported by the UE 115-c (e.g., $P_{CG1}+P_{CG2} \leq P_{tot}$), and power control is performed independently across cell groups based on the associated maximum transmit power of the cell group. In implementations that use dynamic power control, one carrier or cell group may be identified as having priority and may receive a transmit power that corresponds to a computed transmit power, and the other carrier or cell group may have a transmit power that is scaled down to provide a total transmit power that does not exceed a maximum transmit power for the UE 115-c. In some cases, a carrier or cell group may be identified as having priority based on timelines associated with communications. For example, in cases where one cell group (e.g., a cell group associated with a 4G RAT having a n+4 timeline between receipt of a grant in subframe n to a transmission in subframe n+4) has consistently longer timelines than the other cell group (e.g., a cell group associated with a 5G RAT having configurable N1/N2 processing times that are consistently shorter than the n+4 timeline), the cell group with the longer timelines may use a computed transmit power and the other cell group may have a scaled down transmit power when a total power would exceed the UE 115-c maximum transmit power.

In other cases, such as where the first cell group is associated with a 5G RAT and the second cell group is associated with a 6G RAT, associated timelines of one cell group may not be consistently longer than timelines of the other cell group. For example, communications using the first cell group may be associated with higher priority transmissions (e.g., URLLC communications) that communications using the second cell group (e.g., eMBB communications), and timelines for the first cell group may be shorter than timelines of the second cell group (e.g., N1/N2 processing times for high priority communications of the first RAT may be shorter than N1/N2 processing times for lower priority communications of the second RAT). However, in other instances, the second cell group may be associated with higher priority communications than the first cell group, and may have corresponding timelines that are shorter than those of the first cell group. As a result, it may be undesirable to limit the transmission power of one RAT in favor of the other RAT at all times.

In some implementations, dynamic power control for the first cell group and the second cell group may be used where one cell group is always prioritized over the other. For example, a 5G cell group may be prioritized over a 6G cell group, or vice-versa. In some cases, one cell group may be prioritized based on expected services and associated requirements. In other implementations, dynamic power control may provide priorities for different carriers based on use cases, priorities, services, or any combinations thereof. In such implementations, power scaling is not necessarily for one cell group, and instead actual services may be considered. For example, 5G high priority transmissions (e.g., URLLC) may have priority over 6G low priority transmissions (e.g., eMBB); or data transmissions may have priority over transmissions for positioning or sensing. Numerous other examples for prioritization may be used for dynamic power control, and these described examples are provided for purposes of discussion and illustration. In some cases, priorities may be visible to the physical layer or may be dependent on the logical channels in the MAC layer. In some cases, additionally or alternatively, prioritization may be based on waveform type, where some services may be tied to specific waveforms implicitly (e.g., CP-OFDM used for data may have higher priority than frequency-modulated continuous wave (FMCW) used for sensing). In further cases, additionally or alternatively, channel types (e.g., PUSCH or PUCCH), contents of communications, or any combinations thereof, may be used to determine prioritization of the cell group or carrier.

Figure 5:
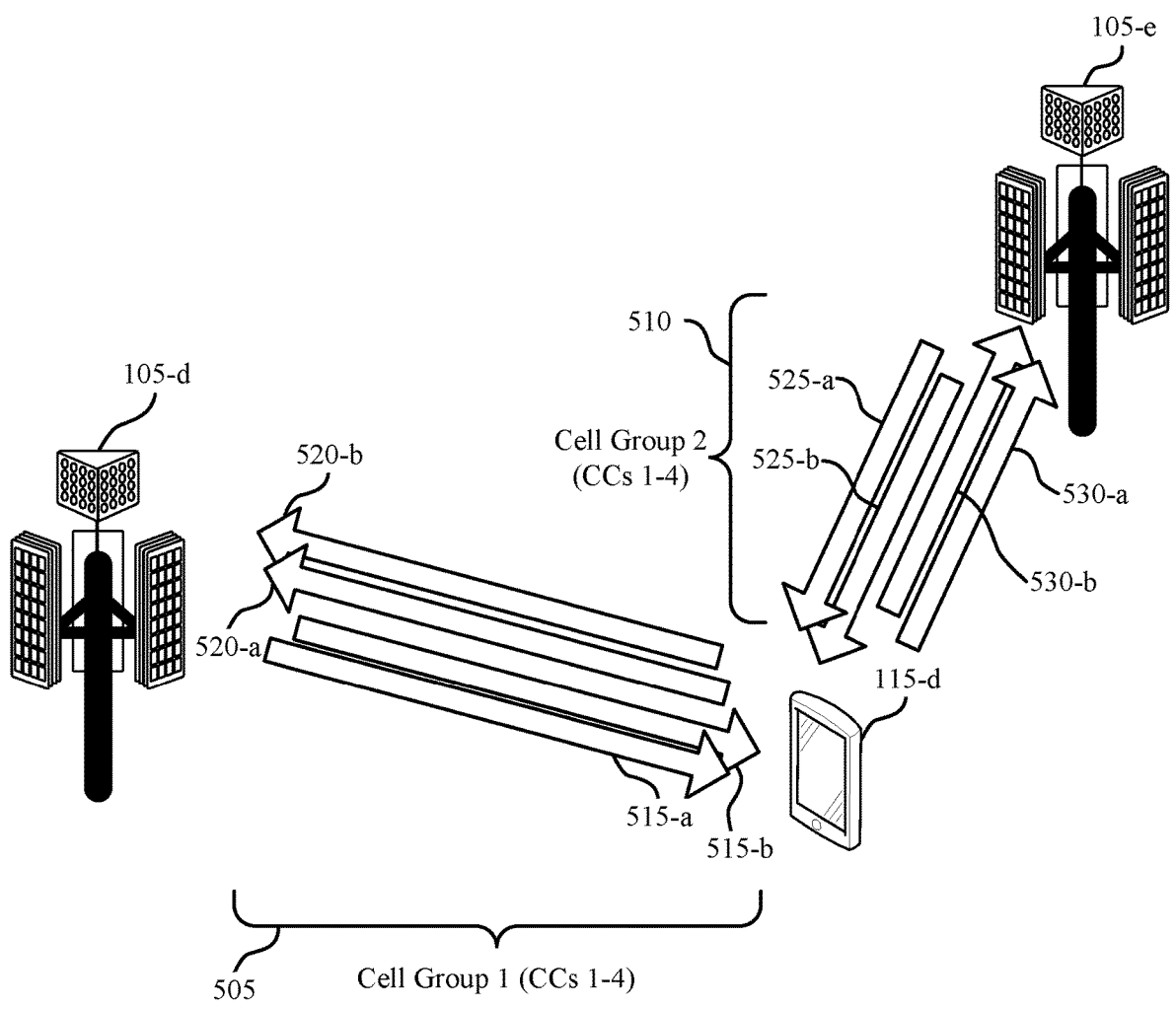

FIG. 5 illustrates another example of a wireless communications system 500 that supports techniques for wireless communications using multiple RATs in accordance with one or more aspects of the present disclosure. In some examples, wireless communications system 500 may implement aspects of wireless communications system 100, 300, or 400. In this example, wireless communications system 500 includes a first network entity 105-d, a second network entity 105-e, and a UE 115-d, which may be examples of corresponding devices as discussed with respect to FIGS. 1 through 4.

In this example, the first network entity 105-d may serve a first cell group 505 and the second network entity 105-e may serve a second cell group 510. In this example, the first cell group 505 may have a carrier aggregation configuration that includes a first downlink CC 515-a, a second downlink CC 515-b, a first uplink CC 520-a, and a second uplink CC 520-b. The second network entity 105-e, according to a DC configuration, may serve the second cell group 510 that includes a third downlink CC 525-a, a fourth downlink CC 525-b, a third uplink CC 530-a, and as fourth uplink CC 530-b. In some cases, different carriers within each cell group 505 and 510 may be associated with different RATs. For example, the first downlink CC 515-a and the first uplink CC 520-a may be provided using a first RAT (e.g., a 5G RAT), and the second downlink CC 515-b and the second uplink CC 520-b may be provided using a second RAT (e.g., a 6G RAT). Thus, the wireless communications system 500 of this example may provide a mixed-mode carrier aggregation and dual connectivity configuration.

In some implementations, under such a mixed-mode configuration, the UE 115-d and network entities 105 may perform some operations using carrier aggregation techniques and other operations using DC techniques. For example, in traditional carrier aggregation, a group of carriers may be semi-statically aggregated according to a carrier aggregation configuration. Similarly, in traditional DC configurations, two groups of independent carriers may be configured formed semi-statically, and within each group carriers may aggregated in accordance with carrier aggregation techniques. In accordance with some aspects, the mixed-mode configuration illustrated in FIG. 5 may provide cell groups that are flexible and can change dynamically. In some implementations, the UE 115-d may be indicated with the transmissions or receptions for a first RAT or a second RAT, based on a carrier or BWP configuration. In some cases, carriers or BWPs of the first RAT, and carriers or BWPs of the second RAT can be included in the first cell group 505 or the second cell group 510 based at least in part on one or more parameters associated therewith, such as physical layer properties as discussed herein (e.g., associated priority or service, etc.).

For example, four carriers may be provided in which two of the carriers are provided using the first RAT (e.g., CC0 and CC1 are 5G carriers), and the other two carriers are provided using the second RAT (e.g., CC2 and CC3 are 6G carriers). In such a configuration, a first slot with a lower priority transmission (e.g., eMBB) may be scheduled on all four carriers, and in such a case the UE 115-d may consider these carriers as aggregated and perform HARQ feedback, multiplexing, prioritization, power control, and the like, based on carrier aggregation. In a second slot, one CC (e.g., CC2) may be scheduled with a high priority communication (e.g., a 6G URLLC communication), and the remaining CCs (e.g., CC0, CC1, CC3) may be scheduled with lower priority communications (e.g., eMBB communications). In such a case, CC0, CC1 and CC3 may be considered in the first cell group 505, and CC2 in a separate second cell group 510. In such a case, DC is used across the two groups, and carrier aggregation is used across CC0, CC1, and CC3 (e.g., power control across CC0/CC1/CC3 and CC2 is based on the adopted mode for DC). While this example, illustrates cell grouping according to different services, such cell grouping may be performed based on different physical layer or MAC layer indications, channels, or contents as well. In some cases, such a mixed mode may be provided based on whether the schedulers for each RAT can coordinate their transmissions closely enough to provide carrier aggregation or not (in which case DC may be used), which may be dependent on how fast the coordination is relative to overall latency requirements of the packets that are transmitted. For example, for eMBB versus URLLC, schedulers may be able to coordinate in a carrier aggregation-like fashion for the transmission of eMBB packets (e.g., which are more delay tolerant), but may not be able to coordinate as fast as needed for URLLC.

In further implementations, multi-RAT-based BWP switching may be used in conjunction with any of the examples of FIGS. 3 through 5. In such cases, different BWPs may be used to provide different services (e.g., 6G eMBB data, 5G URLLC, 5G sidelink, narrowband IoT, and the like), and different services may be enabled on a same CC for the same UE 115 in a TDM manner, or may be enabled concurrently on different CCs. In some cases, a BWP switch for a CC (e.g., based on a service of the CC) may indicate an inter-RAT switch. Additionally, in some implementations, multi-RAT synchronous DC (SDC) may be configured, in which inter-RAT switching for one or more carriers may be based on time-domain periods. In such cases, timing synchronization may be provided (e.g., up to symbol boundary) and multiple different cells available to serve a UE may have such timing synchronization. When synchronization across carriers of different RATs is available (e.g., 5G/6G synchronization up to symbol boundary), slot boundaries may be aligned (e.g., with some UE assistance to feedback different timing advance (TA) values). In such cases, although common scheduling may not be provided, conflicts between RATs can be avoided via slot prescheduling across RATs. For example, for a quantity of slots (e.g., every 10 slots), two RATs can determine a pattern of scheduling in the slots (e.g., for 10 slots, the pattern of scheduling may be 5G, 5G, 5G, 6G, 6G, 5G, 5G, 5G, 6G, 6G). In some cases, the slot scheduling may be based on a buffer status on each RAT, a respective TDD slot pattern, fairness, one or more predetermined rules, or any combinations thereof. In some cases, a pattern may be signaled to UE (e.g., via DCI, one or more MAC-CEs, RRC signaling, or other sequence based DL control) to assist the UE to decode the corresponding grant. Such a pattern may be provided to indicate which RAT may potentially be used for downlink and uplink communications over a group of time-domain resources (e.g., at a slot or symbol level), which may be applied for both intra-band and inter-band SDC cases. In some cases, a pattern also may be applied to downlink when both RATs are in the same carrier or the downlink throughput envelope is to be shared across two RATs. Prescheduling in the frequency domain, the spatial domain, or both may be performed in addition to or alternatively to time-domain prescheduling. In some cases, such a prescheduling mechanism may be used for spectrum sharing across different network operators, in which different operators are provided with partitions based on load, for example.

Figure 6:
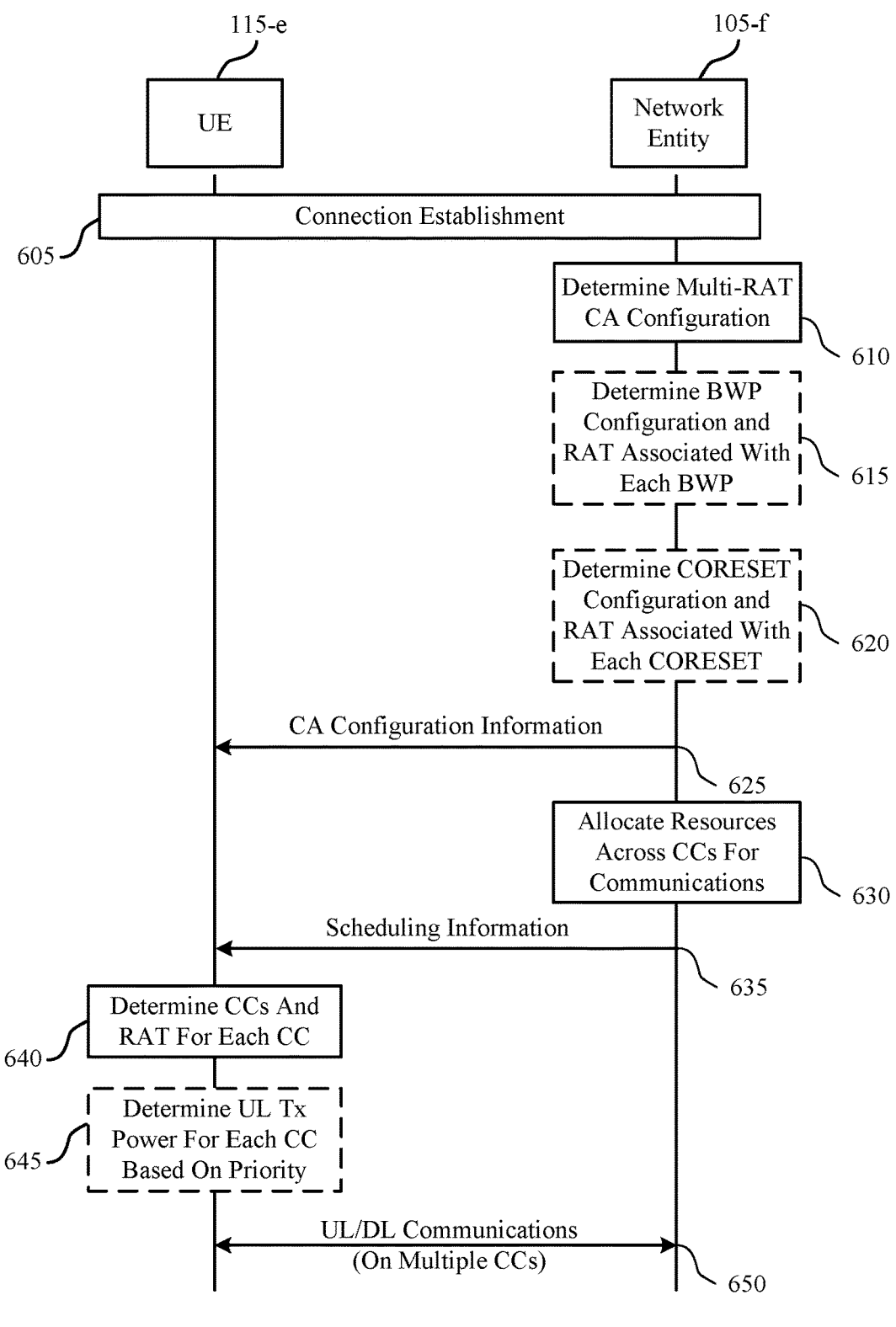
FIGS. 6 through 8 illustrate examples of process flows that support techniques for wireless communications using multiple RATs in accordance with one or more aspects of the present disclosure.

FIG. 6 illustrates an example of a process flow 600 that supports techniques for wireless communications using multiple RATs in accordance with one or more aspects of the present disclosure. In some examples, process flow 600 may implement aspects of wireless communications system 100, 300, 400, or 500. The process flow 600 may include a network entity 105-f and a UE 115-e, which may be examples of the corresponding devices described with reference to FIGS. 1 through 5. In this example, the network entity 105-f may provide a carrier aggregation configuration in which different CCs are provided using different RATs, as discussed herein. Alternative examples of the following may be implemented, where some steps are performed in a different order than described or are not performed at all. In some cases, operations may include additional features not mentioned below, or further operations may be added.

At 605, UE 115-e and network entity 105-f may establish a connection. The connection may be established according to established techniques, such as RRC connection establishment techniques. In some cases, as part of the connection establishment or separately from the connection establishment, the UE 115-e may provide the network entity 105-f with capability information that may indicate a capability for multi-RAT carrier aggregation or multi-RAT DC, or both.

At 610, the network entity 105-f may determine a multi-RAT carrier aggregation configuration for the UE 115-b. In some cases, as discussed herein, the carrier aggregation configuration provide one or more CCs that use a first RAT and one or more other CCs that use a second RAT. In some cases, the multi-RAT carrier aggregation configuration may be determined based on a scheduling entity associated with the network entity 105-f being able to coordinate scheduling for each of the CCs that use the different RATs in the multi-RAT carrier aggregation configuration.

In some cases, at 615, the network entity 105-f optionally may determine a BWP configuration and a RAT associated with each BWP. For example, a first BWP configuration may be associated with a first RAT, and a second BWP configuration may be associated with a second RAT, and thus a CC configured for the first BWP may use the first RAT, and a CC configured for the second BWP may use the second RAT. Further, a CC that uses the first RAT and the first BWP may be switched to use the second BWP, which may also indicate that the CC is to switch from the first RAT to the second RAT. Optionally, at 620, the network entity 105-f may determine a CORESET configuration and a RAT associated with each CORESET, and CCs may be configured for different RATs based on an associated CORESET.

At 625, the network entity 105-f may transmit a carrier aggregation configuration, which may be received at the UE 115-e. The UE 115-e, based on the carrier aggregation configuration, may configure multiple CCs in accordance with the carrier aggregation configuration, in which one or more CCs use the first RAT and one or more UEs use the second RAT. At 630, a scheduling entity (e.g., a MAC entity that provides scheduling for both the first RAT and the second RAT) associated with the network entity 105-f may allocate resources across the configured CCs for communications. At 635, the network entity 105-f may transmit scheduling information to the UE 115-e that indicates the resources allocated for the CCs.

At 640, the UE 115-d may determine the CCs and RAT for each CC, based at least in part on the carrier aggregation configuration and the scheduling information. In some cases, the RAT associated with each CC may be determined based on a BWP of each CC that may be indicated in the scheduling information, in the carrier aggregation configuration, or both. In some cases, the RAT associated with each CC may be based on a priority of communications associated with each CC, a waveform type associated with each CC, a service type associated with each CC, a content of data that is transmitted on each CC, a channel type associated with each CC, or any combinations thereof.

At 645, the UE 115-e, in cases where a uplink resource allocation is provided, optionally may determine an uplink transmit power for each CC based on a priority associated with each CC. The uplink transmit power may be determined dynamically, in some cases, based on the priority of communications associated with each CC, the waveform type associated with each CC, the service type associated with each CC, the content of data that is transmitted on each CC, the channel type associated with each CC, or any combinations thereof. At 650, the UE 115-e and network entity 105-f may transmit and receive uplink and downlink communications on multiple CCs in accordance with the carrier aggregation configuration and scheduling information.

Figure 7:
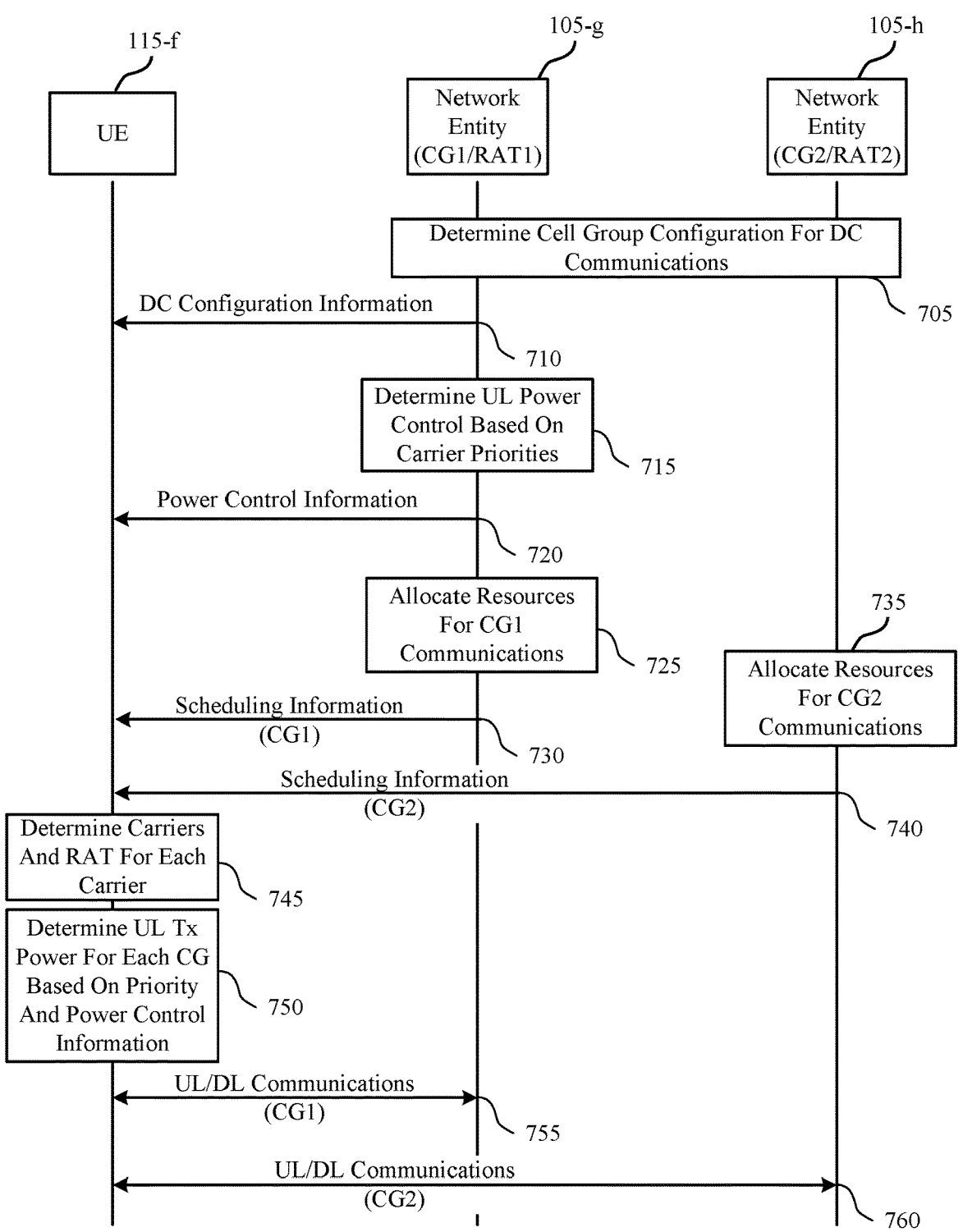

FIG. 7 illustrates an example of a process flow 700 that supports techniques for wireless communications using multiple RATs in accordance with one or more aspects of the present disclosure. In some examples, process flow 700 may implement aspects of wireless communications system 100, 300, 400, or 500. The process flow 700 may include a first network entity 105-g, a second network entity 105-h, and a UE 115-f, which may be examples of the corresponding devices described with reference to FIGS. 1 through 6. In this example, the network entities 105 may provide a DC configuration in which one or more carriers of different cell groups are provided using different RATs, as discussed herein. Alternative examples of the following may be implemented, where some steps are performed in a different order than described or are not performed at all. In some cases, operations may include additional features not mentioned below, or further operations may be added.

At 705, the first network entity 105-g and the second network entity 105-h may determine a cell group configuration for DC communications. In some cases, a scheduling entity (e.g., a same MAC entity) may be associated with the first network entity 105-g and the second network entity 105-h, and may determine that multiple cell groups are to be established using a DC configuration. In some cases, a same scheduling entity may make such a determination. In other cases, separate scheduling entities may be associated with each RAT. At 710, the first network entity 105-*g* may transmit DC configuration information to the UE 115-*f*.

At 715, the first network entity 105-*g* may determine uplink power control for uplink transmissions of the UE 115-*f* based on the DC configuration. At 720, the first network entity 105-*g* may transmit power control information to the UE 115-*f* (e.g., along with an uplink resource allocation for an uplink transmission to the first network entity 105-*g*). In some cases, the second network entity 105-*h* may also determine transmit power control information and provide scheduling information for communications with the second network entity 105-*h*.

At 725, the first network entity 105-*g* may allocate resources for a first cell group associated with the first network entity 105-*g*. At 730, the first network entity 105-*g* may transmit scheduling information to the UE 115-*f* for the first cell group. At 735, the second network entity 105-*h* may allocate resources for a second cell group associated with the second network entity 105-*h*. At 740, the second network entity 105-*h* may transmit scheduling information to the UE 115-*f* for the second cell group.

At 745, the UE 115-*f* may determine carriers and a RAT associated with carrier based on cell group information in the DC configuration. At 750, the UE 115-*f* may determine an uplink transmit power for each carrier and each cell group in accordance with techniques as discussed herein (e.g., based at least in part on a priority associated with the cell group, the power control information, and the scheduling information). At 755, the UE 115-*f* and the first network entity 105-*g* may transmit and receive uplink and downlink communications based on the DC configuration, scheduling information, and determined transmit powers. Similarly, at 760, the UE 115-*f* and the second network entity 105-*h* may transmit and receive uplink and downlink communications based on the DC configuration, scheduling information, and determined transmit powers.

Figure 8:
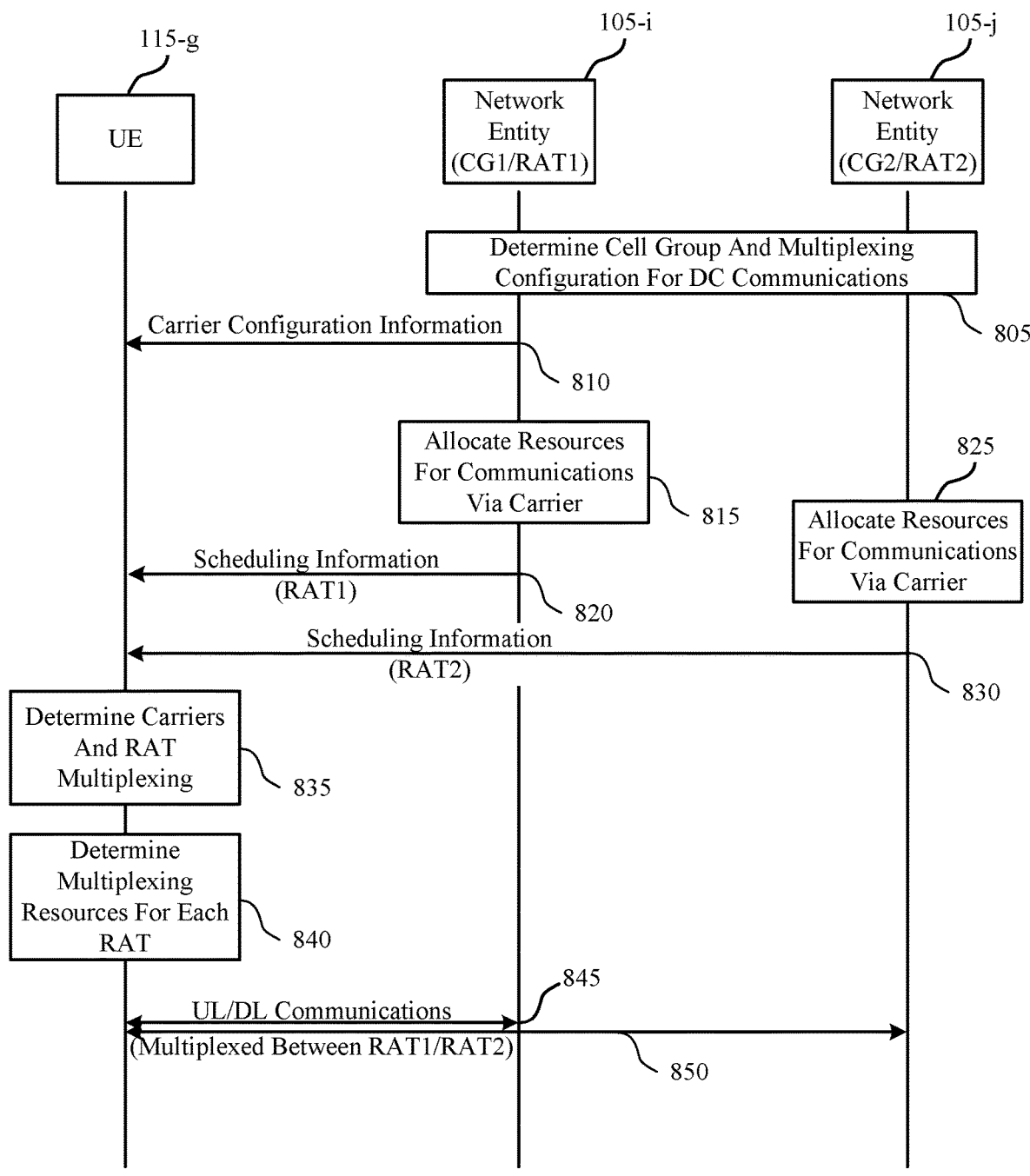

FIG. 8 illustrates an example of a process flow 800 that supports techniques for wireless communications using multiple RATs in accordance with one or more aspects of the present disclosure. In some examples, process flow 800 may implement aspects of wireless communications system 100, 300, 400, or 500. The process flow 800 may include a first network entity 105-*i*, a second network entity 105-*j*, and a UE 115-*g*, which may be examples of the corresponding devices described with reference to FIGS. 1 through 7. In this example, the network entities 105 may provide a multi-RAT communications configuration in which different RATs may be multiplexed on one or more carriers of one or more cell groups, as discussed herein. Alternative examples of the following may be implemented, where some steps are performed in a different order than described or are not performed at all. In some cases, operations may include additional features not mentioned below, or further operations may be added.

At 805, the first network entity 105-*i* and the second network entity 105-*j* may determine a cell group configuration and a RAT multiplexing configuration for DC communications. In some cases, a scheduling entity (e.g., a same MAC entity) may be associated with the first network entity 105-*i* and the second network entity 105-*j*, and may determine that multiple RATs may be used for communications with the UE 115-*g*. As discussed herein, in some cases, a first RAT may be used for communications at the first network entity 105-*i* and a second RAT may be used for communications at the second network entity 105-*j*. Further, time boundaries (e.g. slot boundaries) for communications using the first RAT and the second RAT may be synchronized, and a multiplexing pattern of one or more carriers may be determined in which a subset of resources of a carrier are used for the first RAT and a different subset of resources of the carrier are used for the second RAT. In some cases, a same scheduling entity may make such a determination. In other cases, separate scheduling entities may be associated with each RAT. At 810, the first network entity 105-*i* may transmit carrier configuration information to the UE 115-*g*.

At 815, the first network entity 105-*i* may allocate resources for a carrier in which the communications of the first RAT are multiplexed with communications of the second RAT. At 820, the first network entity 105-*i* may transmit scheduling information to the UE 115-*g* for the first RAT. In some cases, the scheduling information may indicate a subset of resources of the carrier that include communications of the first RAT. At 825, the second network entity 105-*j* may allocate resources for the carrier in which the communications of the second RAT are multiplexed with communications of the first RAT. At 830, the second network entity 105-*j* may transmit scheduling information to the UE 115-*g* for the second RAT. In some cases, the scheduling information may indicate a subset of resources of the carrier that include communications of the second RAT.

At 835, the UE 115-*g* may determine the carrier (and optionally one or more other carriers) for communications and RAT multiplexing associated with the carrier based on the carrier configuration information and the scheduling information. At 840, the UE 115-*g* may multiplexing resources associated with each RAT. At 845, the UE 115-*g* and the first network entity 105-*i* may transmit and receive uplink and downlink communications based on the RAT multiplexing on the carrier. Similarly, at 850, the UE 115-*g* and the second network entity 105-*j* may transmit and receive uplink and downlink communications based on the RAT multiplexing on the carrier.

Figure 9:
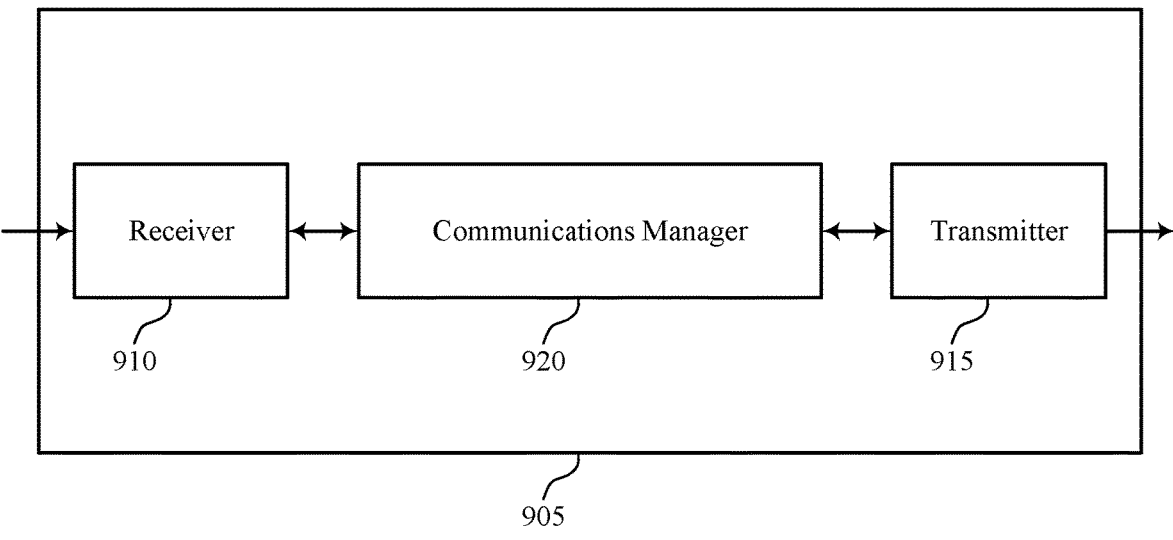
FIGS. 9 and 10 show block diagrams of devices that support techniques for wireless communications using multiple RATs in accordance with one or more aspects of the present disclosure.

FIG. 9 shows a block diagram 900 of a device 905 that supports techniques for wireless communications using multiple RATs in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for wireless communications using multiple RATs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for wireless communications using multiple RATs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for wireless communications using multiple RATs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving carrier aggregation configuration information for a primary component carrier and for a secondary component carrier, where the primary component carrier uses a first RAT and the secondary component carrier uses a second RAT. The communications manager 920 may be configured as or otherwise support a means for communicating, based on the carrier aggregation configuration information, with a first RAN using the primary component carrier and with a second RAN using the secondary component carrier.

Additionally, or alternatively, the communications manager 920 may support wireless communication at a UE in accordance with examples as disclosed herein. For example, the communications manager 920 may be configured as or otherwise support a means for receiving DC configuration information for a first cell group and a second cell group, where the first cell group is served using one or more carriers that use a first RAT and the second cell group is served using one or more carriers that use a second RAT, and where different network entities provide physical layer scheduling information for the first cell group and the second cell group. The communications manager 920 may be configured as or otherwise support a means for receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The communications manager 920 may be configured as or otherwise support a means for transmitting the first uplink transmission using the first carrier concurrently with the second uplink transmission using the second carrier, the first uplink transmission using the first uplink transmit power and the second uplink transmission using the second uplink transmit power.

Additionally, or alternatively, the communications manager 920 may support wireless communication at a UE in accordance with examples as disclosed herein. For example, the communications manager 920 may be configured as or otherwise support a means for receiving DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The communications manager 920 may be configured as or otherwise support a means for communicating with a first RAN using the first carrier and with a second RAN using the second carrier based on a multiplexing configuration that is indicated in the DC configuration information.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for multi-RAT DC communications, carrier aggregation communications, or combinations thereof, in which scheduling flexibility for communications using different RATs may be provided through different carriers that may be associated with different RATs. Such techniques may provide for more efficient resource utilization, enhanced throughput, and enhanced reliability of communications, along with network scheduling flexibility for using different RATs for communications.

Figure 10:
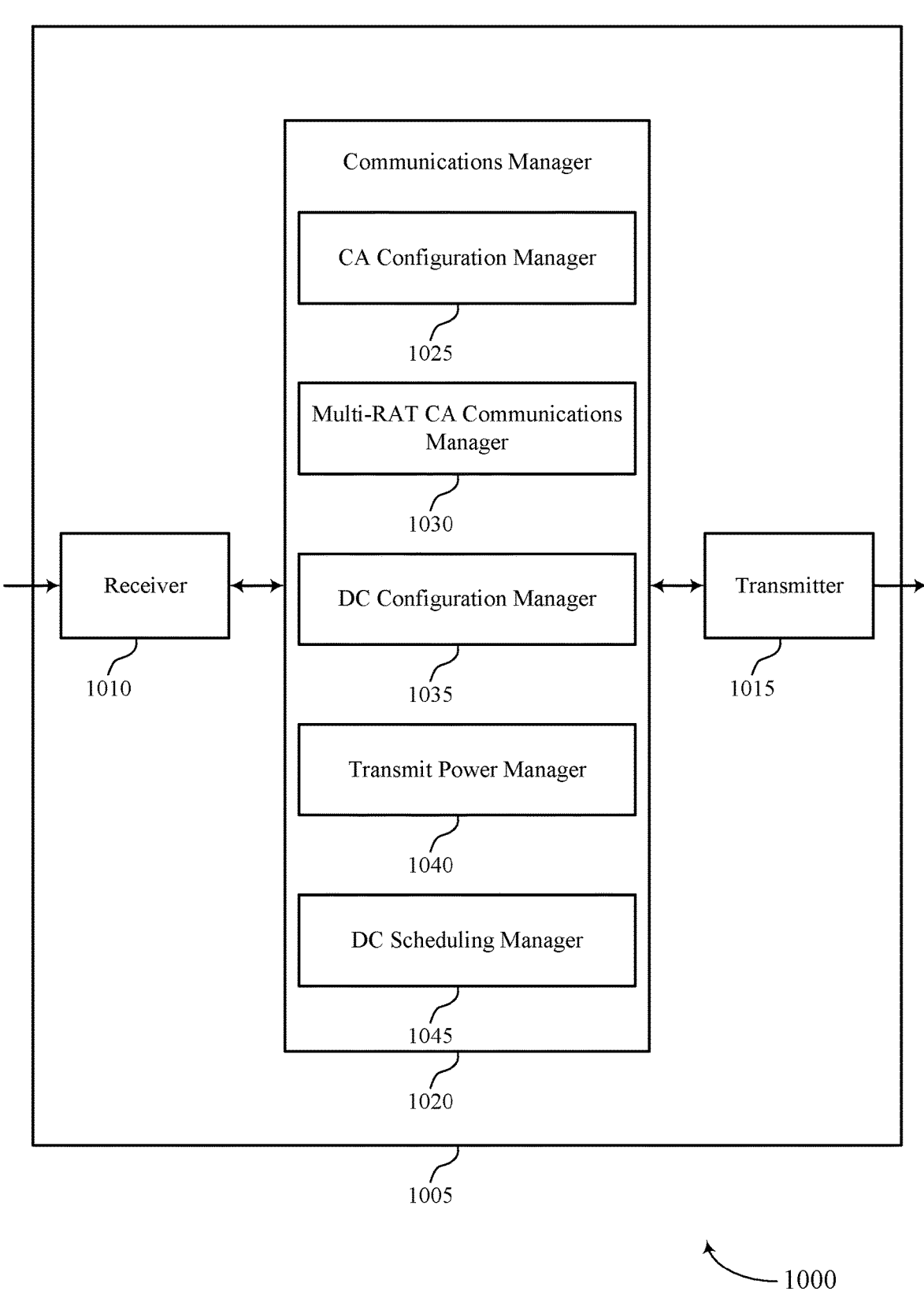

FIG. 10 shows a block diagram 1000 of a device 1005 that supports techniques for wireless communications using multiple RATs in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for wireless communications using multiple RATs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for wireless communications using multiple RATs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for wireless communications using multiple RATs as described herein. For example, the communications manager 1020 may include a CA configuration manager 1025, a multi-RAT CA communications manager 1030, a DC configuration manager 1035, a transmit power manager 1040, a DC scheduling manager 1045, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The CA configuration manager 1025 may be configured as or otherwise support a means for receiving carrier aggregation configuration information for a primary component carrier and for a secondary component carrier, where the primary component carrier uses a first RAT and the secondary component carrier uses a second RAT. The multi-RAT CA communications manager 1030 may be configured as or otherwise support a means for communicating, based on the carrier aggregation configuration information, with a first RAN using the primary component carrier and with a second RAN using the secondary component carrier.

Additionally, or alternatively, the communications manager 1020 may support wireless communication at a UE in accordance with examples as disclosed herein. The DC configuration manager 1035 may be configured as or otherwise support a means for receiving DC configuration information for a first cell group and a second cell group, where the first cell group is served using one or more carriers that use a first RAT and the second cell group is served using one or more carriers that use a second RAT, and where different network entities provide physical layer scheduling information for the first cell group and the second cell group. The transmit power manager 1040 may be configured as or otherwise support a means for receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The DC scheduling manager 1045 may be configured as or otherwise support a means for transmitting the first uplink transmission using the first carrier concurrently with the second uplink transmission using the second carrier, the first uplink transmission using the first uplink transmit power and the second uplink transmission using the second uplink transmit power.

Additionally, or alternatively, the communications manager 1020 may support wireless communication at a UE in accordance with examples as disclosed herein. The DC configuration manager 1035 may be configured as or otherwise support a means for receiving DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The DC scheduling manager 1045 may be configured as or otherwise support a means for communicating with a first RAN using the first carrier and with a second RAN using the second carrier based on a multiplexing configuration that is indicated in the DC configuration information.

Figure 11:
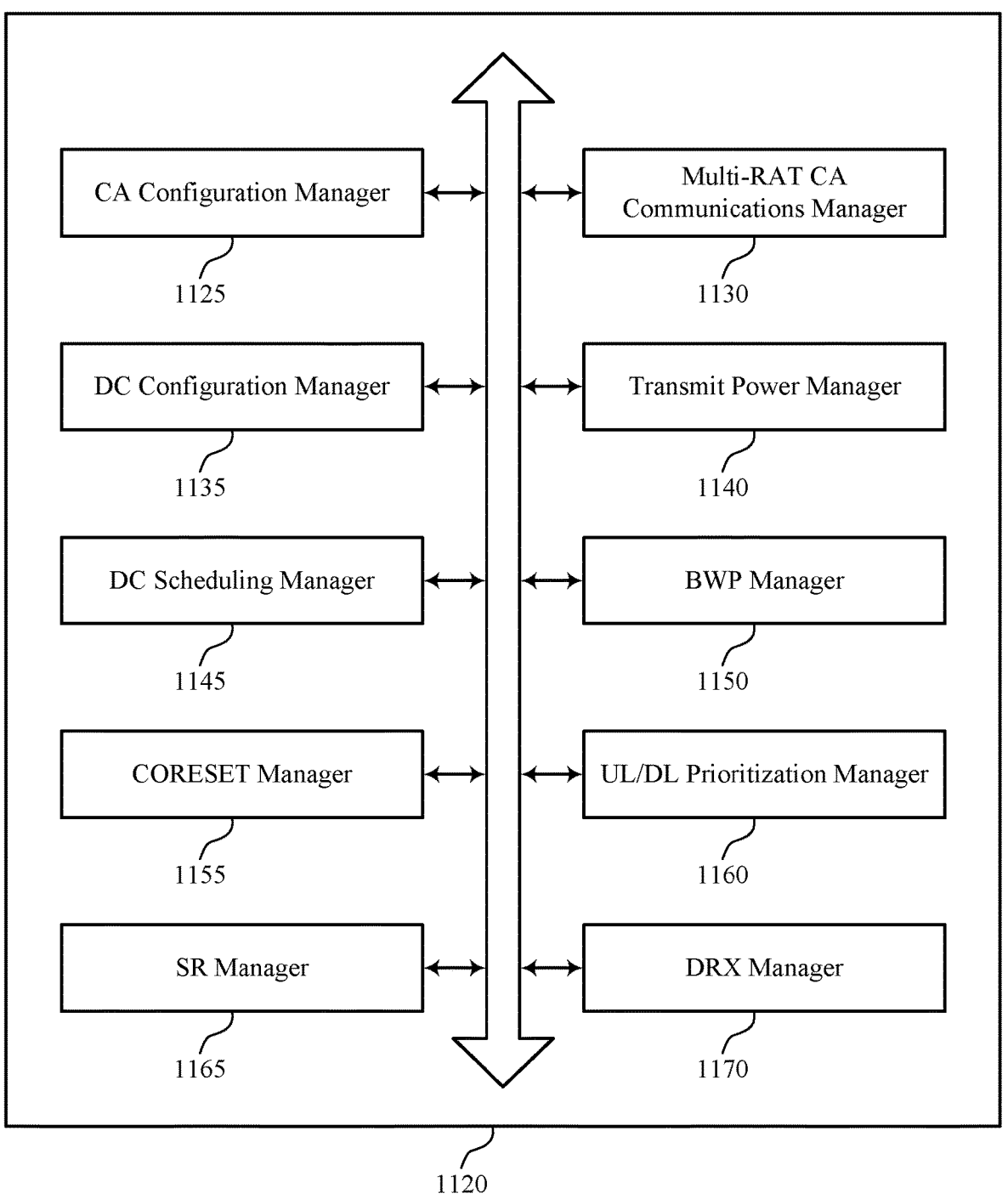
FIG. 11 shows a block diagram of a communications manager that supports techniques for wireless communications using multiple RATs in accordance with one or more aspects of the present disclosure.

FIG. 11 shows a block diagram 1100 of a communications manager 1120 that supports techniques for wireless communications using multiple RATs in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for wireless communications using multiple RATs as described herein. For example, the communications manager 1120 may include a CA configuration manager 1125, a multi-RAT CA communications manager 1130, a DC configuration manager 1135, a transmit power manager 1140, a DC scheduling manager 1145, a BWP manager 1150, a CORE-SET manager 1155, a UL/DL prioritization manager 1160, an SR manager 1165, a DRX manager 1170, or any combination thereof. Each of these components may communicate, directly or indirectly, with one another (e.g., via one or more buses).

The communications manager 1120 may support wireless communication at a UE in accordance with examples as disclosed herein. The CA configuration manager 1125 may be configured as or otherwise support a means for receiving carrier aggregation configuration information for a primary component carrier and for a secondary component carrier, where the primary component carrier uses a first RAT and the secondary component carrier uses a second RAT. The multi-RAT CA communications manager 1130 may be configured as or otherwise support a means for communicating, based on the carrier aggregation configuration information, with a first RAN using the primary component carrier and with a second RAN using the secondary component carrier. In some examples, the first RAT is a fifth generation (5G) RAT and the second RAT is a sixth generation (6G) RAT, and where a same network entity provides physical layer scheduling information for both the primary component carrier and the secondary component carrier.

In some examples, to support receiving the carrier aggregation configuration information, the BWP manager 1150 may be configured as or otherwise support a means for receiving a bandwidth part configuration for a set of multiple bandwidth parts of a channel bandwidth over which the primary component carrier, the secondary component carrier, or both, are configurable to operate. In some examples, to support receiving the carrier aggregation configuration information, the BWP manager 1150 may be configured as or otherwise support a means for where a first bandwidth part of the set of multiple bandwidth parts is associated with the first RAT and a second bandwidth part of the set of multiple bandwidth parts is associated with the second RAT. In some examples, to support receiving the carrier aggregation configuration information, the BWP manager 1150 may be configured as or otherwise support a means for where the primary component carrier is associated with the first RAT based on being configured with the first bandwidth part, and the secondary component carrier is associated with the second RAT based on being configured with the second bandwidth part.

In some examples, to support receiving the carrier aggregation configuration information, the CORESET manager 1155 may be configured as or otherwise support a means for receiving an indication of which of the first RAT or the second RAT is associated with the primary component carrier and the secondary component carrier via one or more of a control channel communication, a control resource set (CORESET) indication associated with each component carrier, where different CORESETs that are associated with different RATs, a downlink control information communication, or any combinations thereof. In some examples, the transmit power manager 1140 may be configured as or otherwise support a means for determining a first uplink transmit power for a first uplink transmission via the primary component carrier and a second uplink transmit power for a second uplink transmission via the secondary component carrier, based on an indication in the carrier aggregation configuration information of which of the first RAT or the second RAT has a higher priority for uplink power control.

In some examples, the UL/DL prioritization manager 1160 may be configured as or otherwise support a means for identifying that both an uplink communication and a downlink communication are to be transmitted via the primary component carrier, the secondary component carrier, or both. In some examples, the UL/DL prioritization manager 1160 may be configured as or otherwise support a means for prioritizing the uplink communication or the downlink communication based on which of the first RAT or the second RAT has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof.

In some examples, the multi-RAT CA communications manager 1130 may be configured as or otherwise support a means for identifying a first uplink transmission to be provided to the first RAN and a second uplink transmission to be provided to the second RAN. In some examples, the multi-RAT CA communications manager 1130 may be configured as or otherwise support a means for determining, based on the carrier aggregation configuration information, to transmit the first uplink transmission via the primary component carrier and the second uplink transmission via the secondary component carrier, or to multiplex the first uplink transmission and the second uplink transmission for transmission via the primary component carrier or the secondary component carrier. In some examples, the determining is based on one or more of a codebook type associated with the first uplink transmission and the second uplink transmission, a waveform of the first uplink transmission and the second uplink transmission, a transmission format of a physical layer channel carrying the first uplink transmission and the second uplink transmission, a priority order of the first RAT and the second RAT, a service type associated with the first uplink transmission and the second uplink transmission, or any combinations thereof. In some examples, the first uplink transmission and the second uplink transmission include one or more of feedback information that indicates whether one or more downlink communications are successfully decoded, uplink control information, uplink shared channel data, or any combinations thereof.

In some examples, the multi-RAT CA communications manager 1130 may be configured as or otherwise support a means for receiving one or more triggers to perform one or more operations associated with the primary component carrier or the secondary component carrier, where the one or more triggers are received separately for each RAT or a single trigger indicates to perform the one or more operations using both the first RAT and the second RAT. In some examples, the one or more operations include one or more of a sounding reference signal transmission, an activation or deactivation of a secondary cell served using the secondary component carrier, a semi-persistent scheduling or configured grant activation or deactivation, a power control procedure, or any combinations thereof. In some examples, the one or more triggers are provided in a downlink control information triggering container or a medium access control (MAC) control element (CE) triggering container, and where each trigger is applied to one or both of the first RAT or the second RAT based on a type of triggering container that provides the one or more triggers. In some examples, the SR manager 1165 may be configured as or otherwise support a means for transmitting a scheduling request via the primary component carrier or the secondary component carrier, where the scheduling request is for resources of the first RAT, the second RAT, or both the first RAT and the second RAT.

In some examples, the BWP manager 1150 may be configured as or otherwise support a means for receiving one or more resource allocations or bandwidth part scheduling indications, where the one or more resource allocations or bandwidth part scheduling indications are provided per RAT or across RATs. In some examples, a logical channel prioritization for two or more logical channels to be provided via the primary component carrier or the secondary component carrier is based on which of the first RAT or the second RAT is associated with the primary component carrier or the secondary component carrier that carries the associated logical channel.

In some examples, the CA configuration manager 1125 may be configured as or otherwise support a means for transmitting a UE capability report that indicates one or more UE capabilities per RAT or across RATs. In some examples, a discontinuous reception configuration for the UE is provided per RAT or across RATs.

In some examples, the primary component carrier and the secondary component carrier are included in a first set of component carriers of a first cell group of a DC configuration of the UE, and where a second set of component carriers are configured in a second cell group of the DC configuration of the UE. In some examples, a first medium access control (MAC) entity provides scheduling information for the first set of component carriers, and a second MAC entity provides scheduling information for the second set of component carriers. In some examples, the primary component carrier and the secondary component carrier are each assigned to the first cell group or the second cell group based on one or more of a type of service associated with each respective component carrier, a physical layer indication or a MAC layer indication associated with each respective component carrier, one or more physical layer channels carried using each respective component carrier, a type of information carried using each respective component carrier, or any combinations thereof. In some examples, a set of multiple BWPs are configured for communications at the UE, each BWP of the set of multiple BWPs associated with one of the first RAT or the second RAT, where different BWPs of the set of multiple BWPs are configured for different services, and where a BWP switch for a carrier indicates that a RAT associated with the carrier is to be switched.

Additionally, or alternatively, the communications manager 1120 may support wireless communication at a UE in accordance with examples as disclosed herein. The DC configuration manager 1135 may be configured as or otherwise support a means for receiving DC configuration information for a first cell group and a second cell group, where the first cell group is served using one or more carriers that use a first RAT and the second cell group is served using one or more carriers that use a second RAT, and where different network entities provide physical layer scheduling information for the first cell group and the second cell group. The transmit power manager 1140 may be configured as or otherwise support a means for receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The DC scheduling manager 1145 may be configured as or otherwise support a means for transmitting the first uplink transmission using the first carrier concurrently with the second uplink transmission using the second carrier, the first uplink transmission using the first uplink transmit power and the second uplink transmission using the second uplink transmit power. In some examples, the DC configuration information indicates carrier prioritization that is based on one or more services that are associated with the first carrier and the second carrier.

In some examples, the transmit power manager 1140 may be configured as or otherwise support a means for determining a power scaling associated with the first carrier and the second carrier based on one or more services associated with each of the first carrier and the second carrier. In some examples, the first carrier and the second carrier are prioritized for uplink power control based on a prioritization provided in the DC configuration information for one or more physical layer services or medium access control layer logical channels and associated services or logical channels provided using the first carrier and the second carrier. In some examples, the first carrier and the second carrier are prioritized for uplink power control based on a waveform type prioritization provided in the DC configuration information and an associated waveform type of the first carrier and the second carrier. In some examples, the first carrier and the second carrier are prioritized for uplink power control based on one or more types of channels or type of data provided using the first carrier and the second carrier.

In some examples, the DC configuration information configures at least the first cell group with two or more component carriers in a carrier aggregation configuration, and where the first cell group includes component carriers associated with different RATs. In some examples, a first medium access control (MAC) entity provides the physical layer scheduling information for each component carrier of the first cell group, and a second MAC entity provides the physical layer scheduling information for each component carrier of the second cell group.

In some examples, the DC configuration manager 1135 may be configured as or otherwise support a means for determining that a first carrier is included in the first cell group or the second cell group based on one or more of a type of service provided using the first carrier, a physical layer or medium access control layer indication associated with the first carrier, one or more channels transmitted via the first carrier, a type of information transmitted via the first carrier, or any combinations thereof. In some examples, a set of multiple bandwidth parts (BWPs) are configured for communications at the UE, each BWP of the set of multiple BWPs associated with one of the first RAT or the second RAT, where different BWPs of the set of multiple BWPs are configured for different services, and where a BWP switch for a carrier indicates that a RAT associated with the carrier is to be switched.

Additionally, or alternatively, the communications manager 1120 may support wireless communication at a UE in accordance with examples as disclosed herein. In some examples, the DC configuration manager 1135 may be configured as or otherwise support a means for receiving DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. In some examples, the DC scheduling manager 1145 may be configured as or otherwise support a means for communicating with a first RAN using the first carrier and with a second RAN using the second carrier based on a multiplexing configuration that is indicated in the DC configuration information. In some examples, the time intervals are slots that are synchronized at slot boundaries used in the first RAN and the second RAN, and where the multiplexing configuration indicates time division multiplexing in the slots.

In some examples, the DC scheduling manager 1145 may be configured as or otherwise support a means for receiving scheduling information for the first cell from a first scheduling entity associated with the first RAN. In some examples, the DC scheduling manager 1145 may be configured as or otherwise support a means for receiving scheduling information for the second cell from a second scheduling entity associated with the second RAN. In some examples, the DC configuration information provides a set of slots in which a first subset of slots are for the first RAN and a second subset of slots are for the second RAN. In some examples, a ratio of a first quantity of slots in the first subset of slots and a second quantity of slots in the second subset of slots is determined based on a buffer status associated with each cell, a TDD slot pattern of each cell, or any combinations thereof.

In some examples, a scheduling pattern of the first subset of slots and the second subset of slots is provided in downlink control information, in a MAC control element, in a downlink signal that indicates a sequence of slots and a corresponding cell, or any combinations thereof. In some examples, the scheduling pattern is applied to uplink and downlink communications for intra-band and inter-band transmissions of each carrier. In some examples, the multi-plexing configuration indicated in the DC configuration information provides frequency domain multiplexing or spatial domain multiplexing. In some examples, the multi-plexing configuration indicated in the DC configuration information provides radio frequency spectrum sharing for two or more operators that operate different RANs using the first RAT, the second RAT, or both.

Figure 12:
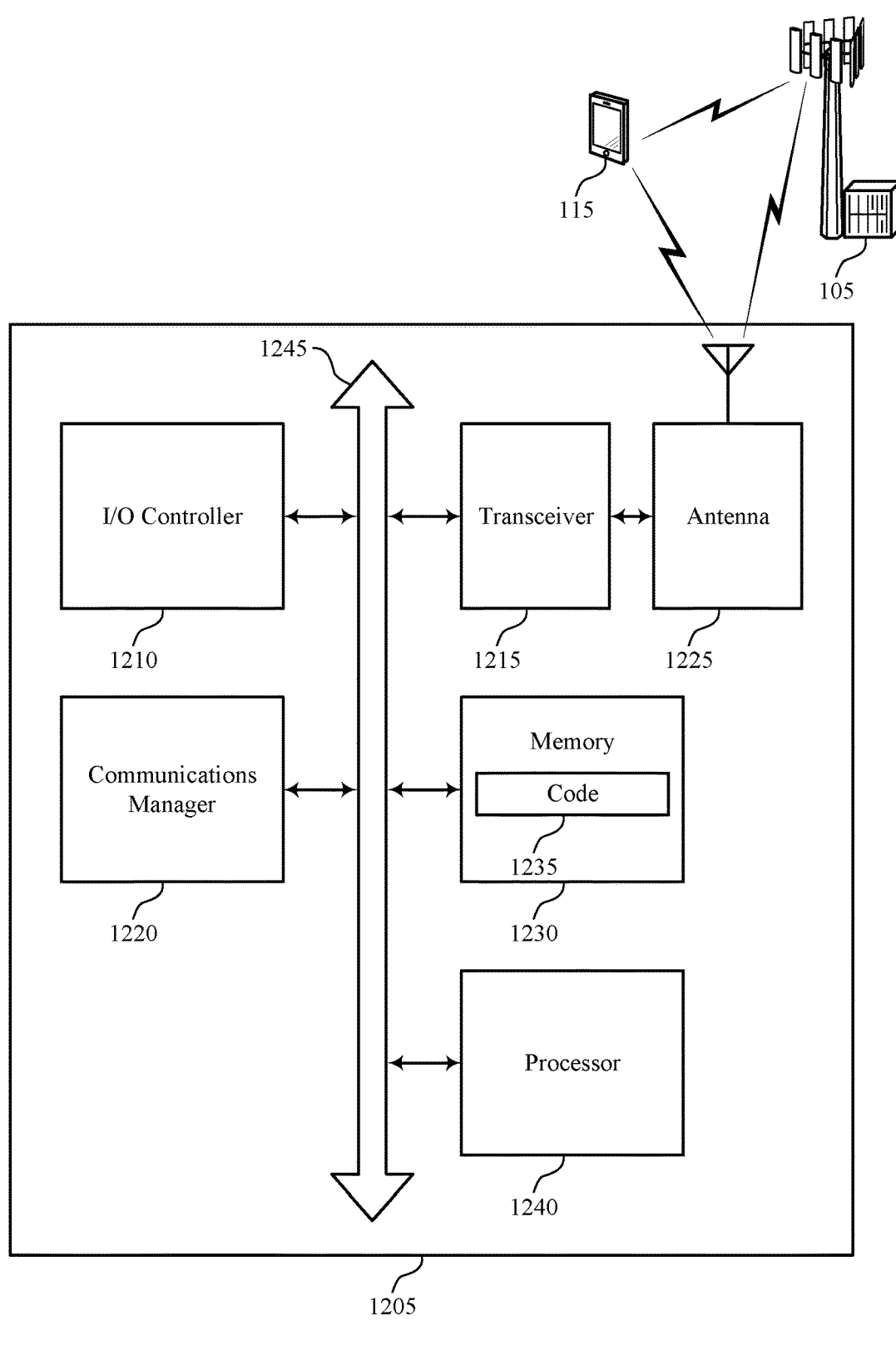
FIG. 12 shows a diagram of a system including a device that supports techniques for wireless communications using multiple RATs in accordance with one or more aspects of the present disclosure.

FIG. 12 shows a diagram of a system 1200 including a device 1205 that supports techniques for wireless communications using multiple RATs in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or other-wise coupled (e.g., operatively, communicatively, function-ally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WIN-DOWS®, OS/2®, UNIX®, LINUX®, or another known operating system. Additionally or alternatively, the I/O con-troller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may commu-nicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodu-late packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting tech-niques for wireless communications using multiple RATs). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving carrier aggregation configuration information for a primary component carrier and for a secondary component carrier, where the primary component carrier uses a first RAT and the secondary component carrier uses a second RAT. The communications manager 1220 may be configured as or otherwise support a means for communicating, based on the carrier aggregation configuration information, with a first RAN using the primary component carrier and with a second RAN using the secondary component carrier.

Additionally, or alternatively, the communications man-ager 1220 may support wireless communication at a UE in accordance with examples as disclosed herein. For example, the communications manager 1220 may be configured as or otherwise support a means for receiving DC configuration information for a first cell group and a second cell group, where the first cell group is served using one or more carriers that use a first RAT and the second cell group is served using one or more carriers that use a second RAT, and where different network entities provide physical layer scheduling information for the first cell group and the second cell group. The communications manager 1220 may be configured as or otherwise support a means for receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The communications manager 1220 may be configured as or otherwise support a means for transmitting the first uplink transmission using the first carrier concur-rently with the second uplink transmission using the second carrier, the first uplink transmission using the first uplink transmit power and the second uplink transmission using the second uplink transmit power.

Additionally, or alternatively, the communications manager 1220 may support wireless communication at a UE in accordance with examples as disclosed herein. For example, the communications manager 1220 may be configured as or otherwise support a means for receiving DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The communications manager 1220 may be configured as or otherwise support a means for communicating with a first RAN using the first carrier and with a second RAN using the second carrier based on a multiplexing configuration that is indicated in the DC configuration information.

By including or configuring the communications manager 1220 in accordance with examples as described herein, the device 1205 may support techniques for multi-RAT DC communications, carrier aggregation communications, or combinations thereof, in which scheduling flexibility for communications using different RATs may be provided through different carriers that may be associated with different RATs. Such techniques may provide for more efficient resource utilization, enhanced throughput, and enhanced reliability of communications, along with network scheduling flexibility for using different RATs for communications.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for wireless communications using multiple RATs as described herein, or the processor 1240 and the memory 1230 may be otherwise configured to perform or support such operations.

Figure 13:
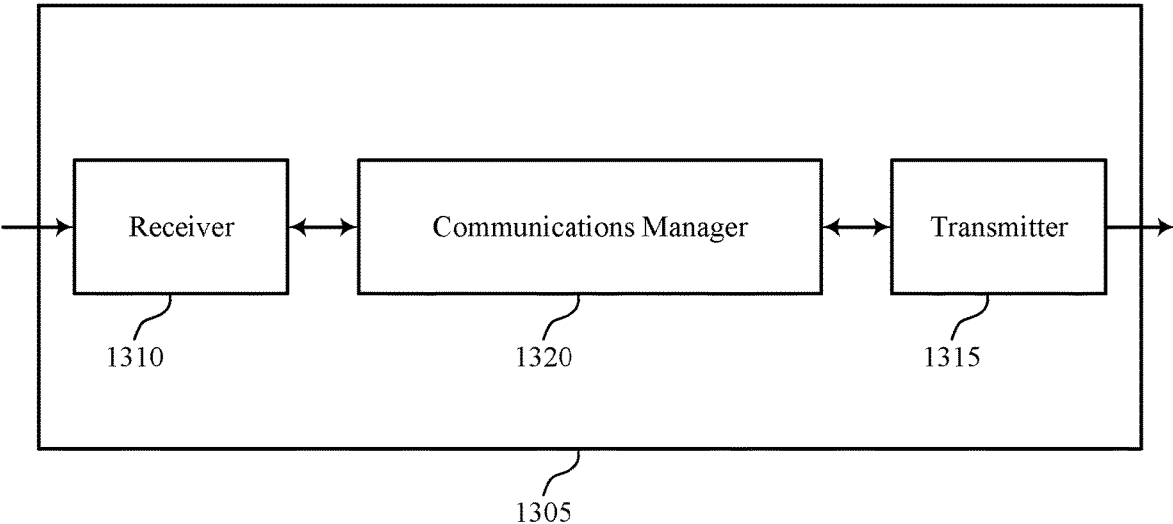
FIGS. 13 and 14 show block diagrams of devices that support techniques for wireless communications using multiple RATs in accordance with one or more aspects of the present disclosure.

FIG. 13 shows a block diagram 1300 of a device 1305 that supports techniques for wireless communications using multiple RATs in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas.

Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for wireless communications using multiple RATs as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter

1315, or both to obtain information, output information, or perform various other operations as described herein.

The communications manager 1320 may support wireless communication at a network entity in accordance with examples as disclosed herein. For example, the communications manager 1320 may be configured as or otherwise support a means for transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The communications manager 1320 may be configured as or otherwise support a means for communicating with the UE based on the carrier aggregation configuration information.

Additionally, or alternatively, the communications manager 1320 may support wireless communication at a network entity in accordance with examples as disclosed herein. For example, the communications manager 1320 may be configured as or otherwise support a means for transmitting, to a UE, DC configuration information for a first cell group and a second cell group, where the first cell group is associated with one or more carriers that use a first RAT and the second cell group is associated with one or more carriers that use a second RAT, and where different scheduling entities provide physical layer scheduling information for the first cell group and the second cell group. The communications manager 1320 may be configured as or otherwise support a means for transmitting, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The communications manager 1320 may be configured as or otherwise support a means for receiving the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

Additionally, or alternatively, the communications manager 1320 may support wireless communication at a network entity in accordance with examples as disclosed herein. For example, the communications manager 1320 may be configured as or otherwise support a means for transmitting, to a UE, DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The communications manager 1320 may be configured as or otherwise support a means for communicating with the UE based on a multiplexing configuration that is indicated in the DC configuration information.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for multi-RAT DC communications, carrier aggregation communications, or combinations thereof, in which scheduling flexibility for communications using different RATs may be provided through different carriers that may be associated with different RATs. Such techniques may provide for more efficient resource utilization, enhanced throughput, and enhanced reliability of communications, along with network scheduling flexibility for using different RATs for communications.

Figure 14:
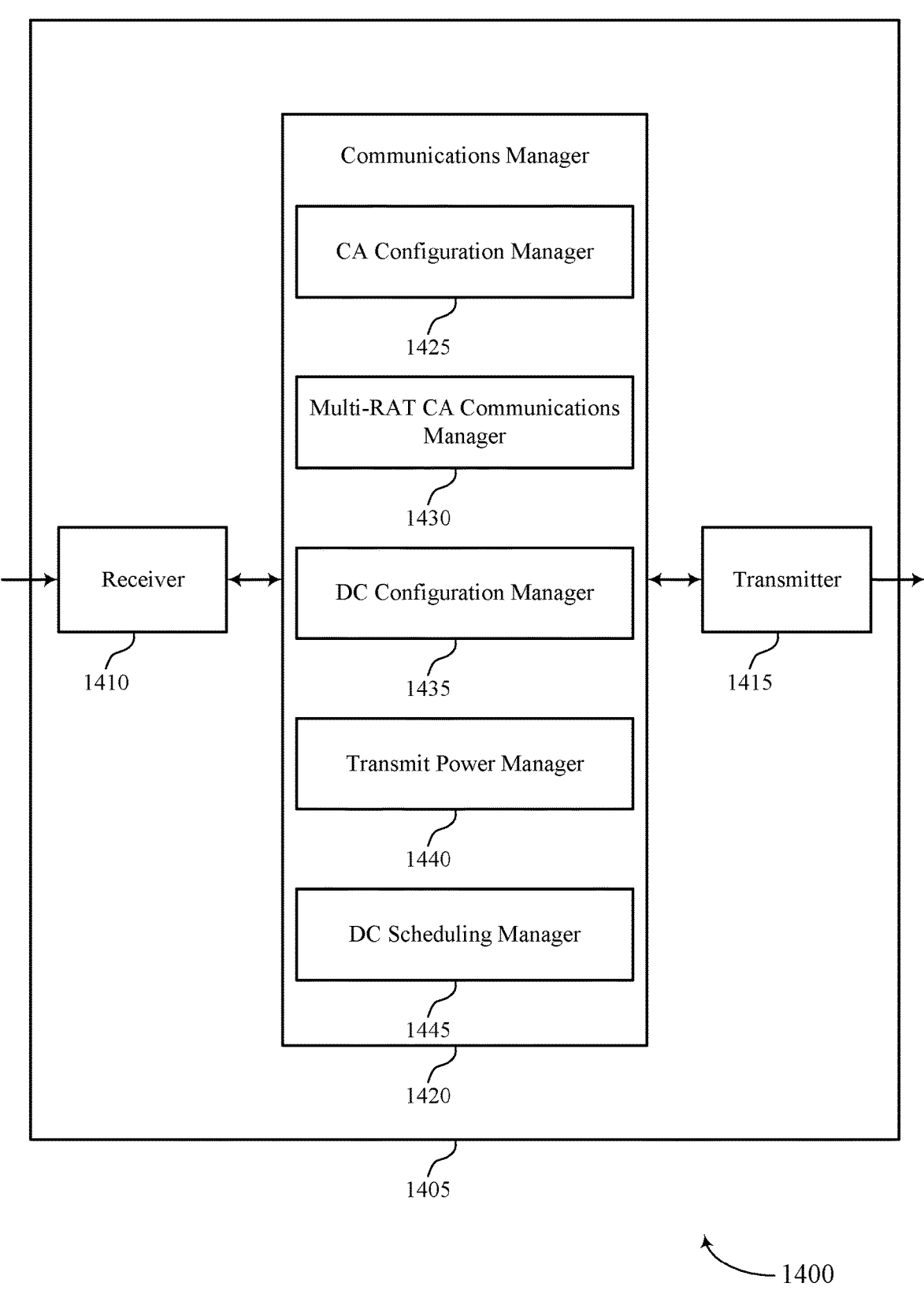

FIG. 14 shows a block diagram 1400 of a device 1405 that supports techniques for wireless communications using multiple RATs in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for wireless communications using multiple RATs as described herein. For example, the communications manager 1420 may include a CA configuration manager 1425, a multi-RAT CA communications manager 1430, a DC configuration manager 1435, a transmit power manager 1440, a DC scheduling manager 1445, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter

1415, or both to obtain information, output information, or perform various other operations as described herein.

The communications manager 1420 may support wireless communication at a network entity in accordance with examples as disclosed herein. The CA configuration manager 1425 may be configured as or otherwise support a means for transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The multi-RAT CA communications manager 1430 may be configured as or otherwise support a means for communicating with the UE based on the carrier aggregation configuration information.

Additionally, or alternatively, the communications manager 1420 may support wireless communication at a network entity in accordance with examples as disclosed herein. The DC configuration manager 1435 may be configured as or otherwise support a means for transmitting, to a UE, DC configuration information for a first cell group and a second cell group, where the first cell group is associated with one or more carriers that use a first RAT and the second cell group is associated with one or more carriers that use a second RAT, and where different scheduling entities provide physical layer scheduling information for the first cell group and the second cell group. The transmit power manager 1440 may be configured as or otherwise support a means for transmitting, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The DC scheduling manager 1445 may be configured as or otherwise support a means for receiving the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

Additionally, or alternatively, the communications manager 1420 may support wireless communication at a network entity in accordance with examples as disclosed herein. The DC configuration manager 1435 may be configured as or otherwise support a means for transmitting, to a UE, DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The DC scheduling manager 1445 may be configured as or otherwise support a means for communicating with the UE based on a multiplexing configuration that is indicated in the DC configuration information.

Figure 15:
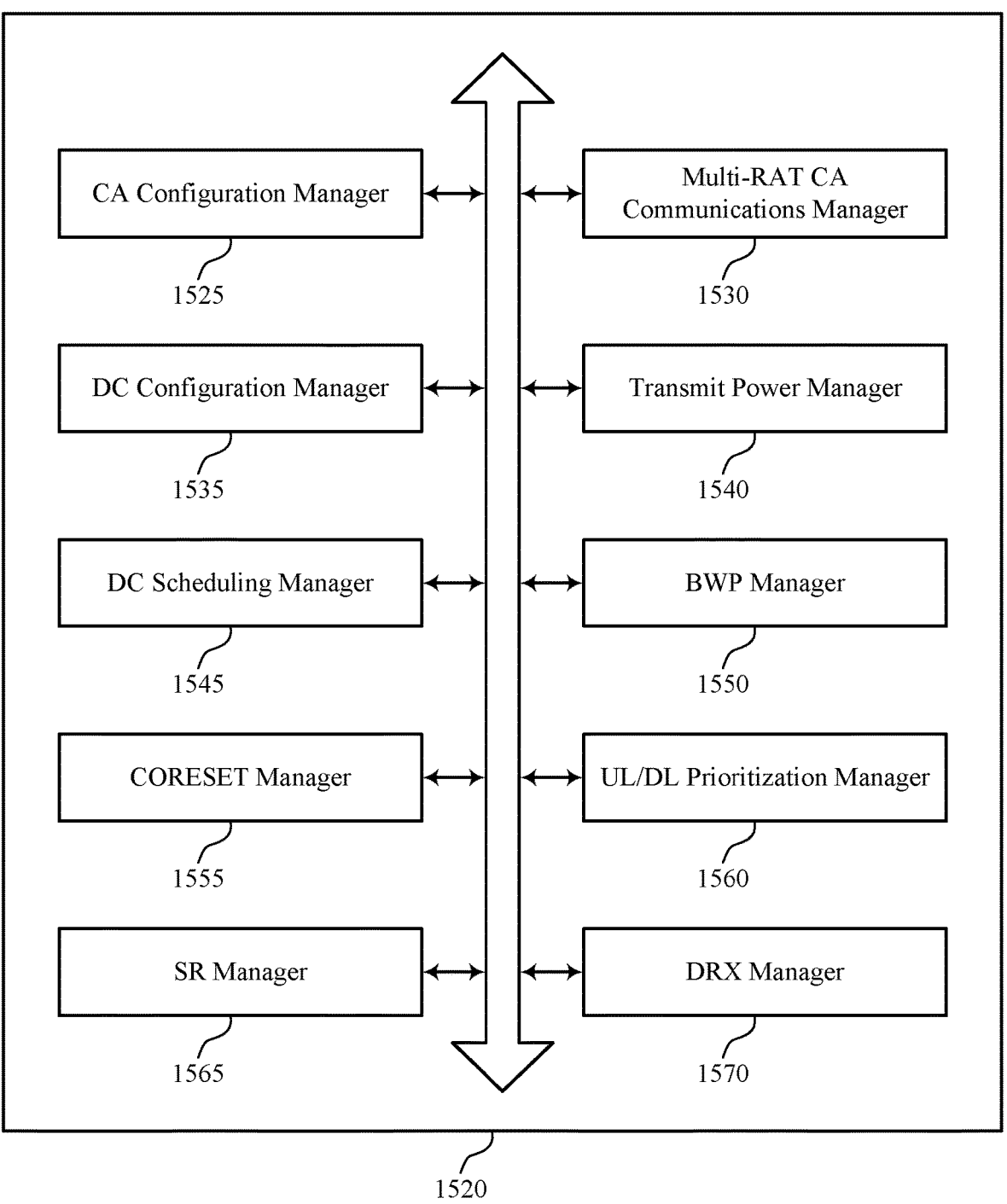
FIG. 15 shows a block diagram of a communications manager that supports techniques for wireless communications using multiple RATs in accordance with one or more aspects of the present disclosure.

FIG. 15 shows a block diagram 1500 of a communications manager 1520 that supports techniques for wireless communications using multiple RATs in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for wireless communications using multiple RATs as described herein. For example, the communications manager 1520 may include a CA configuration manager 1525, a multi-RAT CA communications manager 1530, a DC configuration manager 1535, a transmit power manager 1540, a DC scheduling manager 1545, a BWP manager 1550, a CORE-SET manager 1555, a UL/DL prioritization manager 1560, an SR manager 1565, a DRX manager 1570, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity in accordance with examples as disclosed herein. The CA configuration manager 1525 may be configured as or otherwise support a means for transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The multi-RAT CA communications manager 1530 may be configured as or otherwise support a means for communicating with the UE based on the carrier aggregation configuration information. In some examples, the first RAT is a fifth generation (5G) RAT and the second RAT is a sixth generation (6G) RAT, and where a same scheduling entity provides physical layer scheduling information for both the primary component carrier and the secondary component carrier.

In some examples, to support transmitting the carrier aggregation configuration information, the BWP manager 1550 may be configured as or otherwise support a means for transmitting a bandwidth part configuration for a set of multiple bandwidth parts of a channel bandwidth over which the primary component carrier, the secondary component carrier, or both, are configurable to operate. In some examples, to support transmitting the carrier aggregation configuration information, the BWP manager 1550 may be configured as or otherwise support a means for where a first bandwidth part of the set of multiple bandwidth parts is associated with the first RAT and a second bandwidth part of the set of multiple bandwidth parts is associated with the second RAT. In some examples, to support transmitting the carrier aggregation configuration information, the BWP manager 1550 may be configured as or otherwise support a means for where the primary component carrier is associated with the first RAT based on being configured with the first bandwidth part, and the secondary component carrier is associated with the second RAT based on being configured with the second bandwidth part.

In some examples, to support transmitting the carrier aggregation configuration information, the CORESET manager 1555 may be configured as or otherwise support a means for transmitting an indication of which of the first RAT or the second RAT is associated with the primary component carrier and the secondary component carrier via one or more of a control channel communication, a control resource set (CORESET) indication associated with each component carrier, where different CORESETs that are associated with different RATs, a downlink control information communication, or any combinations thereof. In some examples, a first uplink transmit power for a first uplink transmission via the primary component carrier and a second uplink transmit power for a second uplink transmission via the secondary component carrier are determined based on an indication in the carrier aggregation configuration information of which of the first RAT or the second RAT has a higher priority for uplink power control.

In some examples, the UL/DL prioritization manager 1560 may be configured as or otherwise support a means for identifying that both an uplink communication and a downlink communication are to be transmitted via the primary component carrier, the secondary component carrier, or both. In some examples, the UL/DL prioritization manager 1560 may be configured as or otherwise support a means for prioritizing the uplink communication or the downlink communication based on which of the first RAT or the second RAT has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof.

In some examples, a first uplink transmission is to be provided to the first RAN and a second uplink transmission is to be provided to the second RAN. In some examples, where the carrier aggregation configuration information indicates that the first uplink transmission is to be transmitted via the primary component carrier and the second uplink transmission is to be transmitted via the secondary component carrier, or that the first uplink transmission and the second uplink transmission are to be multiplexed via the primary component carrier or the secondary component carrier. In some examples, a per component carrier transmission of the first uplink transmission and the second uplink transmission, or a multiplexed transmission of the first uplink transmission and the second uplink transmission, is based on one or more of a codebook type associated with the first uplink transmission and the second uplink transmission, a waveform of the first uplink transmission and the second uplink transmission, a transmission format of a physical layer channel carrying the first uplink transmission and the second uplink transmission, a priority order of the first RAT and the second RAT, a service type associated with the first uplink transmission and the second uplink transmission, or any combinations thereof. In some examples, the first uplink transmission and the second uplink transmission include one or more of feedback information that indicates whether one or more downlink communications are successfully decoded, uplink control information, uplink shared channel data, or any combinations thereof.

In some examples, the multi-RAT CA communications manager 1530 may be configured as or otherwise support a means for transmitting one or more triggers to perform one or more operations associated with the primary component carrier or the secondary component carrier, where the one or more triggers are transmitted separately for each RAT or a single trigger indicates to perform the one or more operations using both the first RAT and the second RAT. In some examples, the one or more operations include one or more of a sounding reference signal transmission, an activation or deactivation of a secondary cell associated with the secondary component carrier, a semi-persistent scheduling or configured grant activation or deactivation, a power control procedure, or any combinations thereof. In some examples, the one or more triggers are provided in a downlink control information triggering container or a MAC control element triggering container, and where each trigger is applied to one or both of the first RAT or the second RAT based on a type of triggering container that provides the one or more triggers. In some examples, a scheduling request is provided from the UE via the primary component carrier or the secondary component carrier, where the scheduling request is for resources of the first RAT, the second RAT, or both the first RAT and the second RAT.

In some examples, the BWP manager 1550 may be configured as or otherwise support a means for transmitting, to the UE, one or more resource allocations or bandwidth part scheduling indications, where the one or more resource allocations or bandwidth part scheduling indications are provided per RAT or across RATs. In some examples, a logical channel prioritization for two or more logical channels to be provided via the primary component carrier or the secondary component carrier is based on which of the first RAT or the second RAT is associated with the primary component carrier or the secondary component carrier that carries the associated logical channel. In some examples, UE provides a UE capability report that indicates one or more UE capabilities per RAT or across RATs. In some examples, a discontinuous reception configuration for the UE is provided per RAT or across RATs.

In some examples, the primary component carrier and the secondary component carrier are included in a first set of component carriers of a first cell group of a DC configuration of the UE, and where a second set of component carriers are configured in a second cell group of the DC configuration of the UE. In some examples, a first MAC entity provides scheduling information for the first set of component carriers, and a second MAC entity provides scheduling information for the second set of component carriers. In some examples, the primary component carrier and the secondary component carrier are each assigned to the first cell group or the second cell group based on one or more of a type of service associated with each respective component carrier, a physical layer indication or a MAC layer indication associated with each respective component carrier, one or more physical layer channels carried using each respective component carrier, a type of information carried using each respective component carrier, or any combinations thereof. In some examples, a set of multiple BWPs are configured for communications at the UE, each BWP of the set of multiple BWPs associated with one of the first RAT or the second RAT, where different BWPs of the set of multiple BWPs are configured for different services, and where a BWP switch for a carrier indicates that a RAT associated with the carrier is to be switched.

Additionally, or alternatively, the communications manager 1520 may support wireless communication at a network entity in accordance with examples as disclosed herein. The DC configuration manager 1535 may be configured as or otherwise support a means for transmitting, to a UE, DC configuration information for a first cell group and a second cell group, where the first cell group is associated with one or more carriers that use a first RAT and the second cell group is associated with one or more carriers that use a second RAT, and where different scheduling entities provide physical layer scheduling information for the first cell group and the second cell group. The transmit power manager 1540 may be configured as or otherwise support a means for transmitting, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The DC scheduling manager 1545 may be configured as or otherwise support a means for receiving the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

In some examples, the DC configuration information indicates carrier prioritization that is based on one or more services that are associated with the first carrier and the second carrier. In some examples, a power scaling associated with the first carrier and the second carrier is based on one or more services associated with each of the first carrier and the second carrier. In some examples, the first carrier and the second carrier are prioritized for uplink power control based on a prioritization provided in the DC configuration information for one or more physical layer services or medium access control layer logical channels and associated services or logical channels provided using the first carrier and the second carrier. In some examples, the first carrier and the second carrier are prioritized for uplink power control based on a waveform type prioritization provided in the DC configuration information and an associated waveform type of the first carrier and the second carrier. In some examples, the first carrier and the second carrier are prioritized for uplink power control based on one or more types of channels or type of data provided via the first carrier and the second carrier.

In some examples, the DC configuration information configures at least the first cell group with two or more component carriers in a carrier aggregation configuration, and where the first cell group includes component carriers associated with different RATs. In some examples, a first MAC entity provides the physical layer scheduling information for each component carrier of the first cell group, and a second MAC entity provides the physical layer scheduling information for each component carrier of the second cell group. In some examples, the DC configuration manager 1535 may be configured as or otherwise support a means for determining that a first carrier is included in the first cell group or the second cell group based on one or more of a type of service provided using the first carrier, a physical layer or medium access control layer indication associated with the first carrier, one or more channels transmitted via the first carrier, a type of information transmitted via the first carrier, or any combinations thereof. In some examples, a set of multiple BWPs are configured for communications at the UE, each BWP of the set of multiple BWPs associated with one of the first RAT or the second RAT, where different BWPs of the set of multiple BWPs are configured for different services, and where a BWP switch for a carrier indicates that a RAT associated with the carrier is to be switched.

Additionally, or alternatively, the communications manager 1520 may support wireless communication at a network entity in accordance with examples as disclosed herein. In some examples, the DC configuration manager 1535 may be configured as or otherwise support a means for transmitting, to a UE, DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. In some examples, the DC scheduling manager 1545 may be configured as or otherwise support a means for communicating with the UE based on a multiplexing configuration that is indicated in the DC configuration information.

In some examples, the time intervals are slots that are synchronized at slot boundaries used in the first RAN and the second RAN, and where the multiplexing configuration indicates time division multiplexing in the slots. In some examples, the DC configuration information provides a set of slots in which a first subset of slots are for the first RAN and a second subset of slots are for the second RAN. In some examples, a ratio of a first quantity of slots in the first subset of slots and a second quantity of slots in the second subset of slots is determined based on a buffer status associated with each cell, a TDD slot pattern of each cell, or any combinations thereof. In some examples, a scheduling pattern of the first subset of slots and the second subset of slots is provided in downlink control information, in a MAC control element, in a downlink signal that indicates a sequence of slots and a corresponding cell, or any combinations thereof. In some examples, the scheduling pattern is applied to uplink and downlink communications for intra-band and inter-band transmissions of each carrier. In some examples, the multiplexing configuration indicated in the DC configuration information provides frequency domain multiplexing or spatial domain multiplexing. In some examples, the multiplexing configuration indicated in the DC configuration information provides radio frequency spectrum sharing for two or more operators that operate different RANs using the first RAT, the second RAT, or both.

Figure 16:
FIG. 16 shows a diagram of a system including a device that supports techniques for wireless communications using multiple RATs in accordance with one or more aspects of the present disclosure.

FIG. 16 shows a diagram of a system 1600 including a device 1605 that supports techniques for wireless communications using multiple RATs in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting techniques for wireless communications using multiple RATs). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The communications manager 1620 may be configured as or otherwise support a means for communicating with the UE based on the carrier aggregation configuration information.

Additionally, or alternatively, the communications manager 1620 may support wireless communication at a network entity in accordance with examples as disclosed herein. For example, the communications manager 1620 may be configured as or otherwise support a means for transmitting, to a UE, DC configuration information for a first cell group and a second cell group, where the first cell group is associated with one or more carriers that use a first RAT and the second cell group is associated with one or more carriers that use a second RAT, and where different scheduling entities provide physical layer scheduling information for the first cell group and the second cell group. The communications manager 1620 may be configured as or otherwise support a means for transmitting, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The communications manager 1620 may be configured as or otherwise support a means for receiving the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power.

Additionally, or alternatively, the communications manager 1620 may support wireless communication at a network entity in accordance with examples as disclosed herein. For example, the communications manager 1620 may be configured as or otherwise support a means for transmitting, to a UE, DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The communications manager 1620 may be configured as or otherwise support a means for communicating with the UE based on a multiplexing configuration that is indicated in the DC configuration information.

By including or configuring the communications manager 1620 in accordance with examples as described herein, the device 1605 may support techniques for multi-RAT DC communications, carrier aggregation communications, or combinations thereof, in which scheduling flexibility for communications using different RATs may be provided through different carriers that may be associated with different RATs. Such techniques may provide for more efficient resource utilization, enhanced throughput, and enhanced reliability of communications, along with network scheduling flexibility for using different RATs for communications.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of techniques for wireless communications using multiple RATs as described herein, or the processor 1635 and the memory 1625 may be otherwise configured to perform or support such operations.

FIG. 17 shows a flowchart illustrating a method 1700 that supports techniques for wireless communications using multiple RATs in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving carrier aggregation configuration information for a primary component carrier and for a secondary component carrier, where the primary component carrier uses a first RAT and the secondary component carrier uses a second RAT. The operations of 1705 may be performed in accordance with examples as disclosed herein. In some examples, aspects of the operations of 1705 may be performed by a CA configuration manager 1125 as described with reference to FIG. 11.

At 1710, the method may include communicating, based on the carrier aggregation configuration information, with a first RAN using the primary component carrier and with a second RAN using the secondary component carrier. The operations of 1710 may be performed in accordance with examples as disclosed herein. In some examples, aspects of the operations of 1710 may be performed by a multi-RAT CA communications manager 1130 as described with reference to FIG. 11.

FIG. 18 shows a flowchart illustrating a method 1800 that supports techniques for wireless communications using multiple RATs in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving carrier aggregation configuration information for a primary component carrier and for a secondary component carrier, where the primary component carrier uses a first RAT and the secondary component carrier uses a second RAT. The operations of 1805 may be performed in accordance with examples as disclosed herein. In some examples, aspects of the operations of 1805 may be performed by a CA configuration manager 1125 as described with reference to FIG. 11.

At 1810, the method may include receiving a bandwidth part configuration for a set of multiple bandwidth parts of a channel bandwidth over which the primary component carrier, the secondary component carrier, or both, are configurable to operate. The operations of 1810 may be performed in accordance with examples as disclosed herein. In some examples, aspects of the operations of 1810 may be performed by a BWP manager 1150 as described with reference to FIG. 11. In some cases, a first bandwidth part of the set of multiple bandwidth parts is associated with the first RAT and a second bandwidth part of the set of multiple bandwidth parts is associated with the second RAT. In some cases, the primary component carrier is associated with the first RAT based on being configured with the first bandwidth part, and the secondary component carrier is associated with the second RAT based on being configured with the second bandwidth part.

At 1815, the method may include communicating, based on the carrier aggregation configuration information, with a first RAN using the primary component carrier and with a second RAN using the secondary component carrier. The operations of 1815 may be performed in accordance with examples as disclosed herein. In some examples, aspects of the operations of 1815 may be performed by a multi-RAT CA communications manager 1130 as described with reference to FIG. 11.

FIG. 19 shows a flowchart illustrating a method 1900 that supports techniques for wireless communications using multiple RATs in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving carrier aggregation configuration information for a primary component carrier and for a secondary component carrier, where the primary component carrier uses a first RAT and the secondary component carrier uses a second RAT. The operations of 1905 may be performed in accordance with examples as disclosed herein. In some examples, aspects of the operations of 1905 may be performed by a CA configuration manager 1125 as described with reference to FIG. 11.

At 1910, the method may include determining a first uplink transmit power for a first uplink transmission via the primary component carrier and a second uplink transmit power for a second uplink transmission via the secondary component carrier, based on an indication in the carrier aggregation configuration information of which of the first RAT or the second RAT has a higher priority for uplink power control. The operations of 1910 may be performed in accordance with examples as disclosed herein. In some examples, aspects of the operations of 1910 may be performed by a transmit power manager 1140 as described with reference to FIG. 11.

At 1915, the method may include communicating, based on the carrier aggregation configuration information, with a first RAN using the primary component carrier and with a second RAN using the secondary component carrier. The operations of 1915 may be performed in accordance with examples as disclosed herein. In some examples, aspects of the operations of 1915 may be performed by a multi-RAT CA communications manager 1130 as described with reference to FIG. 11.

FIG. 20 shows a flowchart illustrating a method 2000 that supports techniques for wireless communications using multiple RATs in accordance with one or more aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2005, the method may include receiving carrier aggregation configuration information for a primary component carrier and for a secondary component carrier, where the primary component carrier uses a first RAT and the secondary component carrier uses a second RAT. The operations of 2005 may be performed in accordance with examples as disclosed herein. In some examples, aspects of the operations of 2005 may be performed by a CA configuration manager 1125 as described with reference to FIG. 11.

At 2010, the method may include identifying that both an uplink communication and a downlink communication are to be transmitted via the primary component carrier, the secondary component carrier, or both. The operations of 2010 may be performed in accordance with examples as disclosed herein. In some examples, aspects of the operations of 2010 may be performed by a UL/DL prioritization manager 1160 as described with reference to FIG. 11.

At 2015, the method may include prioritizing the uplink communication or the downlink communication based on which of the first RAT or the second RAT has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof. The operations of 2015 may be performed in accordance with examples as disclosed herein. In some examples, aspects of the operations of 2015 may be performed by a UL/DL prioritization manager 1160 as described with reference to FIG. 11.

At 2020, the method may include communicating, based on the carrier aggregation configuration information, with a first RAN using the primary component carrier and with a second RAN using the secondary component carrier. The operations of 2020 may be performed in accordance with examples as disclosed herein. In some examples, aspects of the operations of 2020 may be performed by a multi-RAT CA communications manager 1130 as described with reference to FIG. 11.

FIG. 21 shows a flowchart illustrating a method 2100 that supports techniques for wireless communications using multiple RATs in accordance with one or more aspects of the present disclosure. The operations of the method 2100 may be implemented by a UE or its components as described herein. For example, the operations of the method 2100 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2105, the method may include receiving carrier aggregation configuration information for a primary component carrier and for a secondary component carrier, where the primary component carrier uses a first RAT and the secondary component carrier uses a second RAT. The operations of 2105 may be performed in accordance with examples as disclosed herein. In some examples, aspects of the operations of 2105 may be performed by a CA configuration manager 1125 as described with reference to FIG. 11.

At 2110, the method may include identifying a first uplink transmission to be provided to the first RAN and a second uplink transmission to be provided to the second RAN. The operations of 2110 may be performed in accordance with examples as disclosed herein. In some examples, aspects of the operations of 2110 may be performed by a multi-RAT CA communications manager 1130 as described with reference to FIG. 11.

At 2115, the method may include determining, based on the carrier aggregation configuration information, to transmit the first uplink transmission via the primary component carrier and the second uplink transmission via the secondary component carrier, or to multiplex the first uplink transmission and the second uplink transmission for transmission via the primary component carrier or the secondary component carrier. The operations of 2115 may be performed in accordance with examples as disclosed herein. In some examples, aspects of the operations of 2115 may be performed by a multi-RAT CA communications manager 1130 as described with reference to FIG. 11.

At 2120, the method may include communicating, based on the carrier aggregation configuration information, with a first RAN using the primary component carrier and with a second RAN using the secondary component carrier. The operations of 2120 may be performed in accordance with examples as disclosed herein. In some examples, aspects of the operations of 2120 may be performed by a multi-RAT CA communications manager 1130 as described with reference to FIG. 11.

FIG. 22 shows a flowchart illustrating a method 2200 that supports techniques for wireless communications using multiple RATs in accordance with one or more aspects of the present disclosure. The operations of the method 2200 may be implemented by a UE or its components as described herein. For example, the operations of the method 2200 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2205, the method may include receiving carrier aggregation configuration information for a primary component carrier and for a secondary component carrier, where the primary component carrier uses a first RAT and the secondary component carrier uses a second RAT. The operations of 2205 may be performed in accordance with examples as disclosed herein. In some examples, aspects of the operations of 2205 may be performed by a CA configuration manager 1125 as described with reference to FIG. 11.

At 2210, the method may include communicating, based on the carrier aggregation configuration information, with a first RAN using the primary component carrier and with a second RAN using the secondary component carrier. The operations of 2210 may be performed in accordance with examples as disclosed herein. In some examples, aspects of the operations of 2210 may be performed by a multi-RAT CA communications manager 1130 as described with reference to FIG. 11.

At 2215, the method may include transmitting a scheduling request via the primary component carrier or the secondary component carrier, where the scheduling request is for resources of the first RAT, the second RAT, or both the first RAT and the second RAT. The operations of 2215 may be performed in accordance with examples as disclosed herein. In some examples, aspects of the operations of 2215 may be performed by an SR manager 1165 as described with reference to FIG. 11.

At 2220, the method may include receiving one or more resource allocations or bandwidth part scheduling indications, where the one or more resource allocations or bandwidth part scheduling indications are provided per RAT or across RATs. The operations of 2220 may be performed in accordance with examples as disclosed herein. In some examples, aspects of the operations of 2220 may be performed by a BWP manager 1150 as described with reference to FIG. 11.

FIG. 23 shows a flowchart illustrating a method 2300 that supports techniques for wireless communications using multiple RATs in accordance with one or more aspects of the present disclosure. The operations of the method 2300 may be implemented by a UE or its components as described herein. For example, the operations of the method 2300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2305, the method may include receiving DC configuration information for a first cell group and a second cell group, where the first cell group is served using one or more carriers that use a first RAT and the second cell group is served using one or more carriers that use a second RAT, and where different network entities provide physical layer scheduling information for the first cell group and the second cell group. The operations of 2305 may be performed in accordance with examples as disclosed herein. In some examples, aspects of the operations of 2305 may be performed by a DC configuration manager 1135 as described with reference to FIG. 11.

At 2310, the method may include receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The operations of 2310 may be performed in accordance with examples as disclosed herein. In some examples, aspects of the operations of 2310 may be performed by a transmit power manager 1140 as described with reference to FIG. 11.

At 2315, the method may include transmitting the first uplink transmission using the first carrier concurrently with the second uplink transmission using the second carrier, the first uplink transmission using the first uplink transmit power and the second uplink transmission using the second uplink transmit power. The operations of 2315 may be performed in accordance with examples as disclosed herein. In some examples, aspects of the operations of 2315 may be performed by a DC scheduling manager 1145 as described with reference to FIG. 11.

FIG. 24 shows a flowchart illustrating a method 2400 that supports techniques for wireless communications using multiple RATs in accordance with one or more aspects of the present disclosure. The operations of the method 2400 may be implemented by a UE or its components as described herein. For example, the operations of the method 2400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2405, the method may include receiving DC configuration information for a first cell group and a second cell group, where the first cell group is served using one or more carriers that use a first RAT and the second cell group is served using one or more carriers that use a second RAT, and where different network entities provide physical layer scheduling information for the first cell group and the second cell group. The operations of 2405 may be performed in accordance with examples as disclosed herein. In some examples, aspects of the operations of 2405 may be performed by a DC configuration manager 1135 as described with reference to FIG. 11.

At 2410, the method may include receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The operations of 2410 may be performed in accordance with examples as disclosed herein. In some examples, aspects of the operations of 2410 may be performed by a transmit power manager 1140 as described with reference to FIG. 11.

At 2415, the method may include determining a power scaling associated with the first carrier and the second carrier based on one or more services associated with each of the first carrier and the second carrier. The operations of 2415 may be performed in accordance with examples as disclosed herein. In some examples, aspects of the operations of 2415 may be performed by a transmit power manager 1140 as described with reference to FIG. 11.

At 2420, the method may include transmitting the first uplink transmission using the first carrier concurrently with the second uplink transmission using the second carrier, the first uplink transmission using the first uplink transmit power and the second uplink transmission using the second uplink transmit power. The operations of 2420 may be performed in accordance with examples as disclosed herein. In some examples, aspects of the operations of 2420 may be performed by a DC scheduling manager 1145 as described with reference to FIG. 11.

FIG. 25 shows a flowchart illustrating a method 2500 that supports techniques for wireless communications using multiple RATs in accordance with one or more aspects of the present disclosure. The operations of the method 2500 may be implemented by a UE or its components as described herein. For example, the operations of the method 2500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2505, the method may include receiving DC configuration information for a first cell group and a second cell group, where the first cell group is served using one or more carriers that use a first RAT and the second cell group is served using one or more carriers that use a second RAT, and where different network entities provide physical layer scheduling information for the first cell group and the second cell group. The operations of 2505 may be performed in accordance with examples as disclosed herein. In some examples, aspects of the operations of 2505 may be performed by a DC configuration manager 1135 as described with reference to FIG. 11.

At 2510, the method may include receiving uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The operations of 2510 may be performed in accordance with examples as disclosed herein. In some examples, aspects of the operations of 2510 may be performed by a transmit power manager 1140 as described with reference to FIG. 11.

At 2515, the method may include determining that a first carrier is included in the first cell group or the second cell group based on one or more of a type of service provided using the first carrier, a physical layer or medium access control layer indication associated with the first carrier, one or more channels transmitted via the first carrier, a type of information transmitted via the first carrier, or any combinations thereof. The operations of 2515 may be performed in accordance with examples as disclosed herein. In some examples, aspects of the operations of 2515 may be performed by a DC configuration manager 1135 as described with reference to FIG. 11.

At 2520, the method may include transmitting the first uplink transmission using the first carrier concurrently with the second uplink transmission using the second carrier, the first uplink transmission using the first uplink transmit power and the second uplink transmission using the second uplink transmit power. The operations of 2520 may be performed in accordance with examples as disclosed herein. In some examples, aspects of the operations of 2520 may be performed by a DC scheduling manager 1145 as described with reference to FIG. 11.

FIG. 26 shows a flowchart illustrating a method 2600 that supports techniques for wireless communications using multiple RATs in accordance with one or more aspects of the present disclosure. The operations of the method 2600 may be implemented by a UE or its components as described herein. For example, the operations of the method 2600 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2605, the method may include receiving DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The operations of 2605 may be performed in accordance with examples as disclosed herein. In some examples, aspects of the operations of 2605 may be performed by a DC configuration manager 1135 as described with reference to FIG. 11.

At 2610, the method may include communicating with a first RAN using the first carrier and with a second RAN using the second carrier based on a multiplexing configuration that is indicated in the DC configuration information. The operations of 2610 may be performed in accordance with examples as disclosed herein. In some examples, aspects of the operations of 2610 may be performed by a DC scheduling manager 1145 as described with reference to FIG. 11.

FIG. 27 shows a flowchart illustrating a method 2700 that supports techniques for wireless communications using multiple RATs in accordance with one or more aspects of the present disclosure. The operations of the method 2700 may be implemented by a UE or its components as described herein. For example, the operations of the method 2700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2705, the method may include receiving DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The operations of 2705 may be performed in accordance with examples as disclosed herein. In some examples, aspects of the operations of 2705 may be performed by a DC configuration manager 1135 as described with reference to FIG. 11.

At 2710, the method may include receiving scheduling information for the first cell from a first scheduling entity associated with the first RAN. The operations of 2710 may be performed in accordance with examples as disclosed herein. In some examples, aspects of the operations of 2710 may be performed by a DC scheduling manager 1145 as described with reference to FIG. 11.

At 2715, the method may include receiving scheduling information for the second cell from a second scheduling entity associated with the second RAN. The operations of 2715 may be performed in accordance with examples as disclosed herein. In some examples, aspects of the operations of 2715 may be performed by a DC scheduling manager 1145 as described with reference to FIG. 11.

At 2720, the method may include communicating with a first RAN using the first carrier and with a second RAN using the second carrier based on a multiplexing configuration that is indicated in the DC configuration information. The operations of 2720 may be performed in accordance with examples as disclosed herein. In some examples, aspects of the operations of 2720 may be performed by a DC scheduling manager 1145 as described with reference to FIG. 11.

FIG. 28 shows a flowchart illustrating a method 2800 that supports techniques for wireless communications using multiple RATs in accordance with one or more aspects of the present disclosure. The operations of the method 2800 may be implemented by a network entity or its components as described herein. For example, the operations of the method 2800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2805, the method may include transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The operations of 2805 may be performed in accordance with examples as disclosed herein. In some examples, aspects of the operations of 2805 may be performed by a CA configuration manager 1525 as described with reference to FIG. 15.

At 2810, the method may include communicating with the UE based on the carrier aggregation configuration information. The operations of 2810 may be performed in accordance with examples as disclosed herein. In some examples, aspects of the operations of 2810 may be performed by a multi-RAT CA communications manager 1530 as described with reference to FIG. 15.

FIG. 29 shows a flowchart illustrating a method 2900 that supports techniques for wireless communications using multiple RATs in accordance with one or more aspects of the present disclosure. The operations of the method 2900 may be implemented by a network entity or its components as described herein. For example, the operations of the method 2900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2905, the method may include transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The operations of 2905 may be performed in accordance with examples as disclosed herein. In some examples, aspects of the operations of 2905 may be performed by a CA configuration manager 1525 as described with reference to FIG. 15.

At 2910, the method may include transmitting a bandwidth part configuration for a set of multiple bandwidth parts of a channel bandwidth over which the primary component carrier, the secondary component carrier, or both, are configurable to operate. The operations of 2910 may be performed in accordance with examples as disclosed herein. In some examples, aspects of the operations of 2910 may be performed by a BWP manager 1550 as described with reference to FIG. 15. In some cases, a first bandwidth part of the set of multiple bandwidth parts is associated with the first RAT and a second bandwidth part of the set of multiple bandwidth parts is associated with the second RAT. In some cases, the primary component carrier is associated with the first RAT based on being configured with the first bandwidth part, and the secondary component carrier is associated with the second RAT based on being configured with the second bandwidth part.

At 2915, the method may include communicating with the UE based on the carrier aggregation configuration information. The operations of 2915 may be performed in accordance with examples as disclosed herein. In some examples, aspects of the operations of 2915 may be performed by a multi-RAT CA communications manager 1530 as described with reference to FIG. 15.

FIG. 30 shows a flowchart illustrating a method 3000 that supports techniques for wireless communications using multiple RATs in accordance with one or more aspects of the present disclosure. The operations of the method 3000 may be implemented by a network entity or its components as described herein. For example, the operations of the method 3000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 3005, the method may include transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The operations of 3005 may be performed in accordance with examples as disclosed herein. In some examples, aspects of the operations of 3005 may be performed by a CA configuration manager 1525 as described with reference to FIG. 15.

At 3010, the method may include identifying that both an uplink communication and a downlink communication are to be transmitted via the primary component carrier, the secondary component carrier, or both. The operations of 3010 may be performed in accordance with examples as disclosed herein. In some examples, aspects of the operations of 3010 may be performed by a UL/DL prioritization manager 1560 as described with reference to FIG. 15.

At 3015, the method may include prioritizing the uplink communication or the downlink communication based on which of the first RAT or the second RAT has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof. The operations of 3015 may be performed in accordance with examples as disclosed herein. In some examples, aspects of the operations of 3015 may be performed by a UL/DL prioritization manager 1560 as described with reference to FIG. 15.

At 3020, the method may include communicating with the UE based on the carrier aggregation configuration information. The operations of 3020 may be performed in accordance with examples as disclosed herein. In some examples, aspects of the operations of 3020 may be performed by a multi-RAT CA communications manager 1530 as described with reference to FIG. 15.

FIG. 31 shows a flowchart illustrating a method 3100 that supports techniques for wireless communications using multiple RATs in accordance with one or more aspects of the present disclosure. The operations of the method 3100 may be implemented by a network entity or its components as described herein. For example, the operations of the method 3100 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 3105, the method may include transmitting carrier aggregation configuration information to a UE for a primary component carrier, and for a secondary component carrier, where the primary component carrier uses a first RAT and is associated with a first RAN and the secondary component carrier uses a second RAT and is associated with a second RAN. The operations of 3105 may be performed in accordance with examples as disclosed herein. In some examples, aspects of the operations of 3105 may be performed by a CA configuration manager 1525 as described with reference to FIG. 15.

At 3110, the method may include transmitting, to the UE, one or more resource allocations or bandwidth part scheduling indications, where the one or more resource allocations or bandwidth part scheduling indications are provided per RAT or across RATs. The operations of 3110 may be performed in accordance with examples as disclosed herein. In some examples, aspects of the operations of 3110 may be performed by a BWP manager 1550 as described with reference to FIG. 15.

At 3115, the method may include communicating with the UE based on the carrier aggregation configuration information. The operations of 3115 may be performed in accordance with examples as disclosed herein. In some examples, aspects of the operations of 3115 may be performed by a multi-RAT CA communications manager 1530 as described with reference to FIG. 15.

FIG. 32 shows a flowchart illustrating a method 3200 that supports techniques for wireless communications using multiple RATs in accordance with one or more aspects of the present disclosure. The operations of the method 3200 may be implemented by a network entity or its components as described herein. For example, the operations of the method 3200 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 3205, the method may include transmitting, to a UE, DC configuration information for a first cell group and a second cell group, where the first cell group is associated with one or more carriers that use a first RAT and the second cell group is associated with one or more carriers that use a second RAT, and where different scheduling entities provide physical layer scheduling information for the first cell group and the second cell group. The operations of 3205 may be performed in accordance with examples as disclosed herein. In some examples, aspects of the operations of 3205 may be performed by a DC configuration manager 1535 as described with reference to FIG. 15.

At 3210, the method may include transmitting, to the UE, uplink power control information, the uplink power control information includes an indication of a first uplink transmit power of a first uplink transmission and a second uplink transmit power of a second uplink transmission that are based on which of a first carrier of the first cell group or a second carrier of the second cell group is indicated as being prioritized for uplink power control. The operations of 3210 may be performed in accordance with examples as disclosed herein. In some examples, aspects of the operations of 3210 may be performed by a transmit power manager 1540 as described with reference to FIG. 15.

At 3215, the method may include receiving the first uplink transmission from the UE using the first carrier, where the first uplink transmission is transmitted concurrently with the second uplink transmission using the second carrier of the second cell group, the first uplink transmission using the first uplink transmit power and the second uplink transmission using the second uplink transmit power. The operations of 3215 may be performed in accordance with examples as disclosed herein. In some examples, aspects of the operations of 3215 may be performed by a DC scheduling manager 1545 as described with reference to FIG. 15.

FIG. 33 shows a flowchart illustrating a method 3300 that supports techniques for wireless communications using multiple RATs in accordance with one or more aspects of the present disclosure. The operations of the method 3300 may be implemented by a network entity or its components as described herein. For example, the operations of the method 3300 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 3305, the method may include transmitting, to a UE, DC configuration information for a first cell and a second cell, where the first cell is associated with a first carrier that uses a first RAT and the second cell is associated with a second carrier that uses a second RAT, and where the first carrier and the second carrier share a same set of wireless resources that are multiplexed between the first cell and second cell in time intervals that are synchronized between the first RAT and the second RAT. The operations of 3305 may be performed in accordance with examples as disclosed herein. In some examples, aspects of the operations of 3305 may be performed by a DC configuration manager 1535 as described with reference to FIG. 15.

At 3310, the method may include communicating with the UE based on a multiplexing configuration that is indicated in the DC configuration information. The operations of 3310 may be performed in accordance with examples as disclosed herein. In some examples, aspects of the operations of 3310 may be performed by a DC scheduling manager 1545 as described with reference to FIG. 15.

The following provides an overview of aspects of the present disclosure:

Aspect 1: A method for wireless communication at a UE, comprising: receiving carrier aggregation configuration information for a primary component carrier and for a secondary component carrier, wherein the primary component carrier uses a first radio access technology and the secondary component carrier uses a second radio access technology; and communicating, based at least in part on the carrier aggregation configuration information, with a first radio access network using the primary component carrier and with a second radio access network using the secondary component carrier.

Aspect 2: The method of aspect 1, wherein the first radio access technology is a fifth generation (5G) radio access technology and the second radio access technology is a sixth generation (6G) radio access technology.

Aspect 3: The method of any of aspects 1 through 2, wherein a same network entity provides physical layer scheduling information for both the primary component carrier and the secondary component carrier.

Aspect 4: The method of any of aspects 1 through 3, wherein the receiving the carrier aggregation configuration information comprises: receiving a bandwidth part configuration for a plurality of bandwidth parts of a channel bandwidth over which the primary component carrier, the secondary component carrier, or both, are configurable to operate, and wherein a first bandwidth part of the plurality of bandwidth parts is associated with the first radio access technology and a second bandwidth part of the plurality of bandwidth parts is associated with the second radio access technology, wherein the primary component carrier is associated with the first radio access technology based at least in part on being configured with the first bandwidth part, and the secondary component carrier is associated with the second radio access technology based at least in part on being configured with the second bandwidth part.

Aspect 5: The method of aspect 4, wherein the primary component carrier is configured for operation on multiple bandwidth parts, and wherein communications via one or both the first radio access technology or the second radio access technology are based at least in part on which of the multiple bandwidth parts is used for communications.

Aspect 6: The method of any of aspects 1 through 5, wherein the receiving the carrier aggregation configuration information comprises: receiving an indication of which of the first radio access technology or the second radio access technology is associated with the primary component carrier and the secondary component carrier via one or more of a control channel communication, a control resource set (CORESET) indication associated with each component carrier where different CORESETs are associated with different radio access technologies, a downlink control information communication, or any combinations thereof.

Aspect 7: The method of any of aspects 1 through 6, further comprising: determining a first uplink transmit power for a first uplink transmission via the primary component carrier and a second uplink transmit power for a second uplink transmission via the secondary component carrier, based at least in part on an indication in the carrier aggregation configuration information of which of the first radio access technology or the second radio access technology has a higher priority for uplink power control.

Aspect 8: The method of any of aspects 1 through 7, further comprising: identifying that both an uplink communication and a downlink communication are to be transmitted via the primary component carrier, the secondary component carrier, or both, or via a first bandwidth part, a second bandwidth part, or both, wherein each bandwidth part is associated with one or more radio access technologies; and prioritizing the uplink communication or the downlink communication based at least in part on which of the first radio access technology or the second radio access technology has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof.

Aspect 9: The method of any of aspects 1 through 8, further comprising: identifying a first uplink transmission to be provided to the first radio access network and a second uplink transmission to be provided to the second radio access network; and determining, based at least in part on the carrier aggregation configuration information, one or more of a component carrier or a bandwidth part for each of the first uplink transmission and the second uplink transmission, or to multiplex the first uplink transmission and the second uplink transmission for transmission via one component carrier or bandwidth part.

Aspect 10: The method of aspect 9, wherein the determining is based at least in part on one or more of a codebook type associated with the first uplink transmission and the second uplink transmission, a waveform of the first uplink transmission and the second uplink transmission, a transmission format of a physical layer channel carrying the first uplink transmission and the second uplink transmission, a priority order of the first radio access technology and the second radio access technology, a service type associated with the first uplink transmission and the second uplink transmission, or any combinations thereof.

Aspect 11: The method of any of aspects 9 through 10, wherein the first uplink transmission and the second uplink transmission include one or more of feedback information that indicates whether one or more downlink communications are successfully decoded, uplink control information, uplink shared channel data, or any combinations thereof.

Aspect 12: The method of any of aspects 1 through 11, further comprising: receiving one or more triggers to perform one or more operations associated with the primary component carrier or the secondary component carrier, wherein the one or more triggers are received separately for each radio access technology or a single trigger indicates to perform the one or more operations using both the first radio access technology and the second radio access technology.

Aspect 13: The method of aspect 12, wherein the one or more operations include one or more of a sounding reference signal transmission, an activation or deactivation of a secondary cell served using the secondary component carrier, a semi-persistent scheduling or configured grant activation or deactivation, a power control procedure, or any combinations thereof.

Aspect 14: The method of any of aspects 12 through 13, wherein the one or more triggers are provided in a downlink control information triggering container or a medium access control (MAC) control element triggering container, and each trigger is applied to one or both of the first radio access technology or the second radio access technology based at least in part on a type of triggering container that provides the one or more triggers.

Aspect 15: The method of any of aspects 1 through 14, further comprising: transmitting a scheduling request via the primary component carrier or the secondary component carrier, or via a first bandwidth part or a second bandwidth part, where the scheduling request is for resources of the first radio access technology, the second radio access technology, or both the first radio access technology and the second radio access technology.

Aspect 16: The method of any of aspects 1 through 15, further comprising: receiving one or more resource allocations or bandwidth part scheduling indications, wherein the one or more resource allocations or bandwidth part scheduling indications are provided per radio access technology or across radio access technologies.

Aspect 17: The method of any of aspects 1 through 16, wherein a logical channel prioritization for two or more logical channels to be provided via the primary component carrier or the secondary component carrier is based at least in part on which of the first radio access technology or the second radio access technology is associated with one or more of the primary component carrier, the secondary component carrier, or a bandwidth part, that carries data for the associated logical channel.

Aspect 18: The method of any of aspects 1 through 17, further comprising: transmitting a UE capability report that indicates one or more UE capabilities per radio access technology or across radio access technologies.

Aspect 19: The method of any of aspects 1 through 18, wherein a discontinuous reception configuration for the UE is provided per radio access technology or across radio access technologies.

Aspect 20: The method of any of aspects 1 through 19, wherein the primary component carrier and the secondary component carrier are included in a first set of component carriers of a first cell group of a dual-connectivity configuration of the UE, and a second set of component carriers are configured in a second cell group of the dual-connectivity configuration of the UE.

Aspect 21: The method of aspect 20, wherein a first medium access control (MAC) entity provides scheduling information for the first set of component carriers, and a second MAC entity provides scheduling information for the second set of component carriers.

Aspect 22: The method of any of aspects 20 through 21, wherein the primary component carrier and the secondary component carrier are each assigned to the first cell group or the second cell group based at least in part on one or more of a type of service associated with each respective component carrier, a physical layer indication or a MAC layer indication associated with each respective component carrier, one or more physical layer channels carried using each respective component carrier, a type of information carried using each respective component carrier, or any combinations thereof.

Aspect 23: The method of any of aspects 20 through 22, wherein a plurality of bandwidth parts (BWPs) are configured for communications at the UE, each BWP of the plurality of BWPs associated with one of the first radio access technology or the second radio access technology, different BWPs of the plurality of BWPs are configured for different services, and a BWP switch for a carrier indicates that a radio access technology associated with the carrier is to be switched.

Aspect 24: A method for wireless communication at a UE, comprising: receiving dual-connectivity configuration information for a first cell group and a second cell group, wherein the first cell group is served using one or more carriers that use a first radio access technology and the second cell group is served using one or more carriers that use a second radio access technology, and wherein different network entities provide physical layer scheduling information for the first cell group and the second cell group; receiving uplink power control information, the uplink power control information includes an indication of a first uplink transmit power of a first uplink transmission and a second uplink transmit power of a second uplink transmission that are based at least in part on which of a first carrier of the first cell group or a second carrier of the second cell group is indicated as being prioritized for uplink power control; and transmitting the first uplink transmission using the first carrier concurrently with the second uplink transmission using the second carrier, the first uplink transmission using the first uplink transmit power and the second uplink transmission using the second uplink transmit power.

Aspect 25: The method of aspect 24, wherein the dual-connectivity configuration information indicates carrier prioritization that is based at least in part on one or more services, one or more priorities, or any combinations thereof, that are associated with the first carrier and the second carrier.

Aspect 26: The method of any of aspects 24 through 25, further comprising: determining a power scaling associated with the first carrier and the second carrier based at least in part on one or more services, one or more priorities, or any combinations thereof, associated with each of the first carrier and the second carrier.

Aspect 27: The method of any of aspects 24 through 26, wherein the first carrier and the second carrier are prioritized for uplink power control based at least in part on a prioritization provided in the dual-connectivity configuration information for one or more physical layer services or medium access control layer logical channels and associated services or logical channels provided using the first carrier and the second carrier.

Aspect 28: The method of any of aspects 24 through 27, wherein the first carrier and the second carrier are prioritized for uplink power control based at least in part on a waveform type prioritization provided in the dual-connectivity configuration information and an associated waveform type of the first carrier and the second carrier.

Aspect 29: The method of any of aspects 24 through 28, wherein the first carrier and the second carrier are prioritized for uplink power control based at least in part on one or more types of channels or type of data provided using the first carrier and the second carrier.

Aspect 30: The method of any of aspects 24 through 29, wherein the dual-connectivity configuration information configures at least the first cell group with two or more component carriers in a carrier aggregation configuration, and the first cell group includes component carriers associated with different radio access technologies.

Aspect 31: The method of aspect 30, wherein a first medium access control (MAC) entity provides the physical layer scheduling information for each component carrier of the first cell group, and a second MAC entity provides the physical layer scheduling information for each component carrier of the second cell group.

Aspect 32: The method of any of aspects 24 through 31, further comprising: determining that a first carrier is included in the first cell group or the second cell group based at least in part on one or more of a type of service provided using the first carrier, a physical layer or medium access control layer indication associated with the first carrier, one or more channels transmitted via the first carrier, a type of information transmitted via the first carrier, a priority associated with information transmitted via the first carrier, or any combinations thereof.

Aspect 33: The method of any of aspects 24 through 32, wherein a plurality of bandwidth parts (BWPs) are configured for communications at the UE, each BWP of the plurality of BWPs associated with one of the first radio access technology or the second radio access technology, different BWPs of the plurality of BWPs are configured for different services, and a BWP switch for a carrier indicates that a radio access technology associated with the carrier is to be switched.

Aspect 34: A method for wireless communication at a UE, comprising: receiving dual-connectivity configuration information for a first cell and a second cell, wherein the first cell is associated with a first carrier that uses a first radio access technology and the second cell is associated with a second carrier that uses a second radio access technology, and wherein the first carrier and the second carrier share a same set of wireless resources that are multiplexed between the first cell and second cell in time intervals that are synchronized between the first radio access technology and the second radio access technology; and communicating with a first radio access network using the first carrier and with a second radio access network using the second carrier based at least in part on a multiplexing configuration that is indicated in the dual-connectivity configuration information, wherein the first carrier and the second carrier are different component carriers that use a frequency domain multiplexing configuration or are a same component carrier that uses a time-domain multiplexing configuration.

Aspect 35: The method of aspect 34, wherein the time intervals are slots or symbols that are synchronized at respective slot or symbol boundaries used in the first radio access network and the second radio access network, and the multiplexing configuration indicates time division multiplexing in the slots or symbols.

Aspect 36: The method of any of aspects 34 through 35, further comprising: receiving scheduling information for the first cell from a first scheduling entity associated with the first radio access network; and receiving scheduling information for the second cell from a second scheduling entity associated with the second radio access network.

Aspect 37: The method of any of aspects 34 through 36, wherein the dual-connectivity configuration information provides a set of slots in which a first subset of slots are for the first radio access network and a second subset of slots are for the second radio access network.

Aspect 38: The method of aspect 37, wherein a ratio of a first quantity of slots in the first subset of slots and a second quantity of slots in the second subset of slots is determined based at least in part on a buffer status associated with each cell, a TDD slot pattern of each cell, or any combinations thereof.

Aspect 39: The method of any of aspects 37 through 38, wherein a scheduling pattern of the first subset of slots and the second subset of slots is provided in downlink control information, in a medium access control (MAC) control element, in a downlink signal that indicates a sequence of slots and a corresponding cell, or any combinations thereof.

Aspect 40: The method of aspect 39, wherein the scheduling pattern is applied to uplink and downlink communications for intra-band and inter-band transmissions of each carrier.

Aspect 41: The method of any of aspects 34 through 40, wherein the multiplexing configuration indicated in the dual-connectivity configuration information provides frequency domain multiplexing or spatial domain multiplexing.

Aspect 42: The method of any of aspects 34 through 41, wherein the multiplexing configuration indicated in the dual-connectivity configuration information provides radio frequency spectrum sharing for two or more operators that operate different radio access networks using the first radio access technology, the second radio access technology, or both.

Aspect 43: A method for wireless communication at a network entity, comprising: transmitting carrier aggregation configuration information to a UE for a primary component carrier, and for a secondary component carrier, wherein the primary component carrier uses a first radio access technology and is associated with a first radio access network and the secondary component carrier uses a second radio access technology and is associated with a second radio access network; and communicating with the UE based at least in part on the carrier aggregation configuration information.

Aspect 44: The method of aspect 43, wherein the first radio access technology is a fifth generation (5G) radio access technology and the second radio access technology is a sixth generation (6G) radio access technology, and a same scheduling entity provides physical layer scheduling information for both the primary component carrier and the secondary component carrier.

Aspect 45: The method of any of aspects 43 through 44, wherein the transmitting the carrier aggregation configuration information comprises: transmitting a bandwidth part configuration for a plurality of bandwidth parts of a channel bandwidth over which the primary component carrier, the secondary component carrier, or both, are configurable to operate, and wherein a first bandwidth part of the plurality of bandwidth parts is associated with the first radio access technology and a second bandwidth part of the plurality of bandwidth parts is associated with the second radio access technology, wherein the primary component carrier is associated with the first radio access technology based at least in part on being configured with the first bandwidth part, and the secondary component carrier is associated with the second radio access technology based at least in part on being configured with the second bandwidth part.

Aspect 46: The method of any of aspects 43 through 45, wherein the transmitting the carrier aggregation configuration information comprises: transmitting an indication of which of the first radio access technology or the second radio access technology is associated with the primary component carrier and the secondary component carrier via one or more of a control channel communication, a control resource set (CORESET) indication associated with each component carrier, where different CORESETs that are associated with different radio access technologies, a downlink control information communication, or any combinations thereof.

Aspect 47: The method of any of aspects 43 through 46, wherein a first uplink transmit power for a first uplink transmission via the primary component carrier or a first bandwidth part and a second uplink transmit power for a second uplink transmission via the secondary component carrier or a second bandwidth part are determined based at least in part on an indication in the carrier aggregation configuration information of which of the first radio access technology or the second radio access technology has a higher priority for uplink power control.

Aspect 48: The method of any of aspects 43 through 47, further comprising: identifying that both an uplink communication and a downlink communication are to be transmitted via the primary component carrier, the secondary component carrier, or both; and prioritizing the uplink communication or the downlink communication based at least in part on which of the first radio access technology or the second radio access technology has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof.

Aspect 49: The method of any of aspects 43 through 48, wherein a first uplink transmission is to be provided to the first radio access network and a second uplink transmission is to be provided to the second radio access network, and wherein the carrier aggregation configuration information indicates that the first uplink transmission is to be transmitted via the primary component carrier and the second uplink transmission is to be transmitted via the secondary component carrier, or that the first uplink transmission and the second uplink transmission are to be multiplexed via the primary component carrier or the secondary component carrier.

Aspect 50: The method of aspect 49, wherein a per component carrier transmission of the first uplink transmission and the second uplink transmission, or a multiplexed transmission of the first uplink transmission and the second uplink transmission, is based at least in part on one or more of a codebook type associated with the first uplink transmission and the second uplink transmission, a waveform of the first uplink transmission and the second uplink transmission, a transmission format of a physical layer channel carrying the first uplink transmission and the second uplink transmission, a priority order of the first radio access technology and the second radio access technology, a service type associated with the first uplink transmission and the second uplink transmission, or any combinations thereof.

Aspect 51: The method of any of aspects 49 through 50, wherein the first uplink transmission and the second uplink transmission include one or more of feedback information that indicates whether one or more downlink communications are successfully decoded, uplink control information, uplink shared channel data, or any combinations thereof.

Aspect 52: The method of any of aspects 43 through 51, further comprising: transmitting one or more triggers to perform one or more operations associated with the primary component carrier or the secondary component carrier, wherein the one or more triggers are transmitted separately for each radio access technology or a single trigger indicates to perform the one or more operations using both the first radio access technology and the second radio access technology.

Aspect 53: The method of aspect 52, wherein the one or more operations include one or more of a sounding reference signal transmission, an activation or deactivation of a secondary cell associated with the secondary component carrier, a semi-persistent scheduling or configured grant activation or deactivation, a power control procedure, or any combinations thereof.

Aspect 54: The method of any of aspects 52 through 53, wherein the one or more triggers are provided in a downlink control information triggering container or a medium access control (MAC) control element triggering container, and each trigger is applied to one or both of the first radio access technology or the second radio access technology based at least in part on a type of triggering container that provides the one or more triggers.

Aspect 55: The method of any of aspects 43 through 54, wherein a scheduling request is provided from the UE via the primary component carrier or the secondary component carrier, where the scheduling request is for resources of the first radio access technology, the second radio access technology, or both the first radio access technology and the second radio access technology.

Aspect 56: The method of any of aspects 43 through 55, further comprising: transmitting, to the UE, one or more resource allocations or bandwidth part scheduling indications, wherein the one or more resource allocations or bandwidth part scheduling indications are provided per radio access technology or across radio access technologies.

Aspect 57: The method of any of aspects 43 through 56, wherein a logical channel prioritization for two or more logical channels to be provided via the primary component carrier or the secondary component carrier is based at least in part on which of the first radio access technology or the second radio access technology is associated with the primary component carrier or the secondary component carrier that carries the associated logical channel.

Aspect 58: The method of any of aspects 43 through 57, wherein the UE provides a UE capability report that indicates one or more UE capabilities per radio access technology or across radio access technologies.

Aspect 59: The method of any of aspects 43 through 58, wherein a discontinuous reception configuration for the UE is provided per radio access technology or across radio access technologies.

Aspect 60: The method of any of aspects 43 through 59, wherein the primary component carrier and the secondary component carrier are included in a first set of component carriers of a first cell group of a dual-connectivity configuration of the UE, and a second set of component carriers are configured in a second cell group of the dual-connectivity configuration of the UE.

Aspect 61: The method of aspect 60, wherein a first medium access control (MAC) entity provides scheduling information for the first set of component carriers, and a second MAC entity provides scheduling information for the second set of component carriers.

Aspect 62: The method of any of aspects 60 through 61, wherein the primary component carrier and the secondary component carrier are each assigned to the first cell group or the second cell group based at least in part on one or more of a type of service associated with each respective component carrier, a physical layer indication or a MAC layer indication associated with each respective component carrier, one or more physical layer channels carried using each respective component carrier, a type of information carried using each respective component carrier, or any combinations thereof.

Aspect 63: The method of any of aspects 60 through 62, wherein a plurality of bandwidth parts (BWPs) are configured for communications at the UE, each BWP of the plurality of BWPs associated with one of the first radio access technology or the second radio access technology, different BWPs of the plurality of BWPs are configured for different services, and a BWP switch for a carrier indicates that a radio access technology associated with the carrier is to be switched.

Aspect 64: A method for wireless communication at a network entity, comprising: transmitting, to a UE, dual-connectivity configuration information for a first cell group and a second cell group, wherein the first cell group is associated with one or more carriers that use a first radio access technology and the second cell group is associated with one or more carriers that use a second radio access technology, and wherein different scheduling entities provide physical layer scheduling information for the first cell group and the second cell group; transmitting, to the UE, uplink power control information, the uplink power control information includes an indication of a first uplink transmit power of a first uplink transmission and a second uplink transmit power of a second uplink transmission that are based at least in part on which of a first carrier of the first cell group or a second carrier of the second cell group is indicated as being prioritized for uplink power control; and receiving the first uplink transmission from the UE using the first carrier, wherein the first uplink transmission is transmitted concurrently with the second uplink transmission using the second carrier of the second cell group, the first uplink transmission using the first uplink transmit power and the second uplink transmission using the second uplink transmit power.

Aspect 65: The method of aspect 64, wherein the dual-connectivity configuration information indicates carrier prioritization that is based at least in part on one or more services that are associated with the first carrier and the second carrier.

Aspect 66: The method of any of aspects 64 through 65, wherein a power scaling associated with the first carrier and the second carrier is based at least in part on one or more services associated with each of the first carrier and the second carrier.

Aspect 67: The method of any of aspects 64 through 66, wherein the first carrier and the second carrier are prioritized for uplink power control based at least in part on a prioritization provided in the dual-connectivity configuration information for one or more physical layer services or medium access control layer logical channels and associated services or logical channels provided using the first carrier and the second carrier.

Aspect 68: The method of any of aspects 64 through 67, wherein the first carrier and the second carrier are prioritized for uplink power control based at least in part on a waveform type prioritization provided in the dual-connectivity configuration information and an associated waveform type of the first carrier and the second carrier.

Aspect 69: The method of any of aspects 64 through 68, wherein the first carrier and the second carrier are prioritized for uplink power control based at least in part on one or more types of channels or type of data provided via the first carrier and the second carrier.

Aspect 70: The method of any of aspects 64 through 69, wherein the dual-connectivity configuration information configures at least the first cell group with two or more component carriers in a carrier aggregation configuration, and the first cell group includes component carriers associated with different radio access technologies.

Aspect 71: The method of aspect 70, wherein a first medium access control (MAC) entity provides the physical layer scheduling information for each component carrier of the first cell group, and a second MAC entity provides the physical layer scheduling information for each component carrier of the second cell group.

Aspect 72: The method of any of aspects 64 through 71, further comprising: determining that a first carrier is included in the first cell group or the second cell group based at least in part on one or more of a type of service provided using the first carrier, a physical layer or medium access control layer indication associated with the first carrier, one or more channels transmitted via the first carrier, a type of information transmitted via the first carrier, or any combinations thereof.

Aspect 73: The method of any of aspects 64 through 72, wherein a plurality of bandwidth parts (BWPs) are configured for communications at the UE, each BWP of the plurality of BWPs associated with one of the first radio access technology or the second radio access technology, different BWPs of the plurality of BWPs are configured for different services, and a BWP switch for a carrier indicates that a radio access technology associated with the carrier is to be switched.

Aspect 74: A method for wireless communication at a network entity, comprising: transmitting, to a UE, dual-connectivity configuration information for a first cell and a second cell, wherein the first cell is associated with a first carrier that uses a first radio access technology and the second cell is associated with a second carrier that uses a second radio access technology, and wherein the first carrier and the second carrier share a same set of wireless resources that are multiplexed between the first cell and second cell in time intervals that are synchronized between the first radio access technology and the second radio access technology; and communicating with the UE based at least in part on a multiplexing configuration that is indicated in the dual-connectivity configuration information.

Aspect 75: The method of aspect 74, wherein the time intervals are slots that are synchronized at slot boundaries used in the first radio access technology and the second radio access technology, and the multiplexing configuration indicates time division multiplexing in the slots.

Aspect 76: The method of any of aspects 74 through 75, wherein the dual-connectivity configuration information provides a set of slots in which a first subset of slots are for the first radio access technology and a second subset of slots are for the second radio access technology.

Aspect 77: The method of aspect 76, wherein a ratio of a first quantity of slots in the first subset of slots and a second quantity of slots in the second subset of slots is determined based at least in part on a buffer status associated with each cell, a TDD slot pattern of each cell, or any combinations thereof.

Aspect 78: The method of any of aspects 76 through 77, wherein a scheduling pattern of the first subset of slots and the second subset of slots is provided in downlink control information, in a medium access control (MAC) control element, in a downlink signal that indicates a sequence of slots and a corresponding cell, or any combinations thereof.

Aspect 79: The method of aspect 78, wherein the scheduling pattern is applied to uplink and downlink communications for intra-band and inter-band transmissions of each carrier.

Aspect 80: The method of any of aspects 74 through 79, wherein the multiplexing configuration indicated in the dual-connectivity configuration information provides frequency domain multiplexing or spatial domain multiplexing.

Aspect 81: The method of any of aspects 74 through 80, wherein the multiplexing configuration indicated in the dual-connectivity configuration information provides radio frequency spectrum sharing for two or more operators that operate different radio access networks using the first radio access technology, the second radio access technology, or both.

Aspect 82: An apparatus for wireless communication at a UE, comprising a processor; memory coupled with the processor; and instructions stored in the memory and executable by the processor to cause the apparatus to perform a method of any of aspects 1 through 23.

Aspect 83: An apparatus for wireless communication at a UE, comprising at least one means for performing a method of any of aspects 1 through 23.

Aspect 84: A non-transitory computer-readable medium storing code for wireless communication at a UE, the code comprising instructions executable by a processor to perform a method of any of aspects 1 through 23.

Aspect 85: An apparatus for wireless communication at a UE, comprising a processor; memory coupled with the processor; and instructions stored in the memory and executable by the processor to cause the apparatus to perform a method of any of aspects 24 through 33.

Aspect 86: An apparatus for wireless communication at a UE, comprising at least one means for performing a method of any of aspects 24 through 33.

Aspect 87: A non-transitory computer-readable medium storing code for wireless communication at a UE, the code comprising instructions executable by a processor to perform a method of any of aspects 24 through 33.

Aspect 88: An apparatus for wireless communication at a UE, comprising a processor; memory coupled with the processor; and instructions stored in the memory and executable by the processor to cause the apparatus to perform a method of any of aspects 34 through 42.

Aspect 89: An apparatus for wireless communication at a UE, comprising at least one means for performing a method of any of aspects 34 through 42.

Aspect 90: A non-transitory computer-readable medium storing code for wireless communication at a UE, the code comprising instructions executable by a processor to perform a method of any of aspects 34 through 42.

Aspect 91: An apparatus for wireless communication at a network entity, comprising a processor; memory coupled with the processor; and instructions stored in the memory and executable by the processor to cause the apparatus to perform a method of any of aspects 43 through 63.

Aspect 92: An apparatus for wireless communication at a network entity, comprising at least one means for performing a method of any of aspects 43 through 63.

Aspect 93: A non-transitory computer-readable medium storing code for wireless communication at a network entity, the code comprising instructions executable by a processor to perform a method of any of aspects 43 through 63.

Aspect 94: An apparatus for wireless communication at a network entity, comprising a processor; memory coupled with the processor; and instructions stored in the memory and executable by the processor to cause the apparatus to perform a method of any of aspects 64 through 73.

Aspect 95: An apparatus for wireless communication at a network entity, comprising at least one means for performing a method of any of aspects 64 through 73.

Aspect 96: A non-transitory computer-readable medium storing code for wireless communication at a network entity, the code comprising instructions executable by a processor to perform a method of any of aspects 64 through 73.

Aspect 97: An apparatus for wireless communication at a network entity, comprising a processor; memory coupled with the processor; and instructions stored in the memory and executable by the processor to cause the apparatus to perform a method of any of aspects 74 through 81.

Aspect 98: An apparatus for wireless communication at a network entity, comprising at least one means for performing a method of any of aspects 74 through 81.

Aspect 99: A non-transitory computer-readable medium storing code for wireless communication at a network entity, the code comprising instructions executable by a processor to perform a method of any of aspects 74 through 81.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving carrier aggregation configuration information for a primary component carrier and for a secondary component carrier, wherein the carrier aggregation configuration information indicates which of the primary component carrier and the secondary component carrier uses a first radio access technology and corresponds to a first control resource set (CORESET), and which of the primary component carrier and the secondary component carrier uses a second radio access technology and corresponds to a second CORESET; and communicating, based at least in part on the carrier aggregation configuration information, with a first radio access network using the primary component carrier and with a second radio access network using the secondary component carrier.

2. The method of claim 1, wherein the first radio access technology is a fifth generation (5G) radio access technology and the second radio access technology is a sixth generation (6G) radio access technology.

3. The method of claim 1, wherein a same network entity provides physical layer scheduling information for both the primary component carrier and the secondary component carrier.

4. The method of claim 1, wherein the receiving the carrier aggregation configuration information comprises:

receiving a bandwidth part configuration for a plurality of bandwidth parts of a channel bandwidth over which the primary component carrier, the secondary component carrier, or both, are configurable to operate, and wherein a first bandwidth part of the plurality of bandwidth parts is associated with the first radio access technology and a second bandwidth part of the plurality of bandwidth parts is associated with the second radio access technology, wherein the primary component carrier is associated with the first radio access technology based at least in part on being configured with the first bandwidth part, and the secondary component carrier is associated with the second radio access technology based at least in part on being configured with the second bandwidth part.

5. The method of claim 4, wherein:

the primary component carrier is configured for operation on multiple bandwidth parts, and wherein communications via one or both of the first radio access technology or the second radio access technology are based at least in part on which of the multiple bandwidth parts is used for communications.

6. The method of claim 1, wherein the receiving the carrier aggregation configuration information comprises:

receiving an indication of which of the first radio access technology or the second radio access technology is associated with the primary component carrier and which of the first radio access technology or the second radio access technology is associated with the secondary component carrier via one or more of a control channel communication, a control resource set (CORESET) CORESET indication associated with each component carrier where different CORESETs are associated with different radio access technologies, a downlink control information communication, or any combinations thereof.

7. The method of claim 1, further comprising:

determining a first uplink transmit power for a first uplink transmission via the primary component carrier and a second uplink transmit power for a second uplink transmission via the secondary component carrier, based at least in part on an indication in the carrier aggregation configuration information of which of the first radio access technology or the second radio access technology has a higher priority for uplink power control.

8. The method of claim 1, further comprising:

identifying that both an uplink communication and a downlink communication are to be transmitted via the primary component carrier, the secondary component carrier, or both, or via a first bandwidth part, a second bandwidth part, or both, wherein each bandwidth part is associated with one or more radio access technologies; and prioritizing the uplink communication or the downlink communication based at least in part on which of the first radio access technology or the second radio access technology has higher priority for communications, a type of service associated with each of the uplink communication and the downlink communication, a priority of data that is to be transmitted in each of the uplink communication and the downlink communication, a type of physical layer channel transmitted in each of the uplink communication and the downlink communication, a type of waveform used for each of the uplink communication and the downlink communication, or any combinations thereof.

9. The method of claim 1, further comprising:

identifying a first uplink transmission to be provided to the first radio access network and a second uplink transmission to be provided to the second radio access network; and determining, based at least in part on the carrier aggregation configuration information, one or more of a component carrier or a bandwidth part for each of the first uplink transmission and the second uplink transmission, or determining, based at least in part on the carrier aggregation configuration information, to multiplex the first uplink transmission and the second uplink transmission for transmission via one component carrier or bandwidth part.

10. The method of claim 9, wherein the determining is based at least in part on one or more of a codebook type associated with the first uplink transmission and the second uplink transmission, a waveform of the first uplink transmission and the second uplink transmission, a transmission format of a physical layer channel carrying the first uplink transmission and the second uplink transmission, a priority order of the first radio access technology and the second radio access technology, a service type associated with the first uplink transmission and the second uplink transmission, or any combinations thereof.

11. The method of claim 9, wherein the first uplink transmission and the second uplink transmission include one or more of feedback information that indicates whether one or more downlink communications are successfully decoded, uplink control information, uplink shared channel data, or any combinations thereof.

12. The method of claim 1, further comprising:

receiving one or more triggers to perform one or more operations associated with the primary component carrier or the secondary component carrier, wherein the one or more triggers are received separately for each radio access technology or a single trigger of the one or more triggers indicates to perform the one or more operations using both the first radio access technology and the second radio access technology.

13. The method of claim 12, wherein the one or more operations include one or more of a sounding reference signal transmission, an activation or deactivation of a secondary cell served using the secondary component carrier, a semi-persistent scheduling or configured grant activation or deactivation, a power control procedure, or any combinations thereof.

14. The method of claim 12, wherein the one or more triggers are provided in a downlink control information triggering container or a medium access control (MAC) control element triggering container, and wherein each trigger is applied to one or both of the first radio access technology or the second radio access technology based at least in part on a type of triggering container that provides the one or more triggers.

15. The method of claim 1, further comprising:

transmitting a scheduling request via the primary component carrier or the secondary component carrier, or via a first bandwidth part or a second bandwidth part, where the scheduling request is for resources of the first radio access technology, the second radio access technology, or both the first radio access technology and the second radio access technology.

16. The method of claim 1, further comprising:

receiving one or more resource allocations or bandwidth part scheduling indications, wherein the one or more resource allocations or the bandwidth part scheduling indications are provided per radio access technology or across radio access technologies.

17. The method of claim 1, wherein a logical channel prioritization for two or more logical channels to be provided via the primary component carrier or the secondary component carrier is based at least in part on which of the first radio access technology or the second radio access technology is associated with one or more of the primary component carrier, the secondary component carrier, or a bandwidth part, that carries data for an associated logical channel of the two or more logical channels.

18. The method of claim 1, further comprising:

transmitting a UE capability report that indicates one or more UE capabilities per radio access technology or across radio access technologies.

19. The method of claim 1, wherein a discontinuous reception configuration for the UE is provided per radio access technology or across radio access technologies.

20. The method of claim 1, wherein the primary component carrier and the secondary component carrier are included in a first set of component carriers of a first cell group of a dual-connectivity configuration of the UE, and wherein a second set of component carriers are configured in a second cell group of the dual-connectivity configuration of the UE.

21. The method of claim 20, wherein a first medium access control (MAC) entity provides scheduling information for the first set of component carriers, and a second MAC entity provides scheduling information for the second set of component carriers.

22. The method of claim 20, wherein the primary component carrier and the secondary component carrier are each assigned to the first cell group or the second cell group based at least in part on one or more of a type of service associated with each respective component carrier, a physical layer indication or a MAC layer indication associated with each respective component carrier, one or more physical layer channels carried using each respective component carrier, a type of information carried using each respective component carrier, or any combinations thereof.

23. The method of claim 20, wherein a plurality of bandwidth parts (BWPs) are configured for communications at the UE, each BWP of the plurality of BWPs associated with one of the first radio access technology or the second radio access technology, wherein different BWPs of the plurality of BWPs are configured for different services, and wherein a BWP switch for a carrier indicates that a radio access technology associated with the carrier is to be switched.

24. A method for wireless communication at a network entity, comprising:

transmitting carrier aggregation configuration information to a user equipment (UE) for a primary component carrier, and for a secondary component carrier, wherein the carrier aggregation configuration information indicates which of the primary component carrier and the secondary component carrier uses a first radio access technology and is associated with a first control resource set (CORESET) and which of the primary component carrier and the secondary component carrier uses a second radio access technology and is associated with a second CORESET; and communicating with the UE based at least in part on the carrier aggregation configuration information.

25. The method of claim 24, wherein the transmitting the carrier aggregation configuration information comprises:

transmitting a bandwidth part configuration for a plurality of bandwidth parts of a channel bandwidth over which the primary component carrier, the secondary component carrier, or both, are configurable to operate, and wherein a first bandwidth part of the plurality of bandwidth parts is associated with the first radio access technology and a second bandwidth part of the plurality of bandwidth parts is associated with the second radio access technology, wherein the primary component carrier is associated with the first radio access technology based at least in part on being configured with the first bandwidth part, and the secondary component carrier is associated with the second radio access technology based at least in part on being configured with the second bandwidth part.

26. The method of claim 24, wherein the transmitting the carrier aggregation configuration information comprises:

transmitting an indication of which of the first radio access technology or the second radio access technology is associated with the primary component carrier and which of the first radio access technology or the second radio access technology is associated with the secondary component carrier via one or more of a control channel communication, a control resource set (CORESET) CORESET indication associated with each component carrier, where different CORESETs that are associated with different radio access technologies, a downlink control information communication, or any combinations thereof.

27. The method of claim 24, wherein a first uplink transmit power for a first uplink transmission via the primary component carrier or a first bandwidth part and a second uplink transmit power for a second uplink transmission via the secondary component carrier or a second bandwidth part are determined based at least in part on an indication in the carrier aggregation configuration information of which of the first radio access technology or the second radio access technology has a higher priority for uplink power control.

28. An apparatus for wireless communication at a user equipment (UE), comprising:

a processor;

memory coupled with the processor; and instructions stored in the memory and executable by the processor to cause the apparatus to:

receive carrier aggregation configuration information for a primary component carrier and for a secondary component carrier, wherein the carrier aggregation configuration information indicates which of the primary component carrier and the secondary component carrier uses a first radio access technology and corresponds to a first control resource set (CORESET), and which of the primary component carrier and the secondary component carrier uses a second radio access technology and corresponds to a second CORESET; and communicate, based at least in part on the carrier aggregation configuration information, with a first radio access network using the primary component carrier and with a second radio access network using the secondary component carrier.

29. The apparatus of claim 28, wherein the instructions to receive the carrier aggregation configuration information are executable by the processor to cause the apparatus to:

receive a bandwidth part configuration for a plurality of bandwidth parts of a channel bandwidth over which the primary component carrier, the secondary component carrier, or both, are configurable to operate, and wherein a first bandwidth part of the plurality of bandwidth parts is associated with the first radio access technology and a second bandwidth part of the plurality of bandwidth parts is associated with the second radio access technology, wherein the primary component carrier is associated with the first radio access technology based at least in part on being configured with the first bandwidth part, and the secondary component carrier is associated with the second radio access technology based at least in part on being configured with the second bandwidth part.

30. An apparatus for wireless communication at a network entity, comprising:

a processor;

memory coupled with the processor; and instructions stored in the memory and executable by the processor to cause the apparatus to:

transmit carrier aggregation configuration information to a user equipment (UE) for a primary component carrier, and for a secondary component carrier, wherein the carrier aggregation configuration information indicates which of the primary component carrier and the secondary component carrier uses a first radio access technology and corresponds to a first control resource set (CORESET), and which of the primary component carrier and the secondary component carrier uses a second radio access technology and corresponds to a second CORESET; and communicate with the UE based at least in part on the carrier aggregation configuration information.

* * * * *